US011556221B2

(12) United States Patent
Amitay et al.

(10) Patent No.: US 11,556,221 B2
(45) Date of Patent: Jan. 17, 2023

(54) FRIEND LOCATION SHARING MECHANISM FOR SOCIAL MEDIA PLATFORMS

(71) Applicant: Snap Inc., Santa Monica, CA (US)

(72) Inventors: Daniel Amitay, New York City, NY (US); Jonathan Brody, Marina Del Rey, CA (US); Leonid Gorkin, Chappaqua, NY (US); Jeffrey Arthur Johnson, Brooklyn, NY (US); Andrew Lin, Long Island City, NY (US); Walton Lin, New York, NY (US); Nayana Samaranayake, New York, NY (US); Evan Spiegel, Venice, CA (US); Marcel M. Yung, New York, NY (US)

(73) Assignee: Snap Inc., Santa Monica, CA (US)

( * ) Notice: Subject to any disclaimer, the term of this patent is extended or adjusted under 35 U.S.C. 154(b) by 509 days.

(21) Appl. No.: 15/965,466

(22) Filed: Apr. 27, 2018

(65) Prior Publication Data

US 2020/0120097 A1    Apr. 16, 2020

Related U.S. Application Data

(60) Provisional application No. 62/556,134, filed on Sep. 8, 2017, provisional application No. 62/552,958, filed
(Continued)

(51) Int. Cl.
*G06F 16/29* (2019.01)
*G06F 16/487* (2019.01)
(Continued)

(52) U.S. Cl.
CPC ........ *G06F 3/04817* (2013.01); *G06F 3/0482* (2013.01); *G06F 3/0488* (2013.01);
(Continued)

(58) Field of Classification Search
CPC ......... H04W 4/02; H04W 4/029; H04W 4/21; H04W 4/021; H04W 4/185;
(Continued)

(56) References Cited

U.S. PATENT DOCUMENTS 666,223 A     1/1901  Shedlock
4,581,634 A   4/1986  Williams
(Continued)

FOREIGN PATENT DOCUMENTS

CA    2887596 A1    7/2015
CN    101127109    2/2008
(Continued)

OTHER PUBLICATIONS

"International Application Serial No. PCT US2018 030045, International Search Report dated Jul. 3, 2018", 2 pgs.
(Continued)

*Primary Examiner* — Theodore C Parsons
(74) *Attorney, Agent, or Firm* — Schwegman Lundberg & Woessner, P.A.

(57) ABSTRACT

A server system for a map-based social media platform maintains user location information to enable the rendering of friend icons on a map at a corresponding display locations. The system maintains a per user access control list (ACL) that lists all users whose icons can be viewed by a requesting user. The ACL can include a designation of respective display granularity levels for different friend users.

16 Claims, 31 Drawing Sheets

Related U.S. Application Data on Aug. 31, 2017, provisional application No. 62/491,115, filed on Apr. 27, 2017.

(51) Int. Cl.

| | | |
|---|---|---|
| *H04L 51/52* | (2022.01) | |
| *H04L 9/40* | (2022.01) | |
| *H04W 4/02* | (2018.01) | |
| *H04W 4/029* | (2018.01) | |
| *H04W 4/21* | (2018.01) | |
| *G06F 16/248* | (2019.01) | |
| *G06F 16/9535* | (2019.01) | |
| *G06F 16/9537* | (2019.01) | |
| *G06F 3/04817* | (2022.01) | |
| *G06F 3/0482* | (2013.01) | |
| *G06F 3/04842* | (2022.01) | |
| *G06F 3/0488* | (2022.01) | |
| *G06Q 50/00* | (2012.01) | |
| *G06T 11/20* | (2006.01) | |
| *G06T 11/60* | (2006.01) | |
| *H04L 41/22* | (2022.01) | |
| *H04L 41/28* | (2022.01) | |
| *H04L 67/12* | (2022.01) | |
| *H04L 67/306* | (2022.01) | |
| *H04L 67/50* | (2022.01) | |
| *H04L 67/52* | (2022.01) | |
| *H04W 4/18* | (2009.01) | |
| *G06F 9/54* | (2006.01) | |

(52) U.S. Cl.
CPC ........ *G06F 3/04842* (2013.01); *G06F 16/248* (2019.01); *G06F 16/29* (2019.01); *G06F 16/487* (2019.01); *G06F 16/9535* (2019.01); *G06F 16/9537* (2019.01); *G06Q 50/01* (2013.01); *G06T 11/206* (2013.01); *G06T 11/60* (2013.01); *H04L 41/22* (2013.01); *H04L 41/28* (2013.01); *H04L 51/52* (2022.05); *H04L 63/101* (2013.01); *H04L 63/107* (2013.01); *H04L 67/12* (2013.01); *H04L 67/306* (2013.01); *H04L 67/52* (2022.05); *H04L 67/535* (2022.05); *H04W 4/02* (2013.01); *H04W 4/029* (2018.02); *H04W 4/185* (2013.01); *H04W 4/21* (2018.02); *G06F 9/547* (2013.01); *G06T 2200/24* (2013.01)

(58) Field of Classification Search
CPC .. G06F 3/04817; G06F 16/29; G06F 16/9535; G06F 16/9537; G06F 9/547; G06F 16/248; G06F 16/487; G06F 3/0482; G06F 3/04842; G06F 3/0488; H04L 63/101; H04L 63/107; H04L 67/12; H04L 67/18; H04L 67/22; H04L 67/306; H04L 41/22; H04L 51/32; H04L 41/28; G06T 11/206; G06T 11/60; G06T 2200/24; G06Q 50/01; G06Q 30/0201; G06N 3/08
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Gamut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |

(56) References Cited

U.S. PATENT DOCUMENTS

| | | | |
|---|---|---|---|
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,818,336 | B1 | 10/2010 | Amidon et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,169,505 | B2 | 5/2012 | Hoshi |
| 8,195,203 | B1 | 6/2012 | Tseng |
| 8,195,748 | B2 | 6/2012 | Hallyn |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,471,914 | B2 | 6/2013 | Sakiyama et al. |
| 8,472,935 | B1 | 6/2013 | Fujisaki |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,594,680 | B2 | 11/2013 | Ledlie et al. |
| 8,613,089 | B1 | 12/2013 | Holloway et al. |
| 8,639,767 | B1 | 1/2014 | Harris et al. |
| 8,655,389 | B1 | 2/2014 | Jackson et al. |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |
| 8,790,187 | B2 | 7/2014 | Walker et al. |
| 8,797,415 | B2 | 8/2014 | Arnold |
| 8,798,646 | B1 | 8/2014 | Wang et al. |
| 8,856,349 | B2 | 10/2014 | Jain et al. |
| 8,874,677 | B2 | 10/2014 | Rosen et al. |
| 8,886,227 | B2 | 11/2014 | Schmidt et al. |
| 8,887,035 | B2 | 11/2014 | Mcdonald et al. |
| 8,893,010 | B1 | 11/2014 | Brin et al. |
| 8,909,679 | B2 | 12/2014 | Root et al. |
| 8,909,725 | B1 | 12/2014 | Sehn |
| 8,972,357 | B2 | 3/2015 | Shim et al. |
| 8,995,433 | B2 | 3/2015 | Rojas |
| 9,002,643 | B2 | 4/2015 | Xu |
| 9,015,285 | B1 | 4/2015 | Ebsen et al. |
| 9,020,745 | B2 | 4/2015 | Johnston et al. |
| 9,040,574 | B2 | 5/2015 | Wang et al. |
| 9,055,416 | B2 | 6/2015 | Rosen et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,113,301 | B1 | 8/2015 | Spiegel et al. |
| 9,119,027 | B2 | 8/2015 | Sharon et al. |
| 9,123,074 | B2 | 9/2015 | Jacobs |
| 9,143,382 | B2 | 9/2015 | Bhogal et al. |
| 9,143,681 | B1 | 9/2015 | Ebsen et al. |
| 9,152,477 | B1 | 10/2015 | Campbell et al. |
| 9,191,776 | B2 | 11/2015 | Root et al. |
| 9,204,252 | B2 | 12/2015 | Root |
| 9,225,897 | B1 | 12/2015 | Sehn et al. |
| 9,247,377 | B2 | 1/2016 | Pai et al. |
| 9,258,459 | B2 | 2/2016 | Hartley |
| 9,344,606 | B2 | 5/2016 | Hartley et al. |
| 9,369,422 | B1 | 6/2016 | Ozog |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,485,747 | B1 | 11/2016 | Rodoper et al. |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,628,950 | B1 | 4/2017 | Noeth et al. |
| 9,710,821 | B2 | 7/2017 | Heath |
| 9,773,284 | B2 | 9/2017 | Huang et al. |
| 9,824,463 | B2 | 11/2017 | Ingrassia et al. |
| 9,854,219 | B2 | 12/2017 | Sehn |
| 9,894,476 | B2 | 2/2018 | Fraccaroli |
| 10,146,748 | B1 | 12/2018 | Barndollar et al. |
| 10,178,507 | B1 | 1/2019 | Roberts |
| 10,194,270 | B2 | 1/2019 | Yokoyama et al. |
| 10,212,541 | B1 | 2/2019 | Brody et al. |
| 10,237,692 | B2 | 3/2019 | Shan et al. |
| 10,432,498 | B1 | 10/2019 | Mcclendon |
| 10,496,661 | B2 | 12/2019 | Morgan et al. |
| 10,952,013 | B1 | 3/2021 | Brody et al. |
| 10,963,529 | B1 | 3/2021 | Amitay et al. |
| 11,385,763 | B2 | 7/2022 | Amitay et al. |
| 11,392,264 | B1 | 7/2022 | Amitay et al. |
| 11,409,407 | B2 | 8/2022 | Amitay et al. |
| 11,418,906 | B2 | 8/2022 | Brody et al. |
| 11,451,956 | B1 | 9/2022 | Amitay et al. |
| 2002/0047868 | A1 | 4/2002 | Miyazawa |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0122659 | A1 | 9/2002 | Mcgrath et al. |
| 2002/0128047 | A1 | 9/2002 | Gates |
| 2002/0144154 | A1 | 10/2002 | Tomkow |
| 2003/0001846 | A1 | 1/2003 | Davis et al. |
| 2003/0016247 | A1 | 1/2003 | Lai et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |

(56) References Cited

U.S. PATENT DOCUMENTS

| | | |
|---|---|---|
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0092668 A1 | 8/2007 | Harris et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109159 A1 | 5/2008 | Shi et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0164459 A1 | 6/2009 | Jennings et al. |
| 2009/0177299 A1 | 7/2009 | Van De Sluis et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0058212 A1 | 3/2010 | Belitz et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0183280 A1 | 7/2010 | Beauregard et al. |

(56) References Cited

U.S. PATENT DOCUMENTS

| | | |
|---|---|---|
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0205242 A1* | 8/2010 | Marchioro, II .... G01C 21/3438 709/203 |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Bocking et al. |
| 2010/0273509 A1 | 10/2010 | Sweeney et al. |
| 2010/0279713 A1 | 11/2010 | Dicke |
| 2010/0281045 A1 | 11/2010 | Dean |
| 2010/0299060 A1 | 11/2010 | Snavely et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238762 A1 | 9/2011 | Soni et al. |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0059826 A1 | 3/2012 | Mate et al. |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0141046 A1 | 6/2012 | Chen et al. |
| 2012/0143760 A1 | 6/2012 | Abulafia et al. |
| 2012/0144452 A1* | 6/2012 | Dyor .................. G06F 21/6245 726/4 |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0221687 A1 | 8/2012 | Hunter et al. |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0302256 A1* | 11/2012 | Pai ..................... G01S 5/0072 455/456.2 |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0008238 A1 | 1/2013 | Hogeg et al. |
| 2013/0024757 A1 | 1/2013 | Doll et al. |
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110631 A1 | 5/2013 | Mitchell et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |

(56) References Cited

U.S. PATENT DOCUMENTS

| | | |
|---|---|---|
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0254900 A1* | 9/2013 | Sathish .......... G06F 16/29 726/28 |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0143241 A1 | 5/2014 | Barello et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0199970 A1 | 7/2014 | Klotz |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280058 A1 | 9/2014 | St. Clair |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289216 A1 | 9/2014 | Voellmer et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0380195 A1 | 12/2014 | Graham et al. |
| 2015/0020086 A1 | 1/2015 | Chen et al. |
| 2015/0046278 A1 | 2/2015 | Pei et al. |
| 2015/0067880 A1 | 3/2015 | Ward et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0193585 A1 | 7/2015 | Sunna |
| 2015/0201030 A1 | 7/2015 | Longo et al. |
| 2015/0222814 A1 | 8/2015 | Li et al. |
| 2015/0245168 A1 | 8/2015 | Martin |
| 2015/0261917 A1 | 9/2015 | Smith |
| 2015/0312184 A1 | 10/2015 | Langholz et al. |
| 2015/0334077 A1 | 11/2015 | Feldman |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0370830 A1 | 12/2015 | Murphy-Chutorian et al. |
| 2015/0378502 A1 | 12/2015 | Hu et al. |
| 2016/0006927 A1 | 1/2016 | Sehn |
| 2016/0012066 A1 | 1/2016 | Ning et al. |
| 2016/0014063 A1 | 1/2016 | Hogeg et al. |
| 2016/0021153 A1* | 1/2016 | Hull .......... G06F 16/9537 715/753 |
| 2016/0035111 A1 | 2/2016 | Ingrassia et al. |
| 2016/0078095 A1 | 3/2016 | Man et al. |
| 2016/0080438 A1 | 3/2016 | Liang |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0164823 A1 | 6/2016 | Nordstrom et al. |
| 2016/0179823 A1 | 6/2016 | Yang |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0217292 A1 | 7/2016 | Faaborg et al. |
| 2016/0234060 A1 | 8/2016 | Pai et al. |
| 2016/0239248 A1 | 8/2016 | Sehn |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0294891 A1 | 10/2016 | Miller |
| 2016/0313957 A1 | 10/2016 | Ebert et al. |
| 2016/0321708 A1 | 11/2016 | Sehn |
| 2016/0350297 A1 | 12/2016 | Riza |
| 2016/0359993 A1 | 12/2016 | Hendrickson et al. |
| 2016/0378278 A1 | 12/2016 | Sirpai |
| 2017/0006094 A1 | 1/2017 | Abou Mahmoud et al. |
| 2017/0010768 A1 | 1/2017 | Watson et al. |
| 2017/0034173 A1 | 2/2017 | Miller et al. |
| 2017/0039452 A1 | 2/2017 | Osindero et al. |
| 2017/0061308 A1 | 3/2017 | Chen et al. |

(56) References Cited

U.S. PATENT DOCUMENTS

| | | | |
|---|---|---|---|
| 2017/0118145 A1 | 4/2017 | Aittoniemi et al. |
| 2017/0124116 A1 | 5/2017 | League |
| 2017/0126592 A1 | 5/2017 | El Ghoul |
| 2017/0132649 A1 | 5/2017 | Oliva et al. |
| 2017/0287006 A1 | 10/2017 | Azmoodeh et al. |
| 2017/0293673 A1 | 10/2017 | Purumala et al. |
| 2017/0339006 A1 | 11/2017 | Austin et al. |
| 2017/0353477 A1 | 12/2017 | Faigon et al. |
| 2018/0005420 A1 | 1/2018 | Bondich et al. |
| 2018/0025367 A1 | 1/2018 | Jain |
| 2018/0032212 A1 | 2/2018 | Choi et al. |
| 2018/0060363 A1 | 3/2018 | Ko et al. |
| 2018/0068019 A1 | 3/2018 | Novikoff et al. |
| 2018/0097762 A1 | 4/2018 | Garcia et al. |
| 2018/0113587 A1 | 4/2018 | Allen et al. |
| 2020/0117339 A1 | 4/2020 | Amitay et al. |
| 2020/0117340 A1 | 4/2020 | Amitay et al. |
| 2020/0120170 A1 | 4/2020 | Amitay et al. |
| 2021/0243548 A1 | 8/2021 | Brody et al. |
| 2021/0286840 A1 | 9/2021 | Amitay et al. |
| 2021/0357104 A1 | 11/2021 | Amitay et al. |
| 2022/0291812 A1 | 9/2022 | Amitay et al. |

FOREIGN PATENT DOCUMENTS

| | | |
|---|---|---|
| CN | 102664819 | 9/2012 |
| CN | 103116853 | 5/2013 |
| CN | 103124894 | 5/2013 |
| CN | 104054077 | 9/2014 |
| CN | 104616540 | 5/2015 |
| CN | 105893579 | 8/2016 |
| CN | 106066990 | 11/2016 |
| CN | 106157155 | 11/2016 |
| CN | 106530008 | 3/2017 |
| CN | 107210948 | 9/2017 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| EP | 2051480 A1 | 4/2009 |
| EP | 2151797 A1 | 2/2010 |
| GB | 2399928 A | 9/2004 |
| JP | 2014191414 | 10/2014 |
| KR | 19990073076 A | 10/1999 |
| KR | 20010078417 A | 8/2001 |
| KR | 101060961 | 8/2011 |
| KR | 20130075380 | 7/2013 |
| KR | 20130111868 | 10/2013 |
| KR | 20140015725 | 2/2014 |
| KR | 101548880 | 9/2015 |
| KR | 20160001847 | 1/2016 |
| KR | 20160018954 | 2/2016 |
| KR | 101604654 | 3/2016 |
| KR | 20160028636 | 3/2016 |
| KR | 101698031 | 1/2017 |
| KR | 20170025454 | 3/2017 |
| KR | 20170035657 | 3/2017 |
| KR | 102434361 | 8/2022 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001020703 A3 | 7/2001 |
| WO | WO-2006118755 A2 | 11/2006 |
| WO | WO-2009043020 A2 | 4/2009 |
| WO | WO-2011040821 A1 | 4/2011 |
| WO | WO-2011119407 A1 | 9/2011 |
| WO | WO-2013008238 | 1/2013 |
| WO | WO-2013045753 A1 | 4/2013 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | 2016179166 | 11/2016 |
| WO | WO-2018005644 A1 | 1/2018 |
| WO | 2018200043 | 11/2018 |
| WO | 2018201102 | 11/2018 |
| WO | 2018201104 | 11/2018 |
| WO | 2018201106 | 11/2018 |
| WO | 2018201108 | 11/2018 |
| WO | 2018201109 | 11/2018 |

OTHER PUBLICATIONS

"International Application Serial No. PCT US2018 030045, Written Opinion dated Jul. 3, 2018", 6 pgs.

"International Application Serial No. PCT US2018 030046, International Search Report dated Jul. 6, 2018", 2 pgs.

"International Application Serial No. PCT US2018 030046, Written Opinion dated Jul. 6, 2018", 6 pgs.

"International Application Serial No. PCT US2018 030039, International Search Report dated Jul. 11, 2018", 2 pgs.

"International Application Serial No. PCT US2018 030039, Written Opinion dated Jul. 11, 2018", 4 pgs.

"International Application Serial No. PCT US2018 030041, International Search Report dated Jul. 11, 2018", 2 pgs.

"International Application Serial No. PCT US2018 030041, Written Opinion dated Jul. 11, 2018", 3 pgs.

"International Application Serial No. PCT US2018 000113, International Search Report dated Jul. 13, 2018", 2 pgs.

"International Application Serial No. PCT US2018 000113, Written Opinion dated Jul. 13, 2018", 4 pgs.

"A Whole New Story", URL: https://www.snap.com/en-US/news/, (2017), 13 pgs.

"Adding a watermark to your photos", eBay, URL: http://pages.ebay.com/help/sell/pictures.html, (accessed May 24, 2017), 4 pgs.

"BlogStomp", URL: http://stompsoftware.com/blogstomp, (accessed May 24, 2017), 12 pgs.

"Cup Magic Starbucks Holiday Red Cups come to life with AR app", URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell The Whole Story", URL: https://youtu.be/uF_gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v=xvzRXy3J0Z0, (Nov. 7, 2011), 102 pgs.

"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvqOzjq10w, (Feb. 6, 2012), 88 pgs.

"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011/09/08/mobli-filters, (Sep. 8, 2011), 10 pgs.

(56) References Cited

OTHER PUBLICATIONS

Dillet, Romain, "Zenly proves that location sharing isn't dead", URL: https://techcrunch.com/2016/05/19/zenly-solomoyolo/, (accessed Jun. 27, 2018), 6 pgs.
Janthong, Isaranu, "Android App Review Thailand", URL: http://www.android-free-app-review.com/2013/01/instaplace-android-google-play-store.html, (Jan. 23, 2013), 9 pgs.
Macleod, Duncan, "Macys Believe-o-Magic App", URL: http://theinspirationroom.com/daily/2011/macys-believe-o-magic-app, (Nov. 14, 2011), 10 pgs.
Macleod, Duncan, "Starbucks Cup Magic Lets Merry", URL: http://theinspirationroom.com/daily/2011/starbucks-cup-magic, (Nov. 12, 2011), 8 pgs.
Notopoulos, Katie, "A Guide To The New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.
Panzarino, Matthew, "Snapchat Adds Filters, A Replay Function and For Whatever Reason, Time, Temperature and Speed Overlays", URL: https://techcrunch.com/2013/12/20/snapchat-adds-filters-new-font-and-for-some-reason-time-temperature-and-speed-overlays/, (Dec. 20, 2013), 12 pgs.
Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.
"International Application Serial No. PCT US2018 030043, International Search Report dated Jul. 23, 2018", 2 pgs.
"International Application Serial No. PCT US2018 030043, Written Opinion dated Jul. 23, 2018", 5 pgs.
"U.S. Appl. No. 15/859,101, Examiner interview Summary dated Sep. 18, 2018", 3 pgs.
"U.S. Appl. No. 15/859,101, Non Final Office Action dated Jun. 15, 2018", 10 pgs.
"U.S. Appl. No. 15/859,101, Notice of Allowance dated Oct. 4, 2018", 9 pgs.
"U.S. Appl. No. 15/859,101, Response filed Sep. 17, 2018 to Non Final Office Action dated Jun. 15, 2018", 17 pgs.
"U.S. Appl. No. 15/965,361, Non Final Office Action dated Jun. 22, 2020", 35 pgs.
"U.S. Appl. No. 15/965,744, Examiner Interview Summary dated Feb. 21, 2020", 3 pgs.
"U.S. Appl. No. 15/965,744, Final Office Action dated Feb. 6, 2020", 19 pgs.
"U.S. Appl. No. 15/965,744, Non Final Office Action dated Feb. 1, 2021", 29 pgs.
"U.S. Appl. No. 15/965,744, Non Final Office Action dated Jun. 12, 2019", 18 pgs.
"U.S. Appl. No. 15/965,744, Response filed Jun. 8, 2020 to Final Office Action dated Feb. 6, 2020", 11 pgs.
"U.S. Appl. No. 15/965,744, Response filed Nov. 12, 2019 to Non Final Office Action dated Jun. 12, 2019", 10 pgs.
"U.S. Appl. No. 15/965,749, Examiner Interview Summary dated Jul. 29, 2020", 3 pgs.
"U.S. Appl. No. 15/965,749, Final Office Action dated Jun. 11, 2020", 12 pgs.
"U.S. Appl. No. 15/965,749, Non Final Office Action dated Jan. 27, 2020", 9 pgs.
"U.S. Appl. No. 15/965,749, Non Final Office Action dated Jul. 10, 2019", 8 pgs.
"U.S. Appl. No. 15/965,749, Non Final Office Action dated Nov. 30, 2020", 13 pgs.
"U.S. Appl. No. 15/965,749, Response filed Feb. 28, 2020 to Non Final Office Action dated Jan. 27, 2020", 12 pgs.
"U.S. Appl. No. 15/965,749, Response filed Oct. 10, 2019 to Non-Final Office Action dated Jul. 10, 2019", 11 pgs.
"U.S. Appl. No. 15/965,749, Response filed Oct. 12, 2020 to Final Office Action dated Jun. 11, 2020", 14 pgs.
"U.S. Appl. No. 15/965,754, Corrected Notice of Allowability dated Jan. 6, 2021", 2 pgs.
"U.S. Appl. No. 15/965,754, Corrected Notice of Allowability dated Mar. 1, 2021", 2 pgs.
"U.S. Appl. No. 15/965,754, Final Office Action dated Jul. 17, 2020", 14 pgs.
"U.S. Appl. No. 15/965,754, Non Final Office Action dated Mar. 30, 2020", 13 pgs.
"U.S. Appl. No. 15/965,754, Notice of Allowance dated Nov. 16, 2020", 7 pgs.
"U.S. Appl. No. 15/965,754, Response filed Jun. 30, 2020 to Non Final Office Action dated Mar. 30, 2020", 12 pgs.
"U.S. Appl. No. 15/965,754, Response filed Oct. 19, 2020 to Final Office Action dated Jul. 17, 2020", 14 pgs.
"U.S. Appl. No. 15/965,754, Supplemental Notice of Allowability dated Dec. 16, 2020", 2 pgs.
"U.S. Appl. No. 15/965,756, Non Final Office Action dated Jan. 13, 2021", 16 pgs.
"U.S. Appl. No. 15/965,756, Non Final Office Action dated Jun. 24, 2020", 16 pgs.
"U.S. Appl. No. 15/965,756, Response filed Sep. 24, 2020 to Non Final Office Action dated Jun. 24, 2020", 11 pgs.
"U.S. Appl. No. 15/965,764, Examiner Interview Summary dated Aug. 6, 2020", 3 pgs.
"U.S. Appl. No. 15/965,764, Final Office Action dated May 14, 2020", 18 pgs.
"U.S. Appl. No. 15/965,764, Non Final Office Action dated Jan. 2, 2020", 18 pgs.
"U.S. Appl. No. 15/965,764, Non Final Office Action dated Feb. 22, 2021", 18 pgs.
"U.S. Appl. No. 15/965,764, Response filed Apr. 2, 2020 to Non Final Office Action dated Jan. 2, 2020", 11 pgs.
"U.S. Appl. No. 15/965,764, Response filed Oct. 14, 2020 to Final Office Action dated May 14, 2020", 11 pgs.
"U.S. Appl. No. 15/965,775, Final Office Action dated Jan. 30, 2020", 10 pgs.
"U.S. Appl. No. 15/965,775, Non Final Office Action dated Jun. 19, 2020", 12 pgs.
"U.S. Appl. No. 15/965,775, Non Final Office Action dated Jul. 29, 2019", 8 pgs.
"U.S. Appl. No. 15/965,775, Non Final Office Action dated Oct. 16, 2020", 11 pgs.
"U.S. Appl. No. 15/965,775, Response filed Mar. 16, 2021 to Non Final Office Action dated Oct. 16, 2020", 10 pgs.
"U.S. Appl. No. 15/965,775. Response filed Jun. 1, 2020 to Final Office Action dated Jan. 30, 2020", 10 pgs.
"U.S. Appl. No. 15/965,775, Response filed Jul. 7, 2020 to Non Final Office Action dated Jun. 19, 2020", 9 pgs.
"U.S. Appl. No. 15/965,775, Response filed Oct. 29, 2019 to Non Final Office Action dated Jul. 29, 2019", 10 pgs.
"U.S. Appl. No. 15/965,811, Final Office Action dated Feb. 12, 2020", 16 pgs.
"U.S. Appl. No. 15/965,811, Non Final Office Action dated Jun. 26, 2020", 20 pgs.
"U.S. Appl. No. 15/965,811, Non Final Office Action dated Aug. 8, 2019", 15 pgs.
"U.S. Appl. No. 15/965,811, Response filed Jun. 12, 2020 to Final Office Action dated Feb. 12, 2020", 13 pgs.
"U.S. Appl. No. 15/965,811, Response filed Nov. 8, 2019 to Non Final Office Action dated Aug. 8, 2019", 14 pgs.
"U.S. Appl. No. 15/965,811, Response filed Dec. 28, 2020 to Non Final Office Action dated Jun. 26, 2020", 13 pgs.
"U.S. Appl. No. 16/232,824, Examiner Interview Summary dated Jul. 24, 2020", 3 pgs.
"U.S. Appl. No. 16/232,824, Final Office Action dated Apr. 30, 2020", 19 pgs.
"U.S. Appl. No. 16/232,824, Non Final Office Action dated Feb. 19, 2021", 28 pgs.
"U.S. Appl. No. 16/232,824, Non Final Office Action dated Oct. 21, 2019", 18 pgs.
"U.S. Appl. No. 16/232,824, Response filed Feb. 21, 2020 to Non Final Office Action dated Oct. 21, 2019", 9 pgs.
"U.S. Appl. No. 16/232,824, Response filed Jul. 15, 2020 to Final Office Action dated Apr. 30, 2020", 11 pgs.

(56) References Cited

OTHER PUBLICATIONS

"U.S. Appl. No. 16/245,660, Final Office Action dated Feb. 6, 2020", 12 pgs.
"U.S. Appl. No. 16/245,660, Non Final Office Action dated Jun. 27, 2019", 11 pgs.
"U.S. Appl. No. 16/245,660, Notice of Allowability dated Nov. 18, 2020", 2 pgs.
"U.S. Appl. No. 16/245,660, Notice of Allowance dated Jul. 8, 2020", 8 pgs.
"U.S. Appl. No. 16/245,660, Notice of Allowance dated Nov. 3, 2020", 8 pgs.
"U.S. Appl. No. 16/245,660, Response filed Jun. 8, 2020 to Final Office Action dated Feb. 6, 2020", 16 pgs.
"U.S. Appl. No. 16/245,660, Response filed Nov. 6, 2019 to Non Final Office Action dated Jun. 27, 2019", 11 pgs.
"European Application Serial No. 19206595.1, Extended European Search Report dated Mar. 31, 2020", 6 pgs.
"European Application Serial No. 18789872.1, Communication Pursuant to Article 94(3) EPC dated Aug. 11, 2020", 6 pgs.
"European Application Serial No. 18789872.1, Extended European Search Report dated Jan. 2, 2020", 8 pgs.
"European Application Serial No. 18789872.1, Response filed Feb. 18, 2021 to Communication Pursuant to Article 94(3) EPC dated Aug. 11, 2020", 15 pgs.
"European Application Serial No. 18790189.7, Communication Pursuant to Article 94(3) EPC dated Jul. 30, 2020", 9 pgs.
"European Application Serial No. 18790189.7, Extended European Search Report dated Jan. 2, 2020", 7 pgs.
"European Application Serial No. 18790189.7, Response filed Feb. 9, 2021 to Communication Pursuant to Article 94(3) EPC dated Jul. 30, 2020", 11 pgs.
"European Application Serial No. 18790189.7, Response Filed Jul. 14, 2020 to Extended European Search Report dated Jan. 2, 2020", 21 pgs.
"European Application Serial No. 18790319.0, Extended European Search Report dated Feb. 12, 2020", 6 pgs.
"European Application Serial No. 18790319.0, Response filed Aug. 27, 2020 to Extended European Search Report dated Feb. 12, 2020", 19 pgs.
"European Application Serial No. 18791363.7, Communication Pursuant to Article 94(3) EPC dated Aug. 11, 2020", 9 pgs.
"European Application Serial No. 18791363.7, Extended European Search Report dated Jan. 2, 2020", 8 pgs.
"European Application Serial No. 18791363.7, Response filed Jul. 14, 2020 to Extended European Search Report dated Jan. 2, 2020", 31 pgs.
"European Application Serial No. 18791363.7, Response Filed Feb. 22, 2021 to Communication Pursuant to Article 94(3) EPC dated Aug. 11, 2020", 35 pgs.
"European Application Serial No. 19206595.1, Response filed Dec. 16, 2020 to Extended European Search Report dated Mar. 31, 2020", w/ English Claims, 43 pgs.
"European Application Serial No. 19206610.8, Extended European Search Report dated Feb. 12, 2020", 6 pgs.
"European Application Serial No. 19206610.8, Response filed Sep. 23, 2020 to Extended European Search Report dated Feb. 12, 2020", 109 pgs.
"International Application Serial No. PCT/US2018/000113, International Preliminary Report on Patentability dated Nov. 7, 2019", 6 pgs.
"International Application Serial No. PCT/US2018/030039, International Preliminary Report on Patentability dated Nov. 7, 2019", 6 pgs.
"International Application Serial No. PCT/US2018/030041, International Preliminary Report on Patentability dated Nov. 7, 2019", 5 pgs.
"International Application Serial No. PCT/US2018/030043, International Preliminary Report on Patentability dated Nov. 7, 2019", 7pgs.
"International Application Serial No. PCT/US2018/030045, International Preliminary Report on Patentability dated Nov. 7, 2019", 8 pgs.
"International Application Serial No. PCT/US2018/030046, International Preliminary Report on Patentability dated Nov. 7, 2019", 8 pgs.
"The One Million Tweet Map: Using Maptimize to Visualize Tweets in a World Map | PowerPoint Presentation", FPPT.com, [Online] Retrieved form the Internet: <URL: https://web.archive.org/web/20121103231906/http://www.freepower-point-templates.com/articles/the-one-miliion-tweet-mapusing-maptimize-to-visualize-tweets-in-a-world-map/>, (Nov. 3, 2012), 6 pgs.
U.S. Appl. No. 17/131,598, filed Dec. 22, 2020, Map-Based Graphical User Interface for Ephemeral Social Media Content.
U.S. Appl. No. 17/249,201, filed Feb. 23, 2021, Location-Based Search Mechanism in a Graphical User Interface.
U.S. Appl. No. 16/232,824, filed Dec. 26, 2018, Clustered User Icons in Map-Based Social Media Interfaces.
U.S. Appl. Nos. 15/859,101, 10/212,541, filed Dec. 29, 2017, Selective Location-Based Identity Communication.
U.S. Appl. Nos. 16/245,660, 10/952,013, filed Jan. 11, 2019, Selective Location-Based Identity Communication.
U.S. Appl. No. 17/248,841, filed Feb. 10, 2021, Selective Location-Based Identity Communication.
"U.S. Appl. No. 15/965,749, Response filed Mar. 30, 2021 to Non Final Office Action dated Nov. 30, 2020", 13 pgs.
"U.S. Appl. No. 15/965,811, Final Office Action dated Apr. 14, 2021", 19 pgs.
"U.S. Appl. No. 17/248,841, Preliminary Amendment filed Apr. 22, 2021", 7 pgs.
"U.S. Appl. No. 15/965,756, Response filed May 13, 2021 to Non Final Office Action dated Jan. 13, 2021", 12 pgs.
"U.S. Appl. No. 15/965,764, Response filed May 24, 2021 to Non Final Office Action dated Feb. 22, 2021", 13 pgs.
"Korean Application Serial No. 10-2019-7034512, Notice of Preliminary Rejection dated May 17, 2021", With English translation, 15 pgs.
"U.S. Appl. No. 15/965,744, Response filed Jun. 1, 2021 to Non Final Office Action dated Feb. 1, 2021", 11 pgs.
"Korean Application Serial No. 10-2019-7034751, Notice of Preliminary Rejection dated May 21, 2021", With English translation, 18 pgs.
"Korean Application Serial No. 10-2019-7034596, Notice of Preliminary Rejection dated May 18, 2021", With English translation, 20 pgs.
"Korean Application Serial No. 10-2019-7034715, Notice of Preliminary Rejection dated May 21, 2021", With English translation, 15 pgs.
"Korean Application Serial No. 10-2019-7035443, Notice of Preliminary Rejection dated May 26, 2021", With English translation, 14 pgs.
"U.S. Appl. No. 17/131,598, Preliminary Amendment filed Jun. 8, 2021", 10 pages.
"U.S. Appl. No. 15/965,764, Final Office Action mailed Jun. 15, 2021", 19 pgs.
"European Application Serial No. 18789872.1, Summons to Attend Oral Proceedings dated Jun. 23, 2021", 9 pgs.
"Korean Application Serial No. 10-2019-7034598, Notice of Preliminary Rejection dated Jun. 3, 2021", With English translation, 10 pgs.
"U.S. Appl. No. 15/965,775, Final Office Action dated Jul. 6, 2021", 12 pgs.
"U.S. Appl. No. 15/965,749, Non Final Office Action dated Jul. 9, 2021", 14 pgs.
"European Application Serial No. 18790189.7, Summons to attend oral proceedings dated Jul. 8, 2021", 13 pgs.
"European Application Serial No. 19206610.8, Communication Pursuant to Article 94(3) EPC dated Jul. 21, 2021", 8 pgs.
"European Application Serial No. 18790319.0, Communication Pursuant to Article 94(3) EPC dated Jul. 21, 2021", 7 pgs.
"European Application Serial No. 19206595.1, Communication Pursuant to Article 94(3) EPC dated Jul. 22, 2021", 7 pgs.

(56) References Cited

OTHER PUBLICATIONS

"U.S. Appl. No. 15/965,744, Final Office Action dated Jul. 28, 2021", 29 pgs.
"U.S. Appl. No. 15/965,756, Final Office Action dated Aug. 19, 2021", 17 pgs.
"U.S. Appl. No. 16/232,824, Response filed Aug. 19, 2021 to Non Final Office Action dated Feb. 19, 2021", 12 pgs.
"European Application Serial No. 18789872.1, Summons to Attend Oral Proceedings dated Sep. 13, 2021", 9 pgs.
"U.S. Appl. No. 15/965,811, Response filed Sep. 14, 2021 to Final Office Action dated Apr. 14, 2021", 14 pgs.
"Chinese Application Serial No. 202010079763.5, Office Action dated Aug. 27, 2021", With English translation, 15 pgs.
"U.S. Appl. No. 15/965,811, Non Final Office Action dated Oct. 4, 2021", 20 pgs.
"U.S. Appl. No. 17/249,201, Preliminary Amendment filed Oct. 6, 2021", 9 pgs.
"U.S. Appl. No. 15/965,775, Response filed Oct. 6, 2021 to Final Office Action dated Jul. 6, 2021", 11 pgs.
"U.S. Appl. No. 15/965,749, Corrected Notice of Allowability dated Jun. 16, 2022", 2 pgs.
"U.S. Appl. No. 15/965,811, Notice of Allowability dated Jun. 17, 2022", 2 pgs.
"U.S. Appl. No. 16/232,824, Final Office Action dated Jun. 23, 2022", 26 pgs.
"U.S. Appl. No. 17/249,201, Corrected Notice of Allowability dated Jun. 24, 2022", 2 pgs.
"U.S. Appl. No. 15/965,764, Corrected Notice of Allowability dated Jun. 28, 2022", 2 pgs.
"Korean Application Serial No. 10-2019-7035443, Response filed May 6, 2022 to Office Action dated Apr. 12, 2022", w English Claims, 17 pgs.
"Chinese Application Serial No. 202010079763.5, Response filed Jun. 1, 2022 to Office Action dated Apr. 12, 2022", w English Claims, 12 pgs.
"U.S. Appl. No. 15/965,744, Response filed Jul. 5, 2022 to Non Final Office Action dated Mar. 4, 2022", 13 pgs.
"Korean Application Serial No. 10-2019-7034751, Response filed Jun. 7, 2022 to Office Action dated Mar. 7, 2022", w English Claims, 27 pgs.
"Korean Application Serial No. 10-2019-7034715, Response filed Jun. 7, 2022 to Office Action dated Mar. 7, 2022", w English Claims, 18 pgs.
"Korean Application Serial No. 10-2019-7034715, Response filed Nov. 22, 2021 to Office Action dated May 21, 2021", w English Claims, 22 pgs.
"Korean Application Serial No. 10-2019-7034751, Response filed Nov. 22, 2021 to Office Action dated May 21, 2021", w English Claims, 28 pgs.
"Korean Application Serial No. 10-2019-7034596, Response filed Nov. 18, 2021 to Office Action dated May 18, 2021", w English Claims, 23 pgs.
"U.S. Appl. No. 15/965,811, PTO Response to Rule 312 Communication dated Jul. 12, 2022", 2 pgs.
"U.S. Appl. No. 17/248,841, Notice of Allowability dated Jul. 18, 2022", 2 pgs.
"U.S. Appl. No. 15/965,756, Response filed Aug. 1, 2022 to Non Final Office Action dated Mar. 31, 2022", 12 pgs.
"U.S. Appl. No. 15/965,764, PTO Response to Rule 312 Communication dated Aug. 16, 2022", 2 pgs.
"U.S. Appl. No. 17/249,201, Corrected Notice of Allowability dated Sep. 22, 2022", 2 pgs.
"U.S. Appl. No. 17/131,598, Non Final Office Action dated Sep. 27, 2022", 27 pgs.
"European Application Serial No. 22165083.1, Extended European Search Report dated Jul. 12, 2022", 7 pgs.
"Tiled web map—Wikipedia", URL:https: en.wikipedia.org w index.php?title=Tiled_web_mapandoldid=758691778, (Jan. 6, 2017), 1-3.
"European Application Serial No. 22173072.4, Extended European Search Report dated Aug. 26, 2022", 6 pgs.
"Korean Application Serial No. 10-2019-7034715, Office Action dated Jun. 27, 2022", w English Translation, 7 pgs.
"Korean Application Serial No. 10-2019-7034596, Response filed Sep. 7, 2022 to Office Action filed Mar. 7, 2022", w English Claims, 32 pgs.
"U.S. Appl. No. 15/965,744, Non Final Office Action dated Mar. 4, 2022", 31 pgs.
"U.S. Appl. No. 15/965,744, Response filed Nov. 29, 2021 to Final Office Action dated Jul. 28, 2021", 13 pgs.
"U.S. Appl. No. 15/965,749, Notice of Allowance dated Feb. 2, 2022", 25 pgs.
"U.S. Appl. No. 15/965,749, Response filed Nov. 9, 2021 to Non Final Office Action dated Jul. 9, 2021", 14 pgs.
"U.S. Appl. No. 15/965,749, Supplemental Notice of Allowability dated Apr. 7, 2022", 3 pgs.
"U.S. Appl. No. 15/965,749, Supplemental Notice of Allowability dated May 5, 2022", 3 pgs.
"U.S. Appl. No. 15/965,756, Non Final Office Action dated Mar. 31, 2022", 17 pgs.
"U.S. Appl. No. 15/965,756, Response filed Dec. 20, 2021 to Final Office Action dated Aug. 19, 2021", 13 pgs.
"U.S. Appl. No. 15/965,764, Corrected Notice of Allowability dated Mar. 30, 2022", 1 pg.
"U.S. Appl. No. 15/965,764, Corrected Notice of Allowability dated Apr. 20, 2022", 2 pgs.
"U.S. Appl. No. 15/965,764, Notice of Allowance dated Mar. 9, 2022", 8 pgs.
"U.S. Appl. No. 15/965,764, Response filed Nov. 15, 2021 to Final Office Action dated Jun. 15, 2021", 12 pgs.
"U.S. Appl. No. 15/965,775, Corrected Notice of Allowability dated Apr. 7, 2022", 3 pgs.
"U.S. Appl. No. 15/965,775, Corrected Notice of Allowability dated Jun. 1, 2022", 3 pgs.
"U.S. Appl. No. 15/965,775, Corrected Notice of Allowability dated Jun. 15, 2022", 2 pgs.
"U.S. Appl. No. 15/965,775, Notice of Allowance dated Feb. 22, 2022", 19 pgs.
"U.S. Appl. No. 15/965,811, Notice of Allowability dated Mar. 25, 2022", 10 pgs.
"U.S. Appl. No. 15/965,811, Notice of Allowability dated May 11, 2022", 2 pgs.
"U.S. Appl. No. 15/965,811, Notice of Allowance dated Mar. 9, 2022", 9 pgs.
"U.S. Appl. No. 15/965,811, Response filed Feb. 4, 2022 to Non Final Office Action dated Oct. 4, 2021", 14 pgs.
"U.S. Appl. No. 16/232,824, Final Office Action dated Nov. 2, 2021", 25 pgs.
"U.S. Appl. No. 16/232,824, Response filed May 2, 2022 to Final Office Action dated Nov. 2, 2021", 13 pgs.
"U.S. Appl. No. 17/248,841, Notice of Allowance dated Apr. 7, 2022", 9 pgs.
"U.S. Appl. No. 17/249,201, Non Final Office Action dated May 26, 2022", 5 pgs.
"U.S. Appl. No. 17/249,201, Notice of Allowance dated Jun. 9, 2022", 7 pgs.
"U.S. Appl. No. 17/249,201, Response filed May 27, 2022 to Non Final Office Action dated May 26, 2022", 10 pgs.
"Chinese Application Serial No. 202010079763.5, Office Action dated Apr. 12, 2022", W/English Translation, 14 pgs.
"Chinese Application Serial No. 202010079763.5, Response Filed Jan. 11, 2022 to Office Action dated Aug. 27, 2021", w/ English Claims, 13 pgs.
"European Application Serial No. 18790319.0, Response Filed Jan. 28, 2022 to Communication Pursuant to Article 94(3) EPC dated Jul. 21, 2021", 16 pgs.
"European Application Serial No. 18791363.7, Summons to attend oral proceedings dated Apr. 4, 2022", 11 pgs.
"European Application Serial No. 19206595.1, Response filed Jan. 28, 2022 to Communication Pursuant to Article 94(3) EPC dated Jul. 22, 2021", 18 pgs.
"European Application Serial No. 19206610.8, Response filed Jan. 26, 2022 to Communication Pursuant to Article 94(3) EPC dated Jul. 21, 2021", 23 pgs.

(56) References Cited

OTHER PUBLICATIONS

"Korean Application Serial No. 10-2019-7034512, Notice of Preliminary Rejection dated Nov. 2, 2021", w/ English translation, 8 pgs.
"Korean Application Serial No. 10-2019-7034512, Response Filed Jan. 3, 2022 to Notice of Preliminary Rejection dated Nov. 2, 2021", w/ English Claims, 18 pgs.
"Korean Application Serial No. 10-2019-7034596, Notice of Preliminary Rejection dated Mar. 7, 2022", w/ English translation, 21 pgs.
"Korean Application Serial No. 10-2019-7034598, Notice of Preliminary Rejection dated Jan. 10, 2022", w/ English translation, 13 pgs.
"Korean Application Serial No. 10-2019-7034598, Response filed Sep. 3, 2021 to Notice of Preliminary Rejection dated Jun. 3, 2021", w/ English Claims, 27 pgs.
"Korean Application Serial No. 10-2019-7034598, Response Filed Mar. 10, 2022 to Notice of Preliminary Rejection dated Jan. 10, 2022", W/ English Claims, 24 pgs.
"Korean Application Serial No. 10-2019-7034715, Final Office Action dated Mar. 7, 2022", w/ English translation, 9 pgs.
"Korean Application Serial No. 10-2019-7034751, Final Office Action dated Mar. 7, 2022", w/ English translation, 11 pgs.
"Korean Application Serial No. 10-2019-7035443, Notice of Preliminary Rejection dated Apr. 11, 2022", w/ English translation, 8 pgs.
Birchall, Andrew Alexander, "The delivery of notifications that user perceives,", IP.com English Translation of CN 107210948 A Filed Dec. 16, 2014, (2014), 28 pgs.

\* cited by examiner

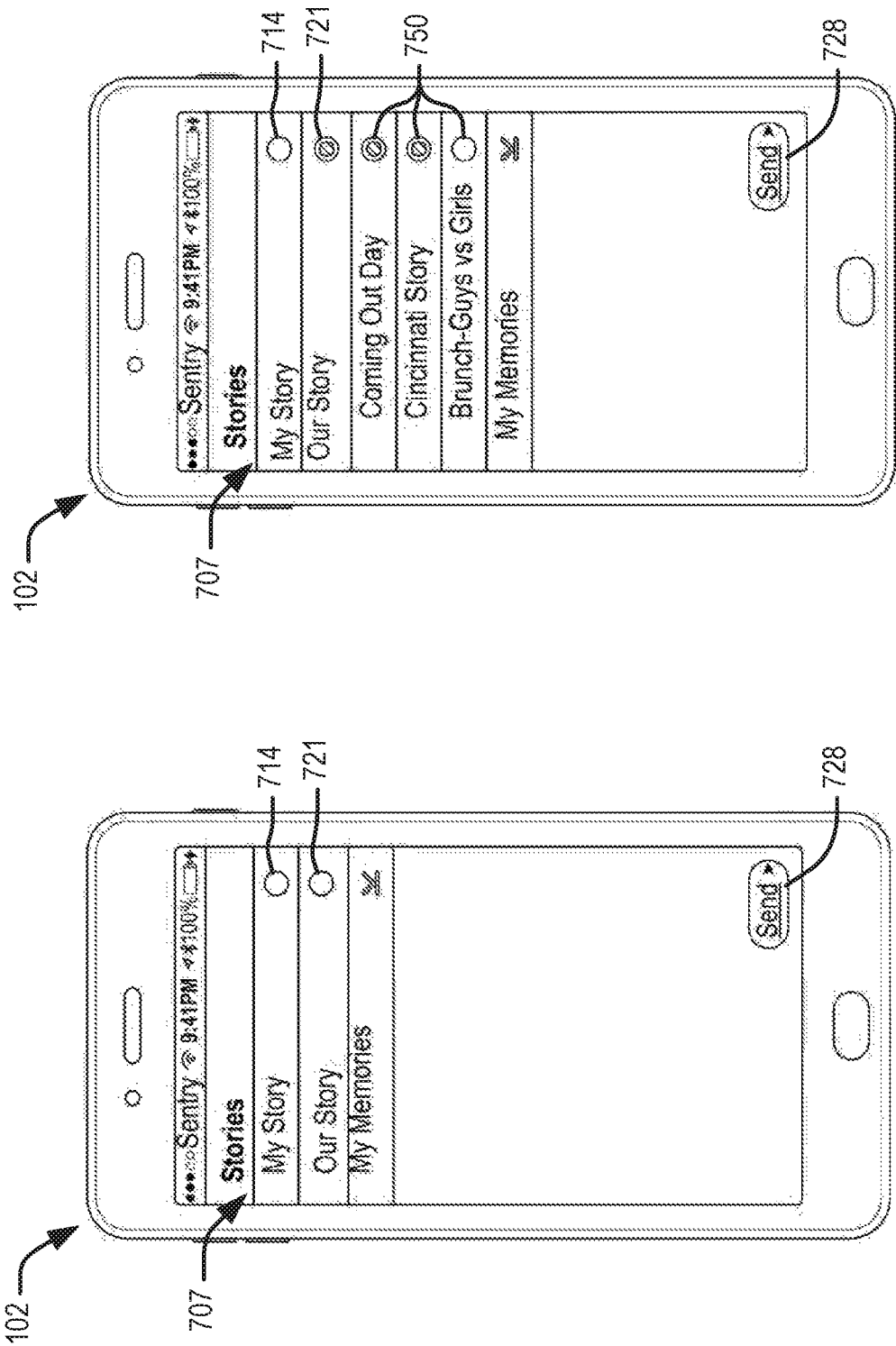

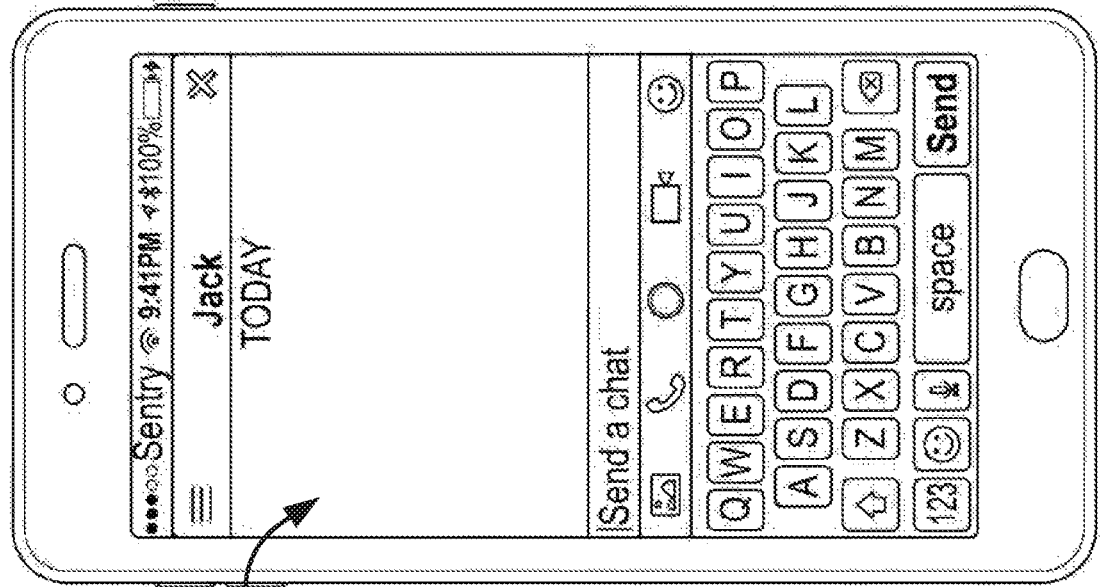
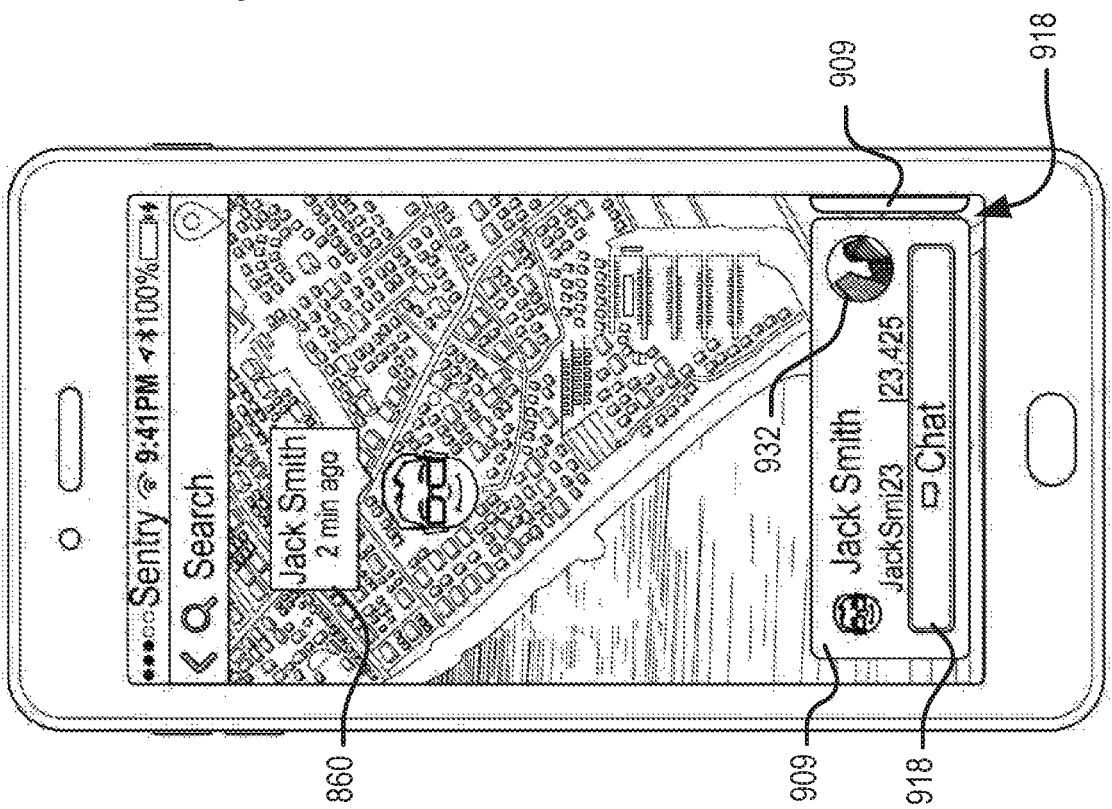
FIG. 9B
FIG. 9A

FRIEND LOCATION SHARING MECHANISM FOR SOCIAL MEDIA PLATFORMS

PRIORITY APPLICATIONS

This application is a non-provisional application which claims the benefit of priority to U.S. Provisional Application Ser. No. 62/556,134, filed Sep. 8, 2017; U.S. Provisional Application Ser. No. 62/552,958, filed Aug. 31, 2017; and U.S. Provisional Application Ser. No. 62/491,115, filed Apr. 27, 2017, the contents of which are incorporated herein by reference in their entireties.

BACKGROUND

Social media applications implement computer-mediated technologies allowing for the creating and sharing of content that communicates information, ideas, career interests, and other forms of expression via virtual communities and networks. Social media platforms use web-based technologies, desktop computers, and mobile technologies (e.g., smart phones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user. Social media content posted by users is often geo-tagged based on the geolocation of a mobile electronic device (such as a mobile phone) by use of which the social media content is captured and/or posted to the social media platform. In other embodiments, social media content may explicitly be geo-tagged by a user using a computer device that does not have activated geolocation services and/or that is not a mobile device (such as a desktop PC).

In many social media platforms, the total number of individual social media items that are available for viewing by any particular user can be very large. Search mechanisms that enable users to locate social media content that may be of interest to them can consume significant server-side resources and often provide less than satisfactory search results.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

FIGS. 7A-7C are respective schematic views of a client device providing a destination selection interface forming part of a map-based graphical user interface for a social media application, according to some example embodiments.

FIGS. 9A and 9B are respective screenshots of the functionalities of a map-based graphical user interface that provides access to a chat interface and to friend content via a friend icon displayed as part of the map, according to an example embodiment.

Figure 1:
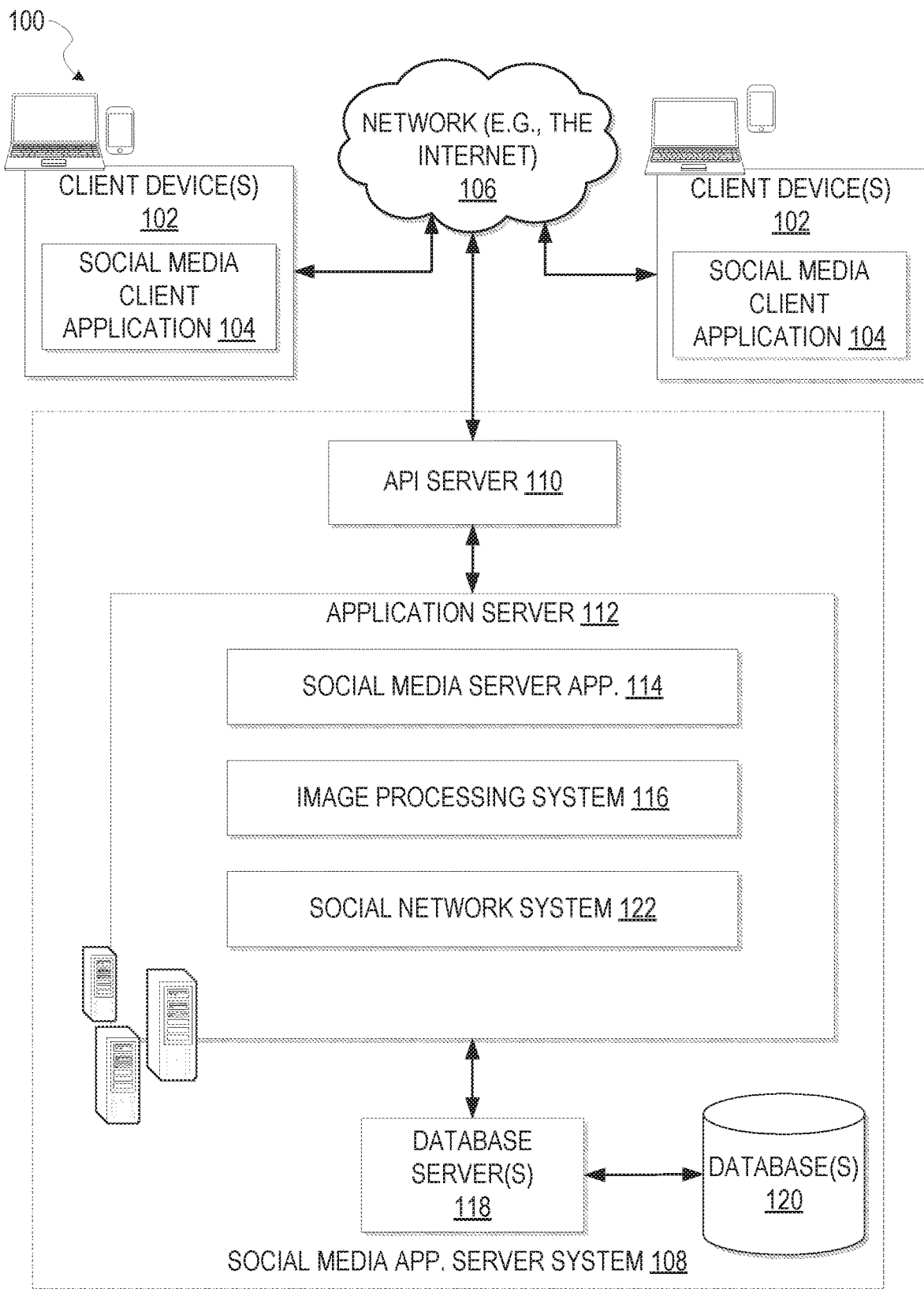
FIG. 1 is a block diagram showing an example social media platform system for exchanging, posting, and consuming social media data (e.g., messages and associated content) over a network.

The headings provided herein are merely for convenience and do not necessarily affect the scope or meaning of the terms used.

DESCRIPTION

One aspect of the disclosure provides a geographical map-based graphical user interface (GUI) for a social media platform or application, to allow user access via the map-based GUI to ephemeral social media content. Such an interface is also referred to herein as a "map GUI."

As will be described in greater detail below, ephemeral social media content comprises social media items that are available for viewing via the social media application for only a limited period. For example, an ephemeral social media item or message (also referred to herein as a "snap") submitted by a user to the social media application may be available for viewing by other users via the map GUI of the social media application for only a predefined period subsequent to submission. In one example embodiment, each ephemeral item or snap has an availability lifetime (also referred to herein as a "gallery participation timer") of 24 hours after submission, after which the ephemeral item "disappears" and is no longer available for viewing by other users via the map GUI. Such ephemeral social media items (also referred to herein as ephemeral messages) typically comprise photographic or video content, which may be submitted with or without augmentations made by the user to the underlying photographic or video content.

Ephemeral messages submitted by multiple different users may be available on a map forming part of the map GUI based at least in part on respective location information (e.g., geotag information) of the ephemeral messages. In some embodiments, the map GUI may provide location-based access to one or more collections of ephemeral social media items (also known as and referred to herein as galleries or "stories"). In some example embodiments, a plurality of ephemeral messages submitted by different users are included in a common geo-anchored gallery or story based at least in part on respective geotagging information of the plurality of ephemeral messages. Such a location-based gallery or story is in some embodiments represented on the map GUI by a respective gallery icon displayed at a corresponding map location, the gallery icon being selectable by the user to trigger automated sequential display of the plurality of ephemeral messages in the gallery on the user device on which the map GUI is rendered.

In some embodiments, such a map GUI includes representations (e.g. by means of friend icons or bitmojis) of at least approximate respective positions of a user's friends in a social network graph accessed by the social media application, with the social media application enabling the user to explore the world around friends' locations by use of the GUI. Thus, the map GUI can in some embodiments enable the user to explore uploaded social media content (e.g., individual photos or video clips/snaps, or social media galleries such as stories comprising respective collections of photos, messages, or snaps).

Figure 19:
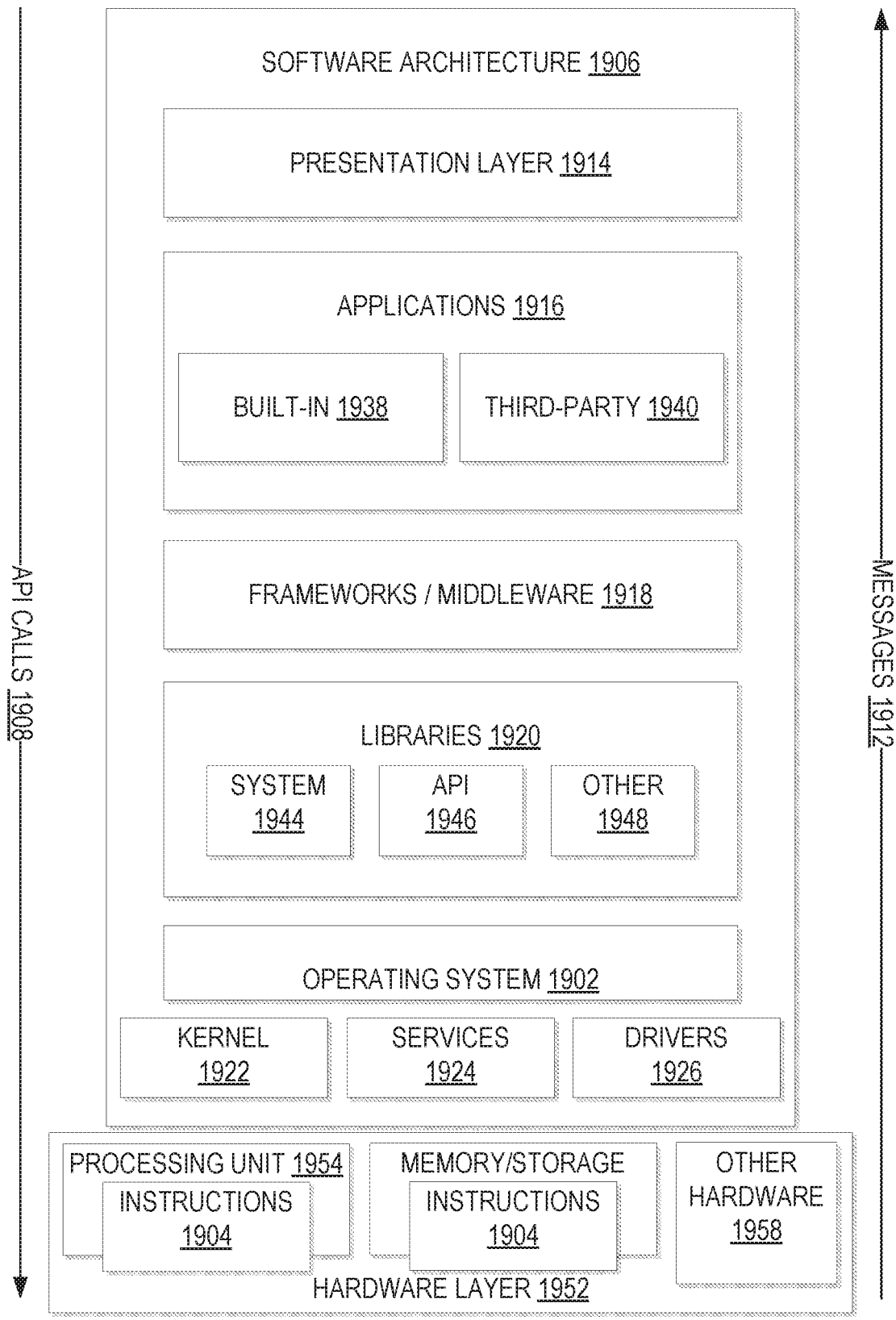
FIG. 19 is a block diagram illustrating a representative software architecture, which may be used in conjunction with various hardware architectures herein described.
Figure 20:
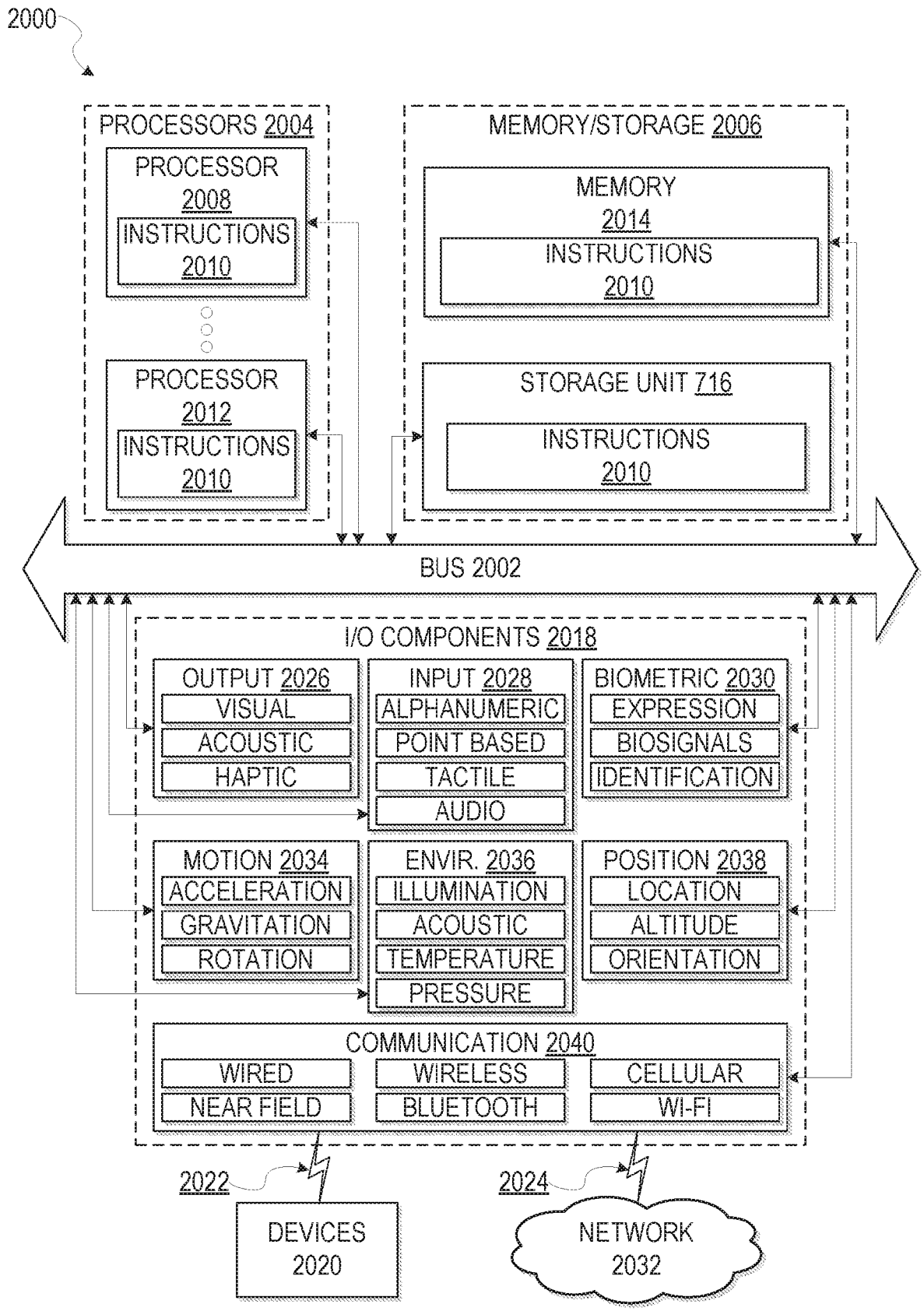
FIG. 20 is a block diagram illustrating components of a machine, according to some example embodiments, able to read instructions from a machine-readable medium (e.g., a machine-readable storage medium) and perform any one or more of the methodologies discussed herein.

These and additional aspects of the disclosure will be described below with reference to specific example embodiments. First, platform architecture and a technical background to implementation of the various embodiments will be described with reference to FIGS. 1-5. Thereafter, specific example embodiments are described with reference to FIGS. 6A-18. FIGS. 19-20 finally describe aspects of software and hardware components that are in some instances used in the implementation of the described example embodiments.

Figure 6A:
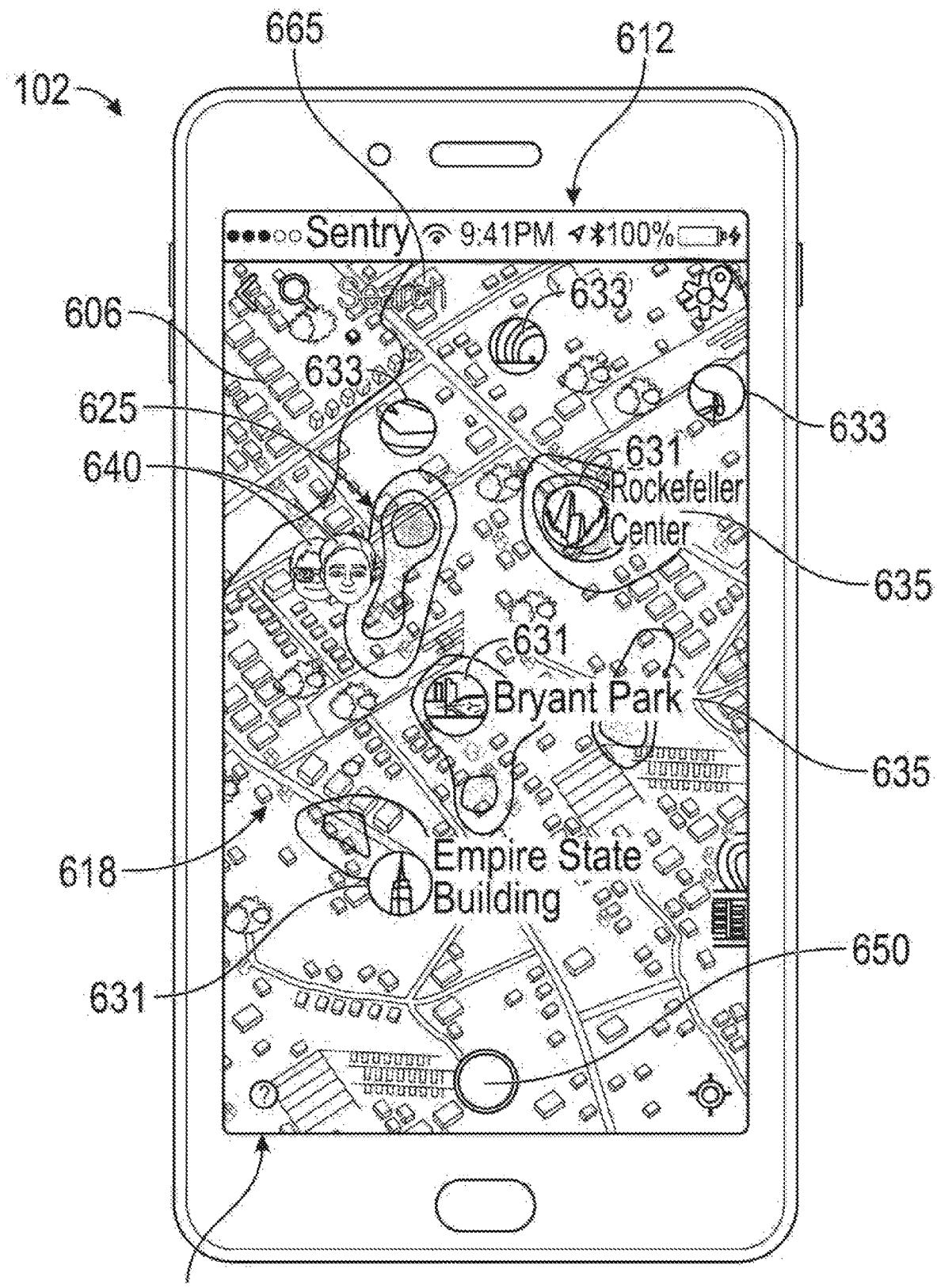
FIGS. 6A and 6B are respective schematic views of a client device providing a map-based graphical user interface for a social media application, according to different respective example embodiments.
Figure 6B:
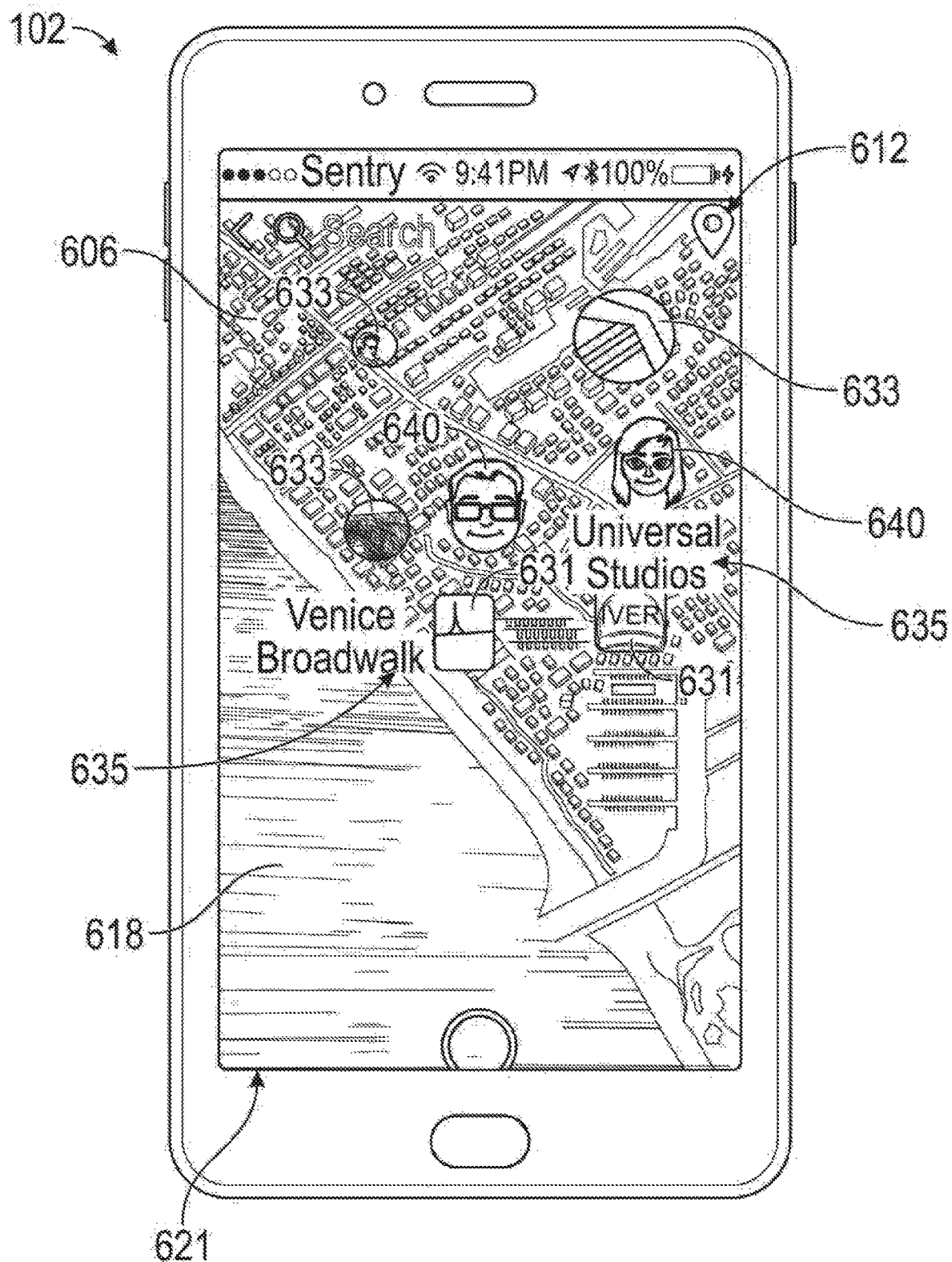

FIGS. 6A and 6B are respective schematic views of a client device providing a map-based graphical user interface for a social media application, according to different respective example embodiments.

Figure 7A:
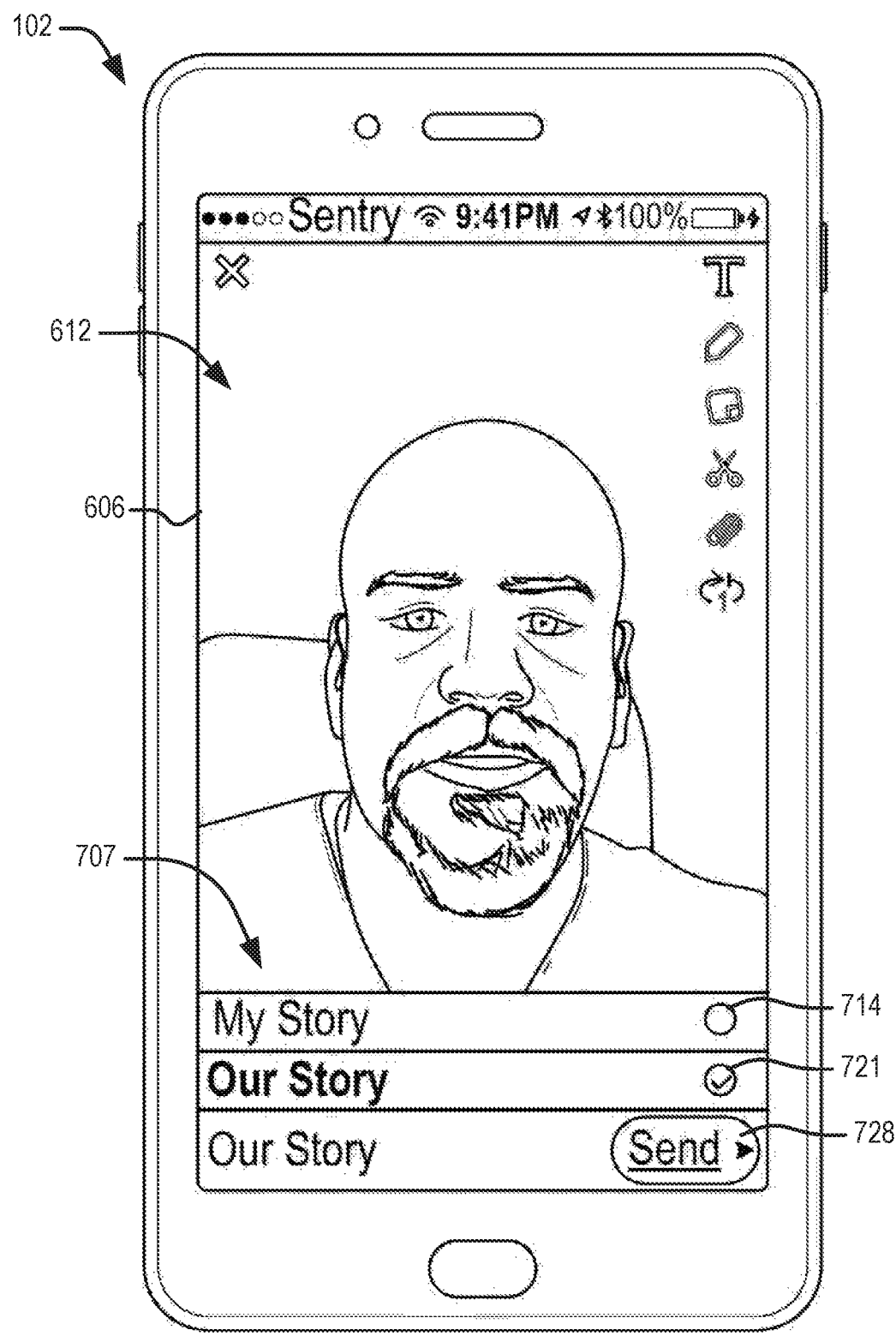

FIGS. 7A-7C are respective schematic views of a client device providing a destination selection interface forming part of a map-based graphical user interface for a social media application, according to some example embodiments.

Figure 8C:
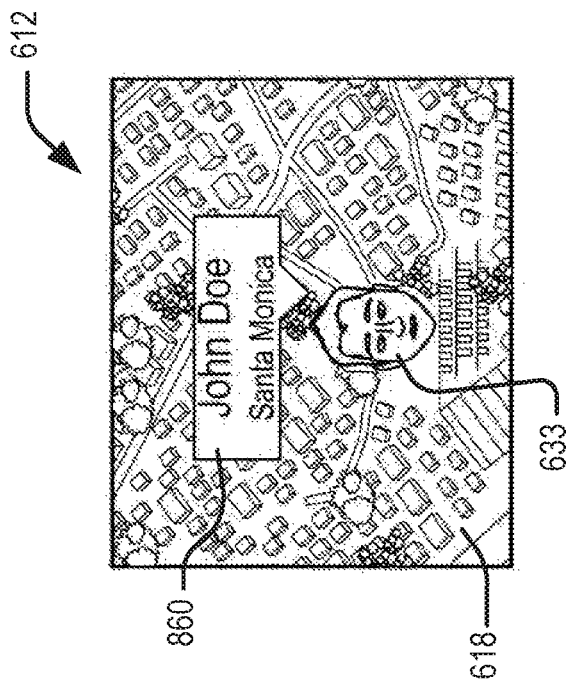
FIGS. 8A-8C are respective screenshots of a map-based graphical user interface, providing features relating to display of user icons in a map forming part of the interface, according to an example embodiment.
Figure 8A:
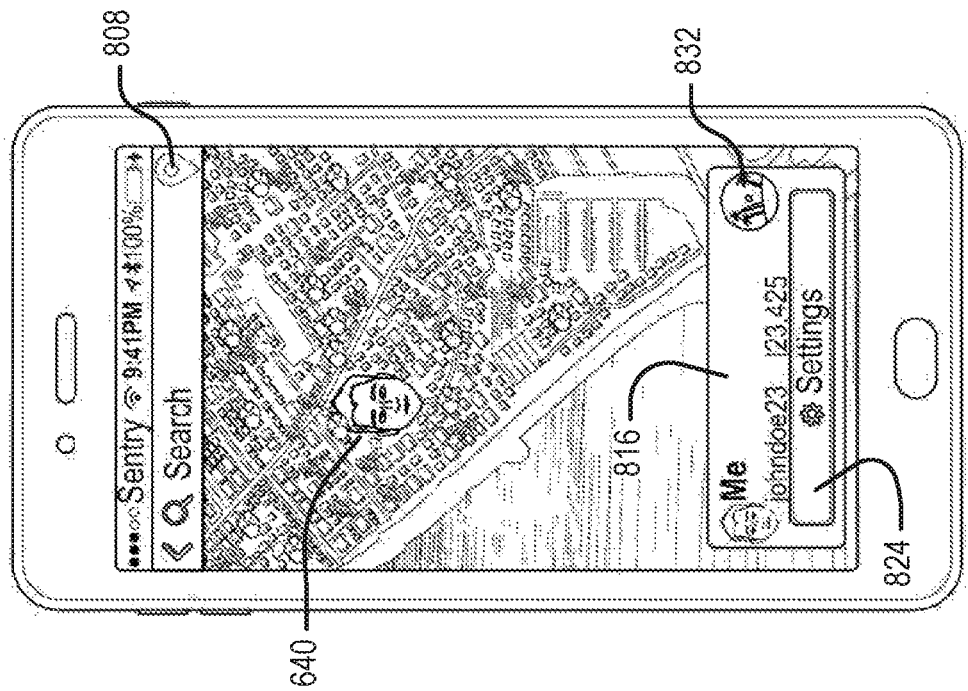
Figure 8B:
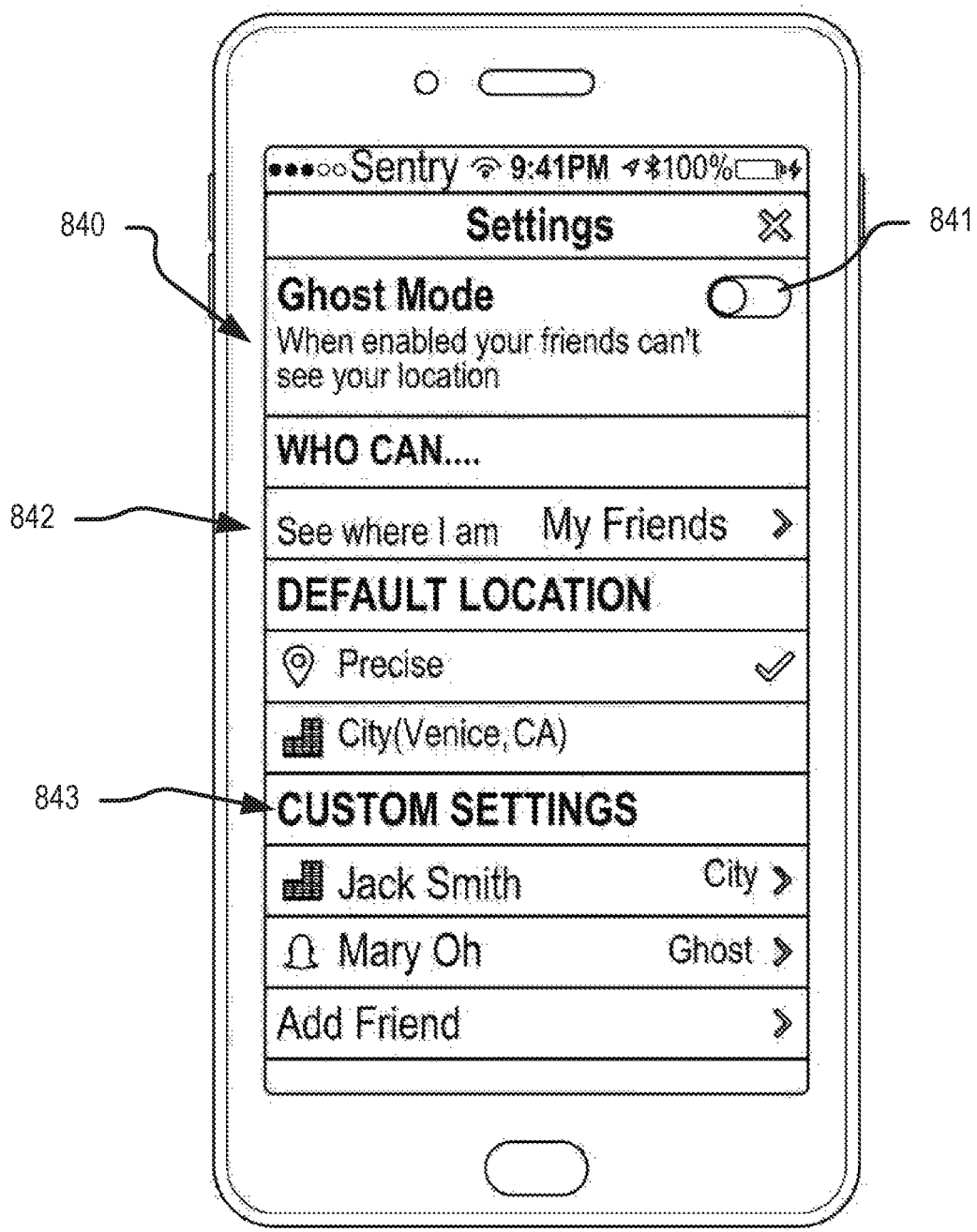

FIGS. 8A-8C are respective screenshots of a map-based graphical user interface, providing features relating to display of user icons in a map forming part of the interface, according to an example embodiment.

FIGS. 9A and 9B are respective screenshots of the functionalities of a map-based graphical user interface that provides access to a chat interface and to friend content via a friend icon displayed as part of the map, according to an example embodiment.

FIGS. 10A-10D is a series of screenshots of search interfaces provided as part of a map-based graphical user interface, according to respective example embodiments.

Figure 11A:
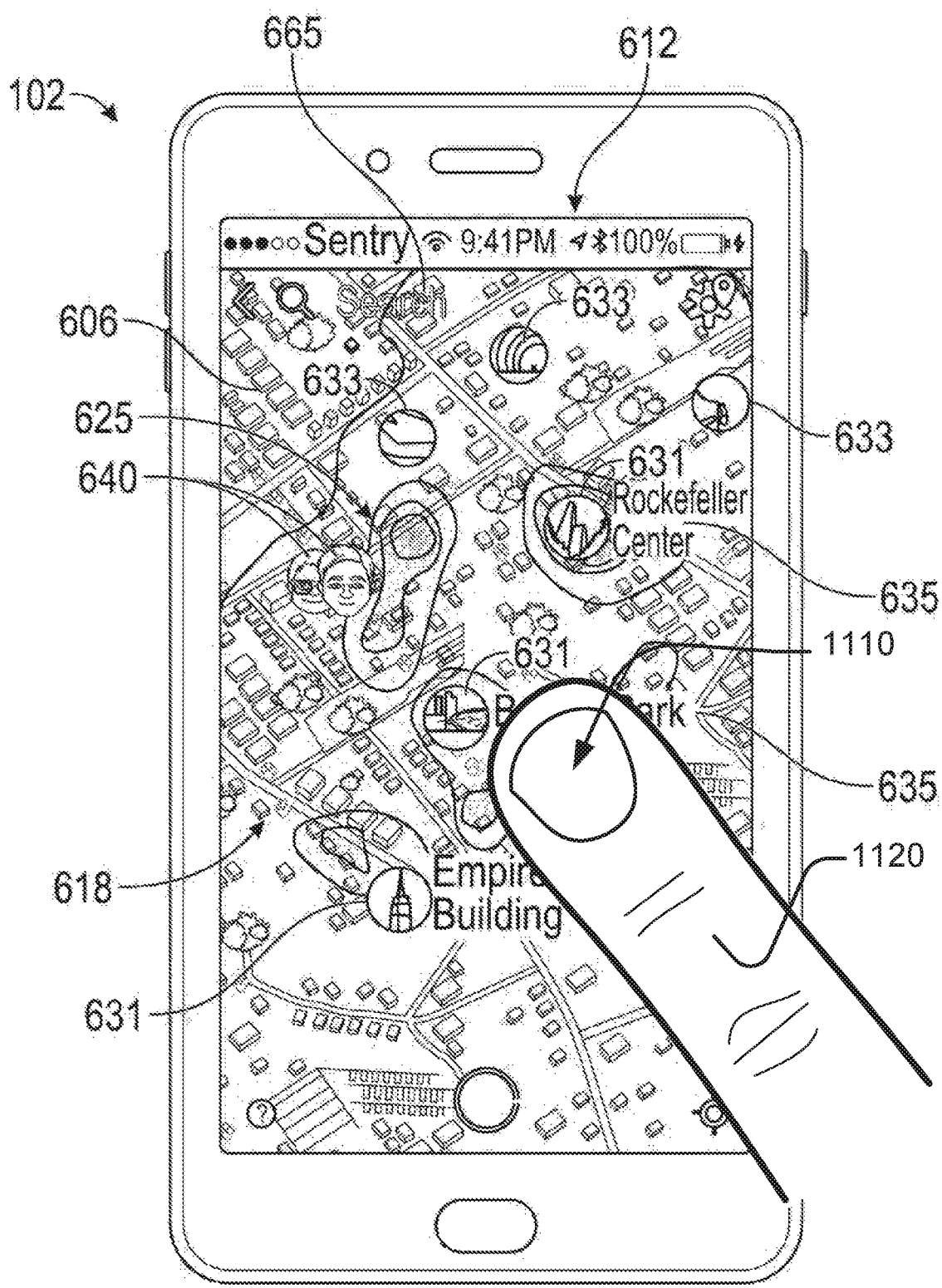
FIGS. 11A-11B is a series of schematic screenshots illustrating a location-based search mechanism provided by a map-based graphical user interface, according to one example embodiment.
Figure 11B:
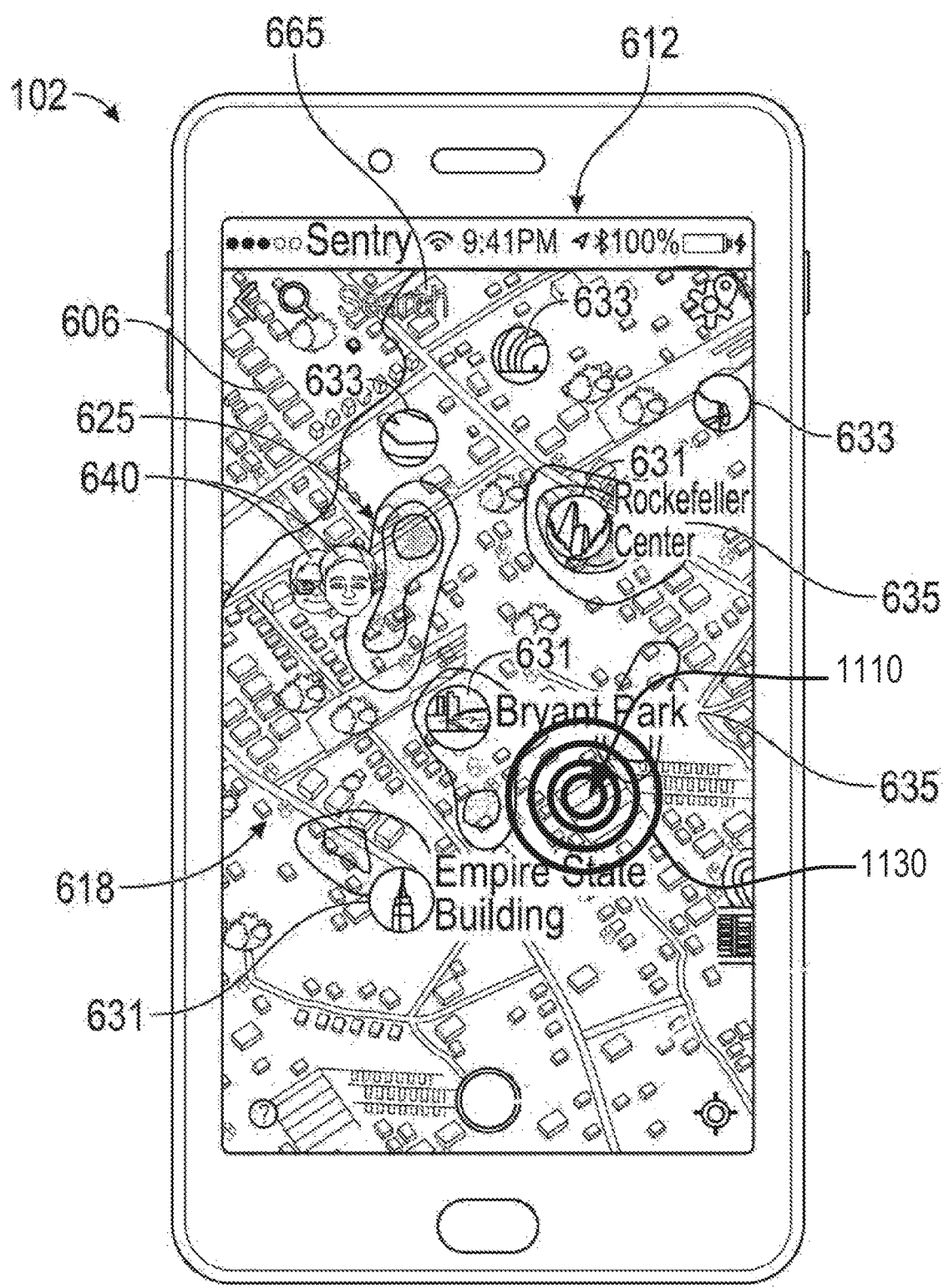

FIGS. 11A-11B is a series of schematic screenshots illustrating a location-based search mechanism provided by a map-based graphical user interface, according to one example embodiment.

The headings provided herein are merely for convenience and do not necessarily affect the scope or meaning of the terms used.

DESCRIPTION

One aspect of the disclosure provides a geographical map-based graphical user interface (GUI) for a social media platform or application, to allow user access via the map-based GUI to ephemeral social media content. Such an interface is also referred to herein as a "map GUI."

As will be described in greater detail below, ephemeral social media content comprises social media items that are available for viewing via the social media application for only a limited period. For example, an ephemeral social media item or message (also referred to herein as a "snap") submitted by a user to the social media application may be available for viewing by other users via the map GUI of the social media application for only a predefined period subsequent to submission. In one example embodiment, each ephemeral item or snap has an availability lifetime (also referred to herein as a "gallery participation timer") of 24 hours after submission, after which the ephemeral item "disappears" and is no longer available for viewing by other users via the map GUI. Such ephemeral social media items (also referred to herein as ephemeral messages) typically comprise photographic or video content, which may be submitted with or without augmentations made by the user to the underlying photographic or video content.

Ephemeral messages submitted by multiple different users may be available on a map forming part of the map GUI based at least in part on respective location information (e.g., geotag information) of the ephemeral messages. In some embodiments, the map GUI may provide location-based access to one or more collections of ephemeral social media items (also known as and referred to herein as galleries or "stories"). In some example embodiments, a plurality of ephemeral messages submitted by different users are included in a common geo-anchored gallery or story based at least in part on respective geotagging information of the plurality of ephemeral messages. Such a location-based gallery or story is in some embodiments represented on the map GUI by a respective gallery icon displayed at a corresponding map location, the gallery icon being selectable by the user to trigger automated sequential display of the plurality of ephemeral messages in the gallery on the user device on which the map GUI is rendered.

In some embodiments, such a map GUI includes representations (e.g. by means of friend icons or bitmojis) of at least approximate respective positions of a user's friends in a social network graph accessed by the social media application, with the social media application enabling the user to explore the world around friends' locations by use of the GUI. Thus, the map GUI can in some embodiments enable the user to explore uploaded social media content (e.g., individual photos or video clips/snaps, or social media galleries such as stories comprising respective collections of photos, messages, or snaps).

DETAILED DESCRIPTION

The description that follows includes systems, methods, devices, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the disclosed subject matter may be practiced without these specific details. In general, well-known instruction instances, protocols, structures, and techniques are not necessarily shown in detail.

System Architecture and Operating Environment

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as "messages." Thus, the term "messages" as used herein is not limited to communications from one user to specified recipient users, but includes messages made available for public consumption via the relevant social media platform.

The social media platform system 100 includes multiple client devices 102, each of which hosts a number of applications including a social media client application 104. Each social media client application 104 is communicatively coupled to other instances of the social media client application 104 and a social media application server system 108 via a network 106 (e.g., the Internet).

Accordingly, each social media client application 104 is able to communicate and exchange data with another social media client application 104 and with the social media application server system 108 via the network 106. The data exchanged between social media client applications 104, and between a social media client application 104 and the social media application server system 108, includes functions (e.g., commands to invoke functions) as well as payload data (e.g., text, audio, video, or other multimedia data).

The social media application server system 108 provides server-side functionality via the network 106 to a particular social media client application 104. While certain functions of the social media platform system 100 are described herein as being performed by either a social media client application 104 or by the social media application server system 108, it will be appreciated that the location of certain functionality either within the social media client application 104 or the social media application server system 108 is a design choice. For example, it may be technically expedient to initially deploy certain technology and functionality within the social media application server system 108, but to later migrate this technology and functionality to the social media client application 104 where a client device 102 has a sufficient processing capacity.

The social media application server system 108 supports various services and operations that are provided to the social media client application 104. Such operations include transmitting data to, receiving data from, and processing data generated by the social media client application 104. This data may include message content, client device information, geolocation information, media annotations and overlays, message content persistence conditions, social network information, and live event information, as examples. Data exchanges within the social media platform system 100 are invoked and controlled through functions available via user interfaces (UIs) of the social media client application 104.

Turning now specifically to the social media application server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the social media client application 104 in order to invoke functionality of the application server 112. The API server 110 exposes various functions supported by the application server 112, including account registration; login functionality; the sending of messages, via the application server 112, from a particular social media client application 104 to another social media client application 104; the sending of media files (e.g., images or video) from a social media client application 104 to a social media server application 114, for possible access by another social media client application 104; the setting of a collection of media data (e.g., a story or gallery); the retrieval of such collections; the retrieval of a list of friends of a user of a client device 102; the retrieval of messages and content; the adding and deletion of friends to and from a social graph; the location of friends within a social graph; opening an application event (e.g., relating to the social media client application 104); and so forth.

The application server 112 hosts a number of applications and subsystems, including the social media server application 114, an image processing system 116, and a social network system 122. The social media server application 114 implements a number of message processing technologies and functions, particularly related to the aggregation and other processing of content (e.g., textual and multimedia content) included in messages received from multiple instances of the social media client application 104. As will be described in further detail, the text and media content from multiple sources may be aggregated into collections of content (e.g., called "stories" or "galleries"). These collections are then made available, by the social media server application 114, to the social media client application 104. Other processor- and memory-intensive processing of data may also be performed server-side by the social media server application 114, in view of the hardware requirements for such processing.

The application server 112 also includes the image processing system 116, which is dedicated to performing various image processing operations, typically with respect to images or video received within the payload of a message at the social media server application 114.

The social network system 122 supports various social networking functions and services, and makes these functions and services available to the social media server application 114. To this end, the social network system 122 maintains and accesses an entity graph 304 (described below with reference to FIG. 3) within the database 120. Examples of functions and services supported by the social network system 122 include the identification of other users of the social media platform system 100 with whom a particular user has relationships or whom the particular user is "following," and also the identification of other attributes and interests of a particular user. In some embodiments, the social network system 122 includes an identification of other users whose location is available for viewing by a particular user via a map-based GUI displayable on a client device 102 using the corresponding social media client application 104.

Figure 2:
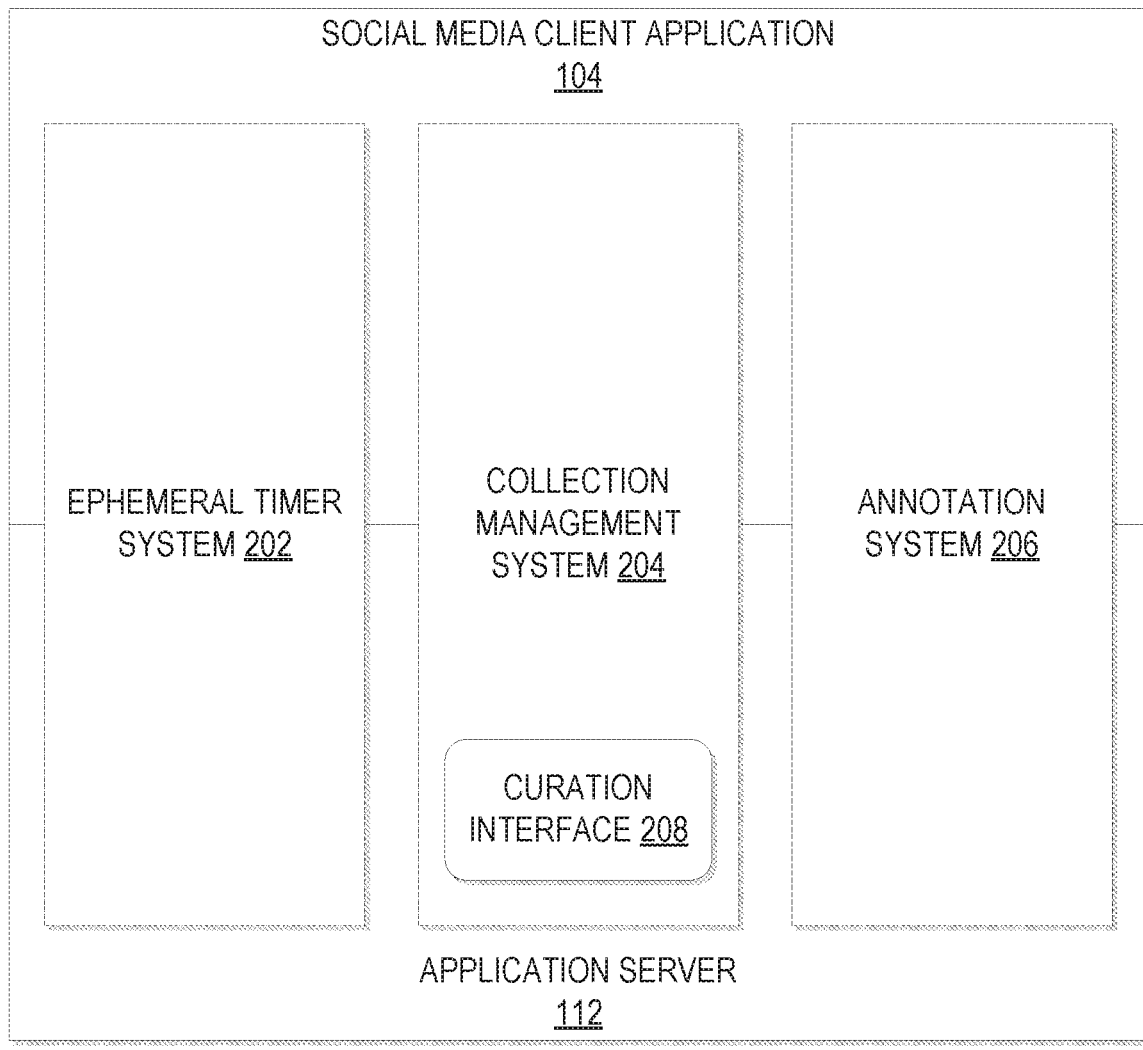
FIG. 2 is a block diagram illustrating further details regarding a social media platform system, according to example embodiments.

FIG. 2 is a block diagram illustrating further details regarding the social media platform system 100, according to example embodiments. Specifically, the social media platform system 100 is shown to comprise the social media client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the social media client application 104 and the social media server application 114. To this end, the ephemeral timer system 202 incorporates a number of timers that, based on duration and display parameters associated with a message, or collection/gallery of messages (e.g., a SNAPCHAT story), selectively display and enable access to messages and associated content via the social media client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates, or until expiry of a last message or snap in the gallery. For example, content relating to a music concert may be made available as a "story" for the duration of that music concert. The collection management system 204 may also be responsible for publishing an icon that provides notification of the existence of a particular collection to the user interface of the social media client application 104. As will be described in greater detail with reference to the specific example embodiments that follow, the collection management system 204 may also be responsible for compiling and managing multiple location-based social media galleries based at least in part on geo-tag data of social media items or messages uploaded to the social media platform by multiple users. Other types of galleries that may be provided by the collection management system 204 include a "place story" that collects ephemeral messages having geotag data indicating a location within a predefined associated geographical area; and an ad-hoc story or spike story that is dynamically surfaced on a map GUI as described herein based on underlying location-based social media activity, e.g., based on geo-temporal volume or anomality/unusualness of social media items submitted by users for public consumption (e.g., for inclusion in a "Live Story" or "Our Story"). With "anomality" is meant is metric indicating a how anomalous something is.

The collection management system 204 furthermore includes a curation interface 208 that allows a human operator (e.g., a collection manager) to manage and curate a particular collection of content. For example, the curation interface 208 enables an event organizer to curate a collection of content relating to a specific event (e.g., to delete inappropriate content or redundant messages). Instead, or in addition, the collection management system 204 may employ machine vision (or image recognition technology), geotag data, and/or content rules to automatically compile and/or curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise augment, modify, or edit media content associated with a message. For example, the annotation system 206 provides functions related to the generation and publishing of media overlays for messages processed by the social media platform system 100. The annotation system 206 operatively supplies a media overlay (e.g., a SNAPCHAT filter) to the social media client application 104 based on a geolocation of the client device 102. In another example, the annotation system 206 operatively supplies a media overlay to the social media client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph taken by the client device 102. In another example, the media overlay includes an identification of a location overlay (e.g., Venice Beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
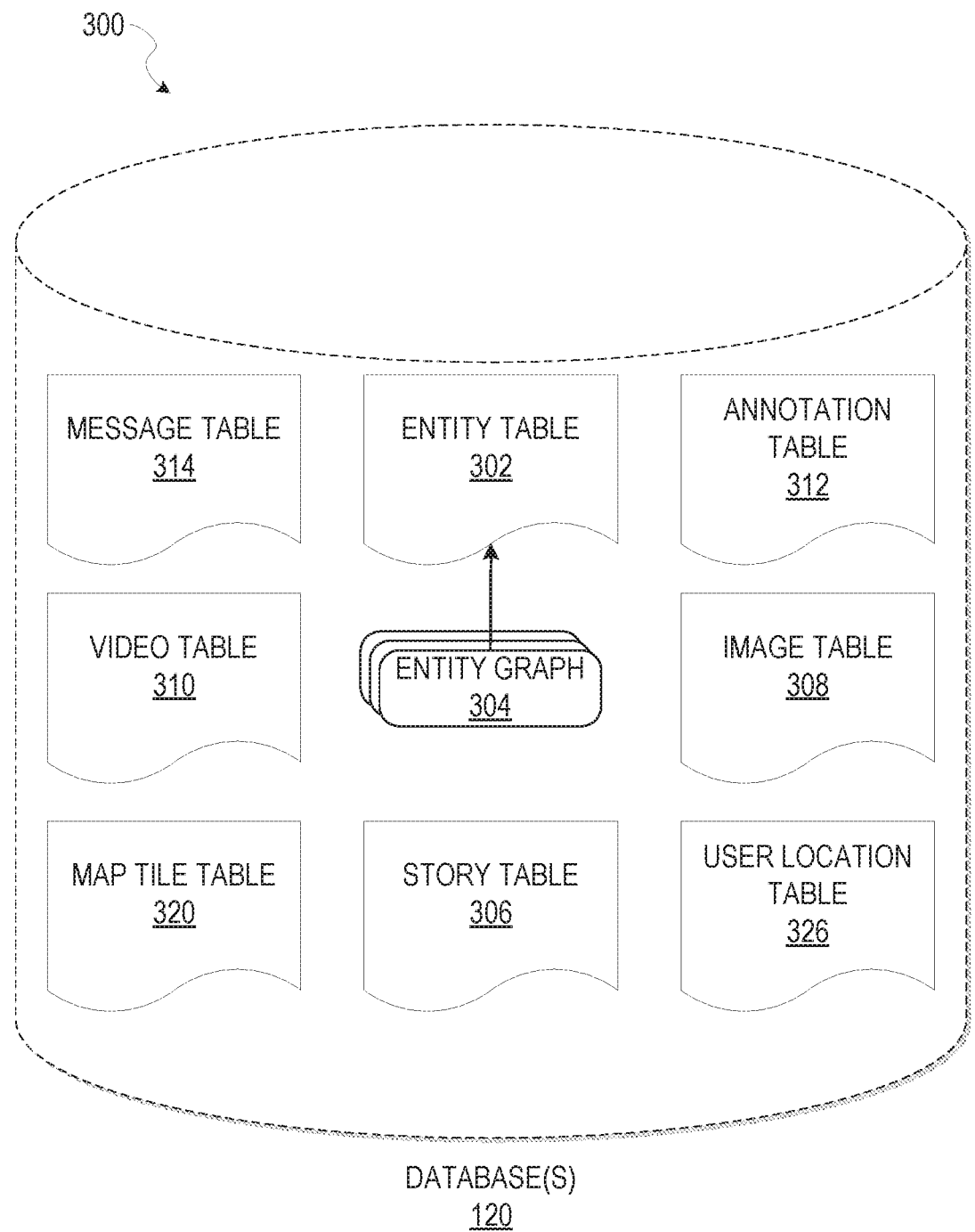
FIG. 3 is a schematic diagram illustrating data which may be stored in a database of the social media platform system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300 which may be stored in the database 120 of the social media application server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the social media application server system 108 stores data may be a recognized entity. Each entity is provided with a unique identifier, as well as an entity type identifier (not shown).

The entity graph 304 furthermore stores information regarding relationships and associations between entities. Such relationships may be social professional (e.g., work at a common corporation or organization), interested-based, or activity-based, merely for example.

The database 120 also stores annotation data, including in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the social media client application 104 when the sending user is composing a message. Other types of filters include geolocation filters (also known as geo-filters), which may be presented to a sending user based on geographic location. For example, geolocation filters specific to a neighborhood or special location may be presented within a user interface by the social media client application 104, based on geolocation information determined by a Global Positioning System (GPS) unit of the client device 102. Another type of filter is a data filter, which may be selectively presented to a sending user by the social media client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

Yet further annotation data that may be stored within the annotation table 312 is user-generated annotations or augmentations provided by the user to overlay an underlying photographic image or video. Such augmentations/annotations can include, for example, text annotations and drawing annotations or augmentations provided by the user, e.g., via a client device touchscreen.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the social media client application 104 may include an icon that is user selectable to enable a sending user to add specific content to his or her personal story. In the context of this description, such messages and stories/galleries are understood to be for private consumption, being limited for viewing via the social media application to particular users identified by the submitting user or to users who are members of a social network of the submitting user. This is to be contrasted with social media items provided for public or non-private consumption via the social media application, not being limited to a user-specific or user-specified subset of all users of the social media application. An example of a publicly viewable collection or gallery is a "Live Story" or "Our Story."

As mentioned, a collection may also constitute a "Live Story." which is a collection of content from multiple users that is created manually, automatically, or using a combination of manual and automatic techniques. For example, a "Live Story" may constitute a curated stream of user-submitted content from various locations and events. Users whose client devices have location services enabled and are at a common event location at a particular time may, for example, be presented with an option, via a user interface of the social media client application 104, to contribute content to a particular Live Story. The Live Story may be identified to the user by the social media client application 104, based on his or her location. The end result is a "Live Story" told from a community perspective. In accordance with some example embodiments of this disclosure, a submitting user can submit social media items or messages to a non-specific common Live Story. Such content is accessible to other users via a map-based graphical user interface, with such social media items or messages being accessible via the map GUI based on a respective location indicated by corresponding geo-tag data, either by forming part of a location-based gallery or story, or by such other users using location-based search mechanisms forming part of the map GUI.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus). In some embodiments of this disclosure, a message uploaded to a Live Story or Our Story generally, without the user specifying a particular location story in which the message is to be included, can automatically or semi-automatically be included in a location story based at least in part on geo-tag data of the message.

A map tile table 320 stores multiple map tiles that can be used for presenting a map in a map viewport of a map-based GUI, according to some embodiments of this disclosure. In a particular example embodiment, each map view is composed of 9 or 16 map tiles stitched together. A plurality of sets of map tiles may be maintained for different map zoom levels. In some example embodiments, a superset of map tiles is maintained server-side, being forwarded to a requesting client device 102 for composing a map representation of specific requested areas.

A user location table 326 stores current or most recent user location data for multiple users of the social media application. The user location data may be based on location data received from respective client devices 102 associated with the respective users. Such user location data is in some example embodiments used to display in a map-based GUI respective locations of a plurality of users who form part of the social network of the requesting user and/or who have provided permission for the requesting user to view their locations. Each such user may be represented on a map forming part of the map GUI by a respective user icon or bitmoji.

Figure 4:
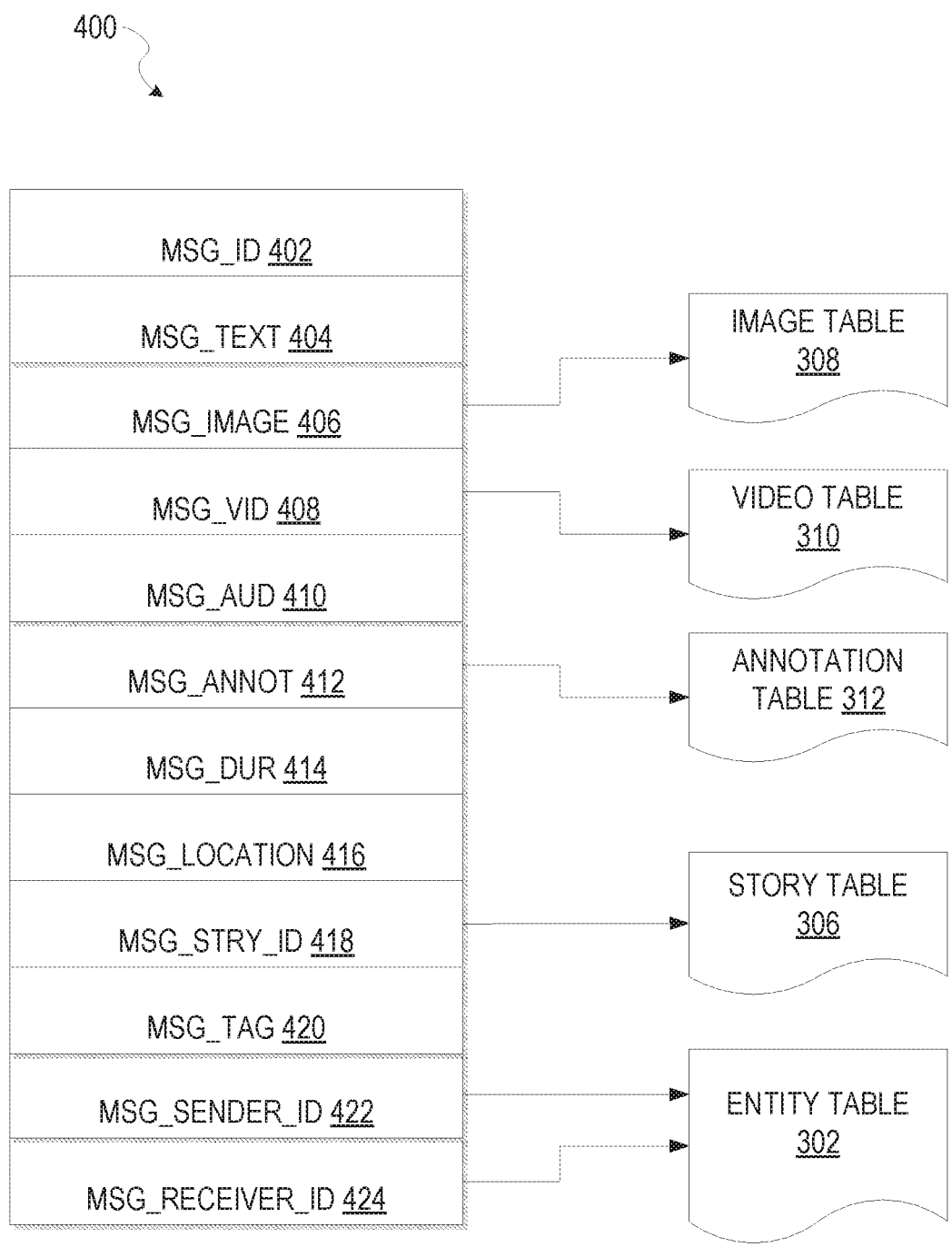
FIG. 4 is a schematic diagram illustrating a structure of a message, according to some embodiments, generated by a social media client application according to example embodiments.

FIG. 4 is a schematic diagram illustrating a structure of a social media item or message 400, according to some embodiments, generated by one instance of the social media client application 104 for communication to a further instance of the social media client application 104 or to the social media server application 114. The content of a particular message 400 is used to populate the message table 314 stored within the database 120, accessible by the social media server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotation 412: annotation data (e.g., filters, stickers, or other enhancements) that represents annotations to be applied to the message image payload 406, message video payload 408, or message audio payload 410 of the message 400.

A display duration parameter 414: a parameter value indicating, in seconds, the amount of time for which content of the message (e.g., the message image payload 406, message video payload 408, and message audio payload 410) is to be presented or made accessible to a user via the social media client application 104. The display duration parameter 414 is also referred to herein as a "display duration timer."

A message geolocation parameter 416: geolocation data or geo-tag data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values. An example of such a message story identifier 418 can in some embodiments comprise one or more thumbnail images.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotation 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
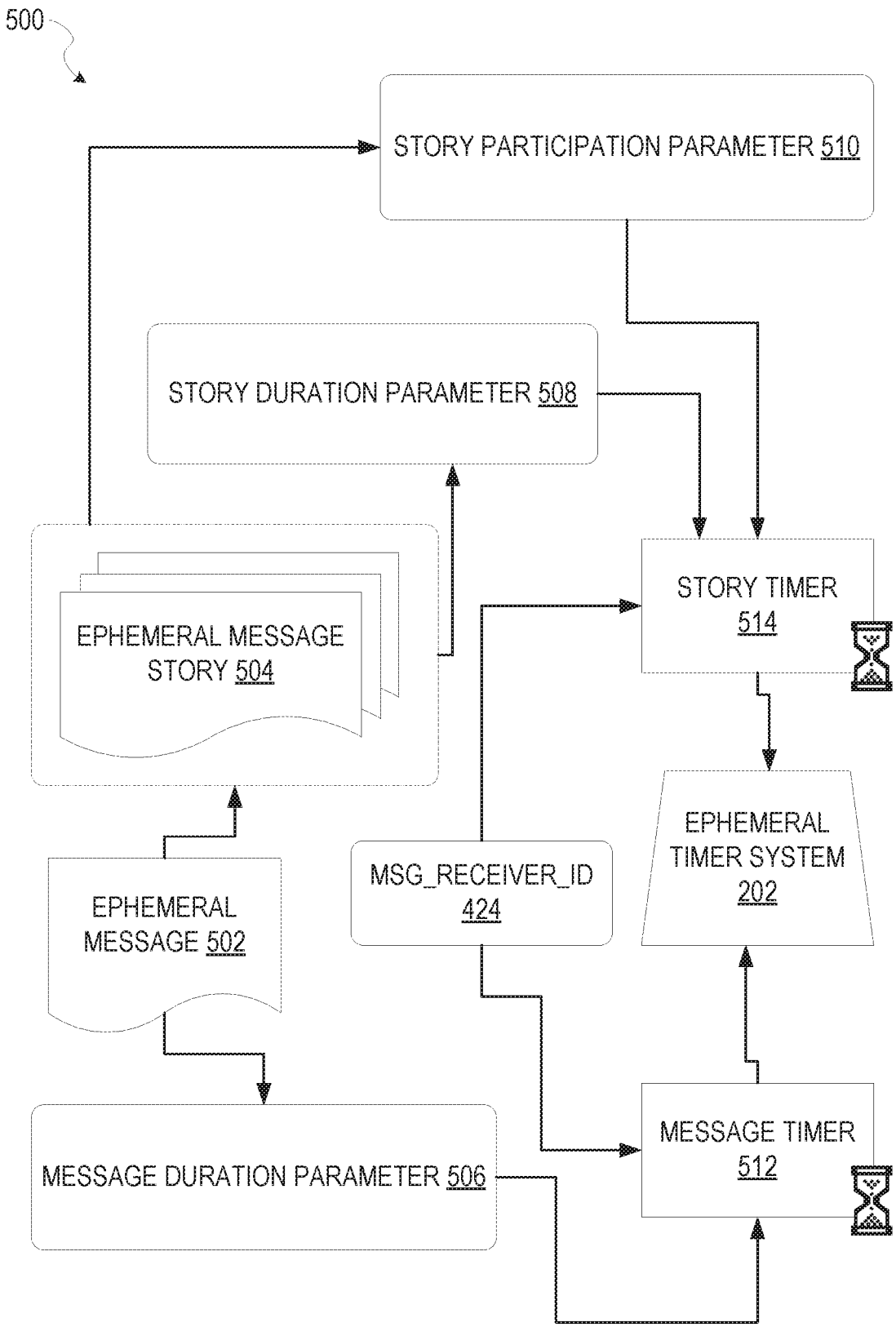
FIG. 5 is a schematic diagram illustrating an example access-limiting process, in terms of which access to content (e.g., an ephemeral message, and associated multimedia payload of data) or a content collection (e.g., an ephemeral message gallery or story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a display duration parameter 506, the value of which determines an amount of time that the ephemeral message 502 will be displayed to a receiving user of the ephemeral message 502 by the social media client application 104. In one embodiment, where the social media client application 104 is a SNAPCHAT client application, an ephemeral message 502 is viewable by a receiving user for up to a maximum of 10 seconds, depending on the amount of time that the sending user specifies using the display duration parameter 506. In some embodiments, the system automatically attaches a default display duration parameter 506 to photographic or still-image messages, e.g., having a default display duration of 5 seconds. The display duration parameter 506 of video-based messages may automatically correspond to the duration of the underlying video, with an automatically enforced upper limit. Thus, in an example embodiment in which an upper limit of 10 seconds is enforced, a 7-second video message will have a display duration parameter of 7 seconds.

The display duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the display duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within a social media gallery in the form of an ephemeral message story 504 (e.g., a personal SNAPCHAT story, or an event story). The ephemeral message story 504 has a story duration parameter 508, a value of which determines a time duration for which the ephemeral message story 504 is made available and is accessible to users of the social media platform system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504. In some embodiments, the story duration parameter 508 is determined based at least in part on respective story participation parameters 510 (or lifetimes) of one or more of the ephemeral messages 502 forming part of the particular ephemeral message story 504. In one example embodiment, the story duration parameter 508 corresponds to a story participation parameter 510 or lifetime of a last-posted one of the ephemeral messages 502 in the relevant ephemeral message story 504. In such a case, the ephemeral message story 504 expires (e.g., by becoming unavailable for viewing via the social media platform) when the last-posted ephemeral message 502 therein expires (e.g., when a story participation parameter 510 or lifetime of the last ephemeral message 502 expires).

As alluded to above, each ephemeral message 502 within the ephemeral message story 504 has an associated story participation parameter 510 (also referred to herein as a "gallery participation parameter" or a "gallery participation timer"), a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, first, whether a particular ephemeral message 502 of the ephemeral message story 504 will be displayed to a particular receiving user, and, if so, for how long. Note that the ephemeral message story 504 is also aware of the identity of the particular receiving user as a result of the message receiver identifier 424.

Accordingly, the story timer 514 in some embodiments operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a respective display duration parameter 506 may still determine the duration of time for which a particular ephemeral message 502 is displayed to a receiving user upon replay of the ephemeral message 502, even within the context of the ephemeral message story 504. Accordingly, the display duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508. Note that in this disclosure, at least some ephemeral messages 502 may be submitted by the user to the social media application for general or public viewing via the map-based GUI, without being included by the user in any particular event gallery and without being included in any location-based gallery represented by a respective gallery icon on the map GUI. Such ephemeral messages 502 in some embodiments also have respective story participation parameters 510 specifying time periods for which the ephemeral messages 502 are accessible via the map GUI as part of a collective Live Story or Our Story, as described with reference to specific example embodiments below. In a particular example embodiment, each ephemeral message 502 thus submitted for public or non-private view has a default gallery participation parameter or story participation parameter 510 of 24 hours. Such ephemeral messages 502 are thus viewable via the map GUI for only 24 hours after submission.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the social media platform system 100 (and, for example, specifically the social media client application 104) to cause an indicium (e.g., an icon) associated with the relevant ephemeral message story 504 to no longer be displayed within a user interface of the social media client application 104. Similarly, when the ephemeral timer system 202 determines that the story participation parameter 510 for a particular ephemeral message 502 has expired, the ephemeral timer system 202 causes the social media client application 104 to no longer display an indicium (e.g., an icon or textual identification) associated with the ephemeral message 502.

Example Embodiments of Map GUI Functionality

First, various aspects and features of the disclosure will be described conceptually with respect to specific example embodiments discussed with reference to and illustrated in FIGS. 6A-11B.

Basic Map GUI Architecture

FIG. 6A shows an example embodiment of a map-based graphical user interface, further referred to as a map GUI 612, displayed on a client device 102 in the example form of a mobile phone. In this example embodiment, the map GUI 612 is generated on a display in the form of a touchscreen 606 capable of receiving haptic input. The map GUI 612 includes an interactive map 618 showing a stylized aerial or satellite representation of a particular geographical area. The map 618 is displayed within a map viewport 621 which, in this example embodiment, uses the full available area of the touchscreen 606. In other example embodiments, the map viewport 621 may be a bounded panel or window within a larger display screen. The map GUI 612 further comprises a plurality of user-selectable graphical user interface elements displayed at specific respective geographic locations on the map 618. Each such geo-anchored GUI element is in this example embodiment represented by a respective indicium or icon overlaid on the map 618. The different types of icons and their respective functionalities will be described in greater detail below. As will also be described briefly, the map GUI 612 may further include one or more informational overlays rendered over the underlying geographical map 618, in this example embodiment including a heatmap 625 representative of the geographical distribution of underlying social media activity on the social media platform provided by the relevant social media application.

As mentioned, the map GUI 612 includes a number of different user-selectable icons or UI elements that indicate different geographically based content or information. In this example embodiment, the map GUI 612 includes a plurality of different gallery icons, also referred to in this description as "story icons." Each story icon corresponds in location on the map 618 to a respective location-based social media gallery or collection, in this example embodiment corresponding to a location-based story of ephemeral messages in the example form of so-called "snaps." as discussed elsewhere herein. Each of these stories that are represented by respective story icons on the map 618 consists of a respective set of snaps (respectively comprising augmented or unaugmented photographic or video content) that are grouped together based at least in part on respective geo-tag data associated with respective snaps.

In the example embodiment of FIG. 6A, the map GUI 612 includes two different types of gallery icons for two different respective types of location-based social media galleries, namely place icons 631 for place galleries/stories, and spike icons 633 for spike galleries/stories that are dynamically surfaced on the map GUI 612 based on one or more metrics of underlying social media activity relating to the submission of social media items/snaps to the social media platform with geo-tag data indicating the respectively associated geographical areas. Note that these different types of galleries are represented by different types of icons 631, 633. The differences between these different types of galleries and the corresponding visually distinct gallery icons 631, 633 are discussed later herein. The map GUI 612 in this example embodiment further includes friend icons in the example form of bitmojis 640 that are displayed on the map GUI 612 based on the current or last known geographic location of respective friends of the user associated with the client device 102.

Message and/or Story Ephemerality

In this example embodiment, the social media items that are selectively playable by selection of the corresponding story icons 631, 633 in the map GUI 612 are ephemeral social media items or messages. As described previously, ephemeral content is social media content (e.g., augmented and/or unaugmented video clips, pictures, and/or other messages) that is available for viewing by social media users via the map GUI 612 for only a predetermined limited period, also referred to herein as a respective gallery participation parameter or timer. After expiry of a respective gallery participation parameter or timer for any ephemeral message or snap uploaded by a particular user, that ephemeral message or snap is no longer available for viewing by other users via the map GUI 612 generated on their respective client devices 102. Current examples of such ephemeral social media content include the respective snaps or messages included in so-called "stories" in the SNAPCHAT or the INSTAGRAM social media applications.

Instead of, or in addition to, management of ephemerality on a per-snap level using respective gallery participation timers, availability of the ephemeral messages by the map GUI 612 can in some instances be managed collectively, e.g., on a per-story level. In such instances, each story can have a respective story duration parameter 508 (e.g., being based on a corresponding story timer 514—see FIG. 5), at the expiry of which availability of the corresponding story for viewing via the map GUI 612 is terminated. In some embodiments, the story duration parameter 508 is calculated based on the story participation parameter 510 of one of the ephemeral messages included in the relevant story. For example, a story may in some embodiments expire when a last uploaded item within the story expires, in response to which the corresponding story icon 631, 633 is no longer displayed on the map GUI 612. In one example embodiment, the map GUI 612 may include one or more event icons (e.g., similar in appearance to the place icons 631 of FIG. 6A) corresponding to respective event stories, with the story duration parameter 508 of the event story being set to expire a predetermined period of time from the start or conclusion of the underlying event. At expiry of the story duration parameter 508, the corresponding gallery icon 631, 633 is removed from the map GUI 612, irrespective of individual timers associated with respective snaps included in the event story.

Story Playback

The user can select any one of the gallery icons 631, 633 by haptic contact with the touchscreen 606 at the on-screen location of the selected gallery icon 631/633. In response to such selection, automated sequential playback of the corresponding set of ephemeral messages or snaps in the selected story is performed by the client device 102 on the touchscreen 606. Such automated sequential playback of the selected story consists of:

displaying on the touchscreen 606 the content or media payload of a first one of the ephemeral messages for a corresponding display duration (e.g., a default value of five seconds for photo-based messages and a maximum value of 10 seconds for video-based snaps), in this example embodiment temporarily replacing the map GUI 612 on the touchscreen 606 with a full-screen replay of the relevant snap;

at expiry of the display duration, displaying the content of the next snap/message for its display duration; and thus progressing in sequence through all of the ephemeral messages in the selected story until all of the snaps in the story have been replayed or until the user selectively dismisses the playback sequence.

In some embodiments, not all of the snaps in a particular story/gallery are necessarily included in the replay sequence. For example, if there are many overlapping snaps (e.g., snaps showing substantially identical content), some of those snaps are automatically skipped to keep a continuous narrative and not repeat some sections of an event commonly captured by the different snaps. Instead, or in addition, the social media server application 114 can in some embodiments be programmed automatically to identify and curate overlapping or contemporaneous snaps based on timestamp information associated with respective snaps.

In this example embodiment, the snaps automatically collected together in a replayable spike story or place story are arranged automatically to be played back in chronological order based on respective timestamps (e.g., being played in sequence from oldest to newest or earliest posted to most recently posted). A benefit of such chronological playback is that viewing of the story provides a user with sequentially arranged views of events transpiring at the relevant location. In some instances, however, a human curator may choose to rearrange snaps out of chronological order, for example to improve the narrative flow of the story. In other embodiments, the snaps may be played in reverse chronological order, from newest to oldest.

It can thus be seen that the example map GUI 612 includes multiple location-based gallery icons in the example form of story icons 631, 633 that are user-selectable to trigger playback of respective collections of ephemeral social media items, in this example embodiment being respective ephemeral stories consisting of respective sets of ephemeral messages (also referred to in this description as "snaps"). In this example embodiment, each of the plurality of location-based stories represented by the respective story icons 631, 633 may comprise media content contributed by multiple different users.

Our Story and Publication of Ephemeral Messages to Our Story

The respective ephemeral stories are in this example embodiment compiled from ephemeral messages submitted by multiple users based at least in part on geo-tagging of the respective snaps. Note that the ephemeral messages made available for viewing via the map GUI 612 are in this example embodiment not limited to content provided by other users who are members of an in-application social network of the user on whose client device 102 the map GUI 612 is generated. Instead, the social media content to which the map GUI 612 allows access is in this example embodiment provided by snaps uploaded or submitted by any user to be publicly accessible via the map GUI 612.

One aspect of the example map GUI 612 provides for the functionality for users to submit social media content that is generally accessible via the map GUI 612. Turning briefly to FIG. 7A, therein is shown an example embodiment of a destination selection interface 707 forming part of the map GUI 612 to provide a mechanism that gives the user a selectable option to make a snap generally accessible via the map GUI 612 upon capturing of the snap. With general accessibility is meant that the relevant social media item is posted to be viewable not only by specifically designated recipients, but that it is published for viewing by other users on the social media platform in general. Snaps that are in this manner generally accessible also referred to herein as being publicly viewable or publicly available.

In this example embodiment, snaps can be captured via the map GUI 612 while the map viewport 621 is displayed (as seen in FIG. 6A) by operation of a camera soft button 650 (FIG. 6A) forming part of the map GUI 612. After capturing of photo or video content by operation of the camera soft button 650, the captured media content is displayed on the touchscreen 606 (FIG. 7A) together with the destination selection interface 707. In this example embodiment, the user can select one or both destination options identified in FIG. 7A as "My Story" and "Our Story," represented in FIG. 7A by respective radio buttons 714, 721. By selecting the Our Story radio button 721 and thereafter selecting a "Send" soft button 728, the user can submit the snap over the network 106 to the application server 112 with an indication that the snap is available for non-private publication via the map GUI 612. If the snap is not so marked by the user, for example being associated with selection of the My Story radio button 714 only, then the snap is not available for inclusion in any of the stories associated with the story icons 631, 633 and is not available for inclusion in search results of a location-based search via the map GUI 612, as described later herein. Snaps included only in the My Story gallery are available only to friends of the user (e.g., members of the uploading user's social network). The My Story gallery is a per-user location-agnostic gallery of ephemeral messages available to friend users only, thus being a non-public or private gallery.

In other example embodiments described herein, the superset of ephemeral messages made available by multiple users for public viewing via the map GUI 612 is alternatively referred to as the "Live Story" or simply as a "Live" gallery. For the purposes of the description of example embodiments herein, "Live Story" and "Our Story" are thus to be read as being synonymous. In the present example embodiment, the compilation and/or surfacing of gallery icons 631, 633 and the rendering of the heatmap 625 are based exclusively on publicly available social media content provided by snaps uploaded to Our Story. Calculation of metrics or attributes of social media activity upon which one or more aspects of the map GUI 612 are based (e.g., an unusualness or anomaly metric indicating geo-temporal unusualness or anomaly of social media activity within respective geographical areas) is in this example embodiment likewise based exclusively on snaps uploaded to Our Story.

Visual Distinctions Between Story Icons for Different Story Types

Returning now to the visual distinctions or differences between the different types of gallery icons 631, 633, it will be noted that each gallery icon 631/633 in this example embodiment comprises a circular graphical user interface element bearing a thumbnail image provided by the one of the snaps contained in the respective story. Each place icon 631, however, also includes an associated label 635 bearing a text indication of the associated place. In this example embodiment, the labels 635 indicate the respective places of the place stories surfaced in the geographic window presently displayed in the example map 618 as being the Rockefeller Center, Bryant Park, and the Empire State Building, respectively.

In other example embodiments, the visual distinctions between different types of story icons may be provided in a different manner. FIG. 6B, for example, shows another example embodiment of a map GUI 612 that is analogous to the example embodiment of FIG. 6A, a major difference being that the visual distinction between place icons 631 and spike icons 633 is provided at least in part by differently shaped thumbnail images. In the example of FIG. 6B, the thumbnails of the place icons 631 are rectangular, while the thumbnails of the spike icons 633 are circular.

The respective thumbnail images that are used for the spike icons 633 are in the example embodiments of FIGS. 6A and 6B automatically selected by the social media server application 114. In this instance, the thumbnail image for a spike icon 633 is automatically selected based on the posting time of the respective snaps forming part of the corresponding spike story, in this case being selected as a most recently posted snap in the relevant story. In other embodiments, automatic selection of the thumbnail image to be used in the spike icon 633 can be based on selecting the earliest-posted ephemeral message/snap that is still available for viewing as part of the spike story. The thumbnail images for the place icons 631 (or for icons associated with other curated stories, such as event stories) can in some embodiments likewise be selected automatically. In this embodiment, however, the thumbnail images for the place icons 631 can be selected from the snaps included in the corresponding story/gallery by a human operator via a content management interface forming part of the social media server application 114. Absent such an explicit designation of a particular snap to be used for the thumbnail image, thumbnail selection may revert to an automatic default selection as described previously.

Differences Between Different Story Types
Place Stories

Returning to FIG. 6A, the differences between the different types of social media galleries or stories accessible via respective story icons 631, 633 on the map GUI 612 will now be briefly discussed.

Place stories, represented by respective place icons 631, are social media galleries for defined locations or places, typically being places that consistently have relatively large activity volumes (e.g., Times Square, Universal Studios, etc.). Note that, in this example embodiment, not all defined places are by default surfaced in the map GUI 612 by respective place icons 631. Instead, the geo-anchored place stories are surfaced based on the amount of activity (e.g., the raw number of uploaded snaps) captured within a defined geographical area associated with the relevant place, as indicated by associated geo-tag data. This ensures that places that regularly or always attract relatively large volumes of snaps are identified as such on the map 618.

Figure 12:
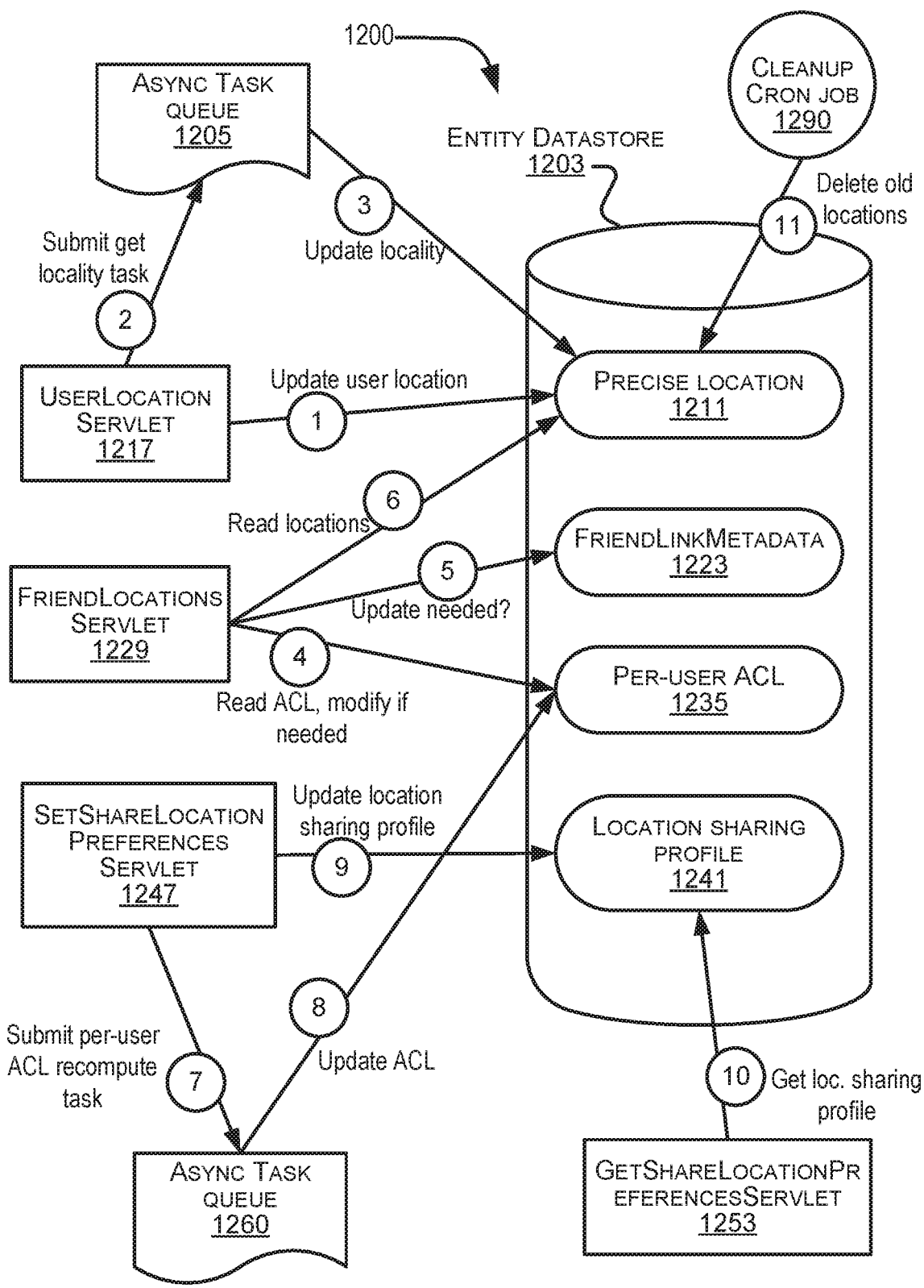
FIG. 12 is a schematic diagram of server-side architecture illustrating a mechanism for serving friend location information for use in a map-based GUI, according to an example embodiment.

Defined places for which place icons 631 may be surfaced in the map GUI 612 are in this example embodiment manually created by one or more human operators using a server-side gallery management system or content management system (CMS) 1224 provided by a server-side social media platform system 1200 (FIG. 12). In this example embodiment, each defined place has:

(a) an associated operator-defined polygon marking its geographical boundaries, that specify a particular geographical area for the place story;
(b) a thumbnail location or icon location, typically lying within the associated polygon, that specifies the on-map position at which the place icon 631 for a gallery or story associated with that place is displayed in the map 618; and
(c) a name by which the place is identified. In the example embodiment of FIG. 6A, this is the name that is displayed on the associated label 635 of the place icon 631.

In other embodiments, such places and associated place stories are automatically identified by historical snap volume. In some such embodiments, the defined places and their associated stories/galleries are created and curated automatically by server-side procedures.

In some instances, each place story includes all of the snaps having geotag information indicating a geographic location lying within the associated polygon. Selection of a particular place icon 631 (e.g., by clicking in a desktop application or by tapping on the touchscreen 606 in the example embodiment of FIG. 6A) in such cases plays all the snaps from within the corresponding polygon. In this example embodiment, the CMS 1224 provides functionality to operators or administrators to curate the collection of snaps associated with any operator-selected defined place (e.g., a particular geographical area defined by the corresponding polygon). The operator or one or more automated procedures can thus, for example, delete individual snaps from the place story, or can select individual snaps for inclusion in the place story.

When snaps are played in response to selection of a place icon 631, the name of the place appears on-screen together with the replayed content or payload of the respective snaps. As mentioned, in this example embodiment, the snap represented by a corresponding thumbnail within the relevant place icon 631 is played first, then the rest in time order.

Spike Stories

The unlabeled circular spike icons 633 are automatically surfaced for geographical areas of unusually high activity, with the respective associated spike stories or ad hoc galleries including unexpired snaps within the associated geographical area. In the example embodiment of FIG. 6A, all ad hoc galleries associated with spike icons 633 are unmoderated, so that selecting a spike icon 633 triggers automated sequential replay of all of the snaps within a geographical area associated with the spike icon 633. In a particular example embodiment, the geographical area associated with the spike icon 633 includes all geographical points located within a predefined radius of the on-map location of the selected spike icon 633.

Thus, clicking or tapping on the spike icon 633 plays all the snaps in that cluster, showing the snap in the thumbnail first and then the rest of the snaps in time order. Note, again, that the snaps clustered under the common spike icon 633 are in this example uploaded by multiple different respective social media users to Our Story, and are uncurated by moderators. In other embodiments, the stories collected under such spike thumbnails may be curated.

Automated selection of spike icons 633 (and therefore of the associated social media gallery, collection, or story) for surfacing in the map GUI 612 is in this example embodiment based at least in part on calculation of respective anomaly or unusualness metric values for different geographical areas. Thus, a higher level of unusualness or anomaly of user activity in a particular geo-temporal space would in such instances increase the likelihood of a particular spike story being surfaced on the map GUI 612 by display of a corresponding spike icon 633. As mentioned, the anomaly metric provides an indication of the level of geo-temporal unusualness or anomaly of social media activity. Calculation of anomaly metrics can in some embodiments comprise calculating a level of deviation between historical activity levels in a given area, and activity levels in a current time window. It will be appreciated that content surfacing increases with an increase in positive anomaly levels (i.e., indicating unusually high social media activity). Also note that, in some embodiments, a social media activity metric (used for heat map generation and/or content surfacing), is based on a combination of factors that include an anomaly metric. In a particular example embodiment, the social media activity metric is provided by a combination of a raw activity metric and an anomaly metric. In the illustrated example embodiments, however, the heatmap 625 reflects snap density, while spike clustering and surfacing is based on an anomaly metric.

Instead, or in addition, human curators can, via the CMS 1224, also mark specific spike stories or clusters as "interesting," thereby boosting the unusualness or anomaly score of the respective spike.

Note that, in the example embodiment described with reference to FIG. 6A, different social media activity attributes or metrics are used for surfacing of the place icons 631 and the spike icons 633 respectively. As discussed, spike icons 633 are in this example embodiment surfaced based on anomaly metric values, while place icons 631 are surfaced based on raw snap volume. In other embodiments, surfacing of the place icons 631 may also be based at least in part on associated anomaly values. Note that in some embodiments, various aspects of social media surfacing as described herein (including heatmap calculation and generation, story surfacing, etc.) are based on attributes other than anomaly. For example, the heatmap 625 and story surfacing are in one embodiment based on raw activity levels. Therefore, discussion herein of aspects of the disclosure relating to informational overlays (such as the heatmap 625) and content surfacing based on the anomaly metric is to be read as, in other embodiments, being performed based on a different social media activity value, such as raw snap numbers in a given time period, snap frequency, snap density, or the like.

Other Types of Stories or Ephemeral Social Media Galleries

Other embodiments can instead, or in addition, provide for social media gallery types different from the place stories and the spike stories described with reference to FIGS. 6A and 6B. Each such different type of gallery may be represented on the map 618 by a visually distinct type of icon or other user interface element.

One example embodiment provides for event galleries pertaining to particular events occurring at a specific location. Such events can include, for example, concerts, festivals, sports events, or the like. These event galleries are in one embodiment created and curated server-side by human operators using the CMS 1224.

Some embodiments provide for surfacing on the map 618 story icons or thumbnails with respect to non-public snaps. e.g., snaps or stories that are access-restricted based at least in part on social network information. For example, individual stories uploaded by friend users may in some embodiments be represented on the map 618 by a respective icon or thumbnail. For example, the My Story of friend users may in some embodiments be directly accessible via the map 618. Such story icons are in some embodiments indicated by a respective friend icon or bitmoji 640 located on the map 618 corresponding to the location at which the corresponding story was generated. In other embodiments, each such user story icon may be indicated on the map GUI 612 by a circular thumbnail analogous to the previously described example story icons 631, 633.

Snap Submission to User-Selected Location-Based Stories

Another feature of the disclosure enables users to submit publicly viewable snaps designated for inclusion in any and all Live Stories or ephemeral galleries that might be happening at locations where the user is eligible to post, e.g., being geographically proximate to the current location of the user as indicated by the associated client device 102. In this manner, the user can specify snaps for inclusion in place stories, event stories, or other location-based ephemeral social media galleries as discussed above.

FIGS. 7B and 7C show an example embodiment of a destination selection interface 707 that provides a mechanism for such destination selection alternative to the example embodiment previously described with reference to FIG. 7A. The destination selection interface 707 of FIG. 7B is displayed on the client device 102 in response to the user initiating a snap submission flow, e.g., by capturing a snap.

The destination selection interface 707 of FIG. 7B is similar to that of the example embodiment of FIG. 7A, in that two different user-selectable user interface elements in the form of respective radio buttons 714, 721 are presented for posting a snap to a user-specific My Story (radio button 714) or to a publicly viewable Our Story (radio button 721). A distinction between the destination selection interface 707 of FIG. 7A and that of FIG. 7B is that the Our Story cell of FIG. 7B automatically expands upon selection of the radio button 721 to show subtitles of local place stories and/or event stories to which the snap could be submitted based on device location or the geo-tag of the associated snap.

FIG. 7C shows additional options presented as a result of selecting the Our Story radio button 721, which opens up a list showing the respective local stories for which the snap is eligible. In this example embodiment, all suboptions are selected by default via respective radio buttons 750. In other embodiments, separate selection of individual suboptions may be required. If the user chooses to submit the snap with all of the options selected, that snap is automatically associated with each of the selected suboptions as well as being made available for geographically based viewing as part of Our Story, separate from any curated location-based place or event gallery/story, as described above.

The user can deselect any particular suboptions by clicking or tapping on the corresponding default-selected radio button 750, as shown in FIG. 7C, in which the lowermost one of the suboptions has been deselected. If all suboptions are deselected, the snap is not posted to any curated location-based story, but is posted only to Our Story to be publicly viewable via the map GUI 612, as described elsewhere herein.

Heatmap Considerations

As shown in FIG. 6A, the social media application map GUI 612 in this example embodiment includes a heat map layer overlaid on the geographical map 618, thus providing the heatmap 625 that indicates geographical distribution of one or more attributes of user activity within the social media application. As discussed previously, the heatmap 625 indicates user activity levels with respect to posting geo-tagged content that is publicly viewable (e.g., Live Stories/ Our Story). Instead, or in addition, the heatmap 625 can in some embodiments be based on snaps that are available for viewing by the particular user on whose client device 102 the map GUI 612 is displayed, in which case the heatmap 625 may differ from person to person depending on who gave the viewer permission to see their snaps.

In this example embodiment, the map 618 is color-coded, with warmer colors corresponding to higher levels of posting activity, here indicated by snap density (e.g., raw snap volume per unit area of the map 618 in a given time window). Thus, in the map 618 illustrated in FIG. 6A, the red areas of the heatmap 625 (represented in colorless drawings as the darkest areas of the heatmap 625) indicate those geographical areas with snap clusters corresponding to highest snap density. Again, different metrics or attributes for generation of the heatmap 625 may be used in other embodiments, for example being based at least in part on an unusualness metric or anomaly metric, as discussed elsewhere.

In some embodiments, the map GUI 612 displays information pertaining to the heatmap 625 differently at different magnification levels. For example, calculation of anomaly metrics and consequent rendering of the heatmap 625 based thereon is in some embodiments performed separately for each of a plurality of zoom levels. In addition, different sets of spike icons 633 may be surfaced at different magnification levels. In one example embodiment, the heatmap 625 may be displayed at a first zoom level without individual spike icons 633 surfaced in the map GUI 612, while multiple story icons 631, 633 are automatically surfaced in response to user-controlled zooming in on a particular portion of the map 618 shown at the first zoom level.

Anomaly Metric Calculation

Some features of the map GUI 612 in this example embodiment provide for calculating with respect to social media content an anomaly metric that quantifies geospatial anomaly or unusualness of the social media content, and for surfacing the social media content in the map GUI 612 based on respective values for the anomaly metric in different areas. In this example embodiment, respective collections of snaps associated with different geographical locations are ranked based at least in part on corresponding anomaly metric values, and a predetermined number of the collections are automatically selected based on their anomality rankings for surfacing on the map GUI 612 with respective spike icons 633. Instead, or in addition, all spike stories with a positive anomaly metric value (i.e., reflecting anomalously high, not low, activity) higher than a predefined threshold value can automatically be surfaced by the display of a corresponding spike icon 633. As described elsewhere herein, the calculation and display of heatmap information is in some embodiments based at least in part on anomaly metric calculation.

Anomaly metrics may in some embodiments be calculated for individual social media items. In this example embodiment, however, anomaly metrics are calculated for collective user behavior. In particular, anomaly metrics are calculated for multiple snaps (in this example being respective geotagged social media submissions) based on a comparison between geo-temporal distribution of the multiple snaps and historic geo-temporal social media behavior in or around the relevant geographic location.

Note that the calculation of anomaly metrics is in this example embodiment time sensitive. Thus, the same volume of snaps in a particular location may be identified as being anomalous at one time of the day but not at another time. For example, a certain level of social media activity (here, posting of snaps to Our Story) at the Empire State Building would be flagged as above-threshold anomalous at 4 AM, but would not be thus identified as anomalous during daytime.

An aspect of the disclosure provides for determining one or more geo-temporal attributes of social media activity by a process comprising, for each of multiple social media postings, representing the posting as having a distribution in time and/or in space. In some embodiments, representing respective postings as having a geo-temporal distribution comprises treating respective social media items as a probability cloud, for example having a Gaussian distribution or using an Epanechnikov kernel.

In some embodiments, the representation of social media postings as having respective distributions in time and/or space is performed as part of an operation to represent a geo-temporal reference profile or model for historical social media activity for a particular geographical area. Instead, or in addition, the representation of social media postings as having respective distributions in time and/or space may be performed as part of a procedure to represent recent or near-live social media activity in the particular geographical area. In such cases, the geo-temporal reference profile and the representation of the recent or near-live social media activity may be used in combination to identify within the geographical area one or more regions of interesting or anomalous social media activity, e.g., by calculating a geographical distribution of a quantified anomaly metric based on deviation between the geo-temporal reference profile and the corresponding representation of recent or near-live social media activity. In a particular example embodiment, the historical model is represented as Dirichlet distribution, with an anomaly score being calculated with a Dirichlet-multinomial.

Dynamic Variation of Icon Size

Turning briefly to FIG. 6B, it will be seen that the map GUI 612 illustrated therein provides an example embodiment of an aspect of the disclosure that provides for automated variation in one or more visual attributes of user interface elements associated with respective social media content based at least in part on a quantified attribute of underlying social media activity. In particular, the example embodiment of FIG. 6B provides for dynamic variation in the on-screen size of respective spike icons 633 based on respective anomality metric values for the corresponding clusters or spike galleries. On-screen size of the respective spike icons 633 thus indicates a level of unusualness or anomality of the underlying social media activity. Worded differently, the size of a spike icon 633 represents how unusual it is for there to be the relevant amount of activity in that spot, with a larger spike icon 633 indicating a greater level of unusualness.

Instead, or in addition, a visual attribute (such as on-screen size) of the place icons 631 may likewise be variable based on a corresponding anomality value. In the example embodiment of FIG. 6B, however, the on-screen size of the place icons 631 is variable based on snap volume, with a greater number of snaps included in any place story corresponding to a larger on-screen size of the associated place icon 631. Thus, it is intuitively intelligible from the example screenshot shown in FIG. 6B that the Universal Studios story has a greater number of snaps than the Venice Boardwalk story.

Location Sharing and User Icons

User Location Display

As mentioned previously, the map GUI 612 includes a graphical representation of associated locations of the user associated with the client device 102 and/or other users.

Each user is represented by a respective user icon or friend icon (for users who are members of an in-application social graph associated with the viewing user), in the illustrated embodiments being in the form of respective bitmojis 640. In this example embodiment, a user of the social media platform will not be sharing their location if they have never interacted with the map GUI 612. The first time the user interacts with the map GUI 612, the user is taken through an on-boarding flow which allows for the setting of individual location sharing preferences.

Regardless of whether the user has selected to show their location to anyone, the user can see their own current location on the map 618 at all times, and, if the user's bitmoji 640 is no longer in view, snap back to it, causing the map focus to re-center on the user location. FIG. 8A shows an example embodiment in which the viewing user's location is indicated by a custom user-selected or user-generated user interface element in the form of the user's bitmoji 640.

Location sharing preferences can be changed from the graphical user interface of FIG. 8A. In this embodiment, changes to location sharing preferences can be affected by (a) entering an invisible mode in which the user's location is not visible by any other user (also referred to herein as Ghost Mode), and (b) changing default location sharing settings and/or respective settings for different friend users and/or groups of friend users.

Location sharing can be turned off or on from within the map GUI 612, thereby to enter or exit Ghost Mode. In this embodiment, Ghost Mode can be toggled on/off via a map pin icon 808 in the top right (see FIG. 8A). When location sharing is off (i.e., when in Ghost Mode), the user's location is no longer displayed in the map GUI 612 on other users' client devices 102. The user can still, however, see his/her location in the map GUI on his/her own device. When in Ghost Mode, a ghost icon (not shown) slowly pulses in the top right of the screen in replacement of the map pin icon 808.

Note that the Ghost Mode functionality described herein is to be distinguished from turning off location services on a mobile user device. Thus, when Ghost Mode is turned on, the device location services of the client device 102 are still functioning, so that the user location can still be determined and displayed on the map GUI 612 of the user's own device 102, with social media content captured in Ghost Mode still being geo-tagged.

When the user turns on Ghost Mode after previously being present on the map 618, the user's bitmoji 640 disappears within seconds from other people's maps. When in Ghost Mode, the user can still see anyone on the map 618 who has chosen to share their location with the user.

If the user selects their own bitmoji 640, a user bubble or user panel 816 is launched at the bottom of the touchscreen 606, enabling the user to access location sharing preferences via a settings soft button 824. The user panel 816 further includes a location-agnostic collection icon in the form of a My Story icon 832. The My Story icon 832 is selectable to launch replay of the viewing user's My Story, being a location-agnostic collection of social media items (here, ephemeral snaps) submitted by the user. Analogous to other location-agnostic GUI features disclosed herein, location-agnostic in this context means that the collection of social media items playable via the My Story icon 832 is collated and displayed without regard to any location constraint, thus being unaffected by geo-tagging information associated with the respective items, by the user's current location, or by the current focus of the map 618.

Location Sharing Preferences

Selecting the settings soft button 824 causes display in the map GUI 612 of a location sharing preferences interface 840 (FIG. 8B) that, in this example embodiment, provides the user with options for specifying who will get to see their location, and at what granularity. Default sharing granularity options provided in this example embodiment include:

Precise, meaning in this embodiment is that the user's bitmoji 640 is displayed to friend users via their map GUIs 612 at the user's actual location (e.g., as indicated by the location services of the client device 102). In other words, the display location and the actual location for the user is substantially the same; and City, meaning that the display location of the user's bitmoji 640 will be different from the actual location, but will be located within a defined geographical region corresponding to the current actual location. In this example embodiment, the defined geographical region within which the user's location is displayed is at a city level (e.g., Venice, Calif., London, etc.).

When the city option is selected for a particular group of users or for particular individuals, the user's bitmoji 640 will in this example embodiment be shown in the map GUI 612 generated on the user devices 102 of the selected persons (or persons within the selected group) at a random location within that city, and which will in this embodiment not change if the user does not leave that city. FIG. 8C shows an example of display of a user bitmoji 640 in the interactive map 618 of the map GUI 612 at such a city-level display granularity, in which the user bitmoji 640 is shown at the random location in the city, together with an associated label 860 specifying, broadly, the city in which the user is located (Santa Monica, in the illustrated example embodiment).

Note that the features related to intentionally inaccurate display of the user's location has the effect that the user's location is displayed differently on, the one hand, an instance of the map GUI 612 generated on their own device 102 (e.g., FIG. 8A, in which the display location of the user bitmoji 640 corresponds to the actual location of the user) and, on the other hand, instances of the map GUI 612 generated on the user devices 102 of friend users having a non-precise viewing permission (e.g., labeled city-level display such as that illustrated in FIG. 8C, in which the display location of the user bitmoji 640 differs from the user's actual location). In this example embodiment, the display location of the user bitmoji 640 at a non-precise regional level (e.g., at city-level) is the same across different friend user devices 102, so that different friends see the user bitmoji 640 as being displayed at the same random location. In other embodiments, the display location can be different for different friend users.

It will be seen that this aspect of the disclosure thus provides for a method comprising: determining a location of a user device associated with the user of a social media application; determining a user-selected location display setting that specifies a manner in which the user location is to be displayed on a map-based GUI displayed to other users of the social media application, the location display setting being selected from a predetermined set of location display settings that correspond to display of the user location at different respective levels of precision on the map-based GUI; and representing the user on the map-based GUI of the friend user by rendering a UI element associated with the user at a location on the map-based GUI in accordance with the selected location display setting.

The defined geographic region is in the example embodiment of FIG. 8B available only at city level. In other embodiments, different or additional levels of display granularity can be provided, for example identifying different levels of cartographically and/or politically defined geographical regions, such as county-, city-, town-, or neighborhood level. Note that, in the example embodiment of FIG. 8B. Ghost Mode can be toggled not only at a general level (via a Ghost Mode toggle 841), but also can be selected for groups of users or for individual friend users via a group selector 842 and a friend selector 843 respectively. In some embodiments, the displayed user location remains fixed at the randomly selected display position until the user device 102 leaves the defined geographic area. Thus, a new display location is in some embodiments determined each time the user enters the relevant area.

As mentioned, the user can also via the location sharing preferences interface 840 select different groups of other users to which his location will be displayed, and may in some embodiments specify different display attributes for the different respective groups or for different respective individuals. In this example, audience options available via the group selector 842 include: Best Friends. Friends, and Custom (which is an individual-level whitelist of people specified by the friend selector 843).

If Friends are selected, all new people added to the user's friends list will automatically be able to see their location, consistent with the granularity level selected in the group selector 842 (e.g., being selectable as precise or at city level in the group selector 842 of FIG. 8B). If they are already sharing with the user, they appear within seconds on the user's map.

In this example embodiment, the location sharing relationships are two-way—if John is sharing his location with Jack. Jack will not see John on his map 618 unless he has added John as a friend. The user cannot add anyone who is not a friend to the Custom section. The user can furthermore, via the friend selector 843 43, define more specialized permissions for specific people, which override the default setting When viewing the map GUI 612, the user will thus be able to see the locations of all his/her friends that have shared their location with him/her on the map 618. As discussed, each user is in this example embodiment represented by a bitmoji 640. If the friend does not have a bitmoji 640, a profile picture within a generic UI element is shown. If no profile pictures available for a particular friend, a default icon (e.g., a blank profile) is displayed at the corresponding location.

Friend-Level Access Via Friend Icon/Friend Carousel

In this example embodiment, friend-level access to friend information and friend-specific content is enabled via the interactive map 618. Such friend-level access is distinguished from location-based access mechanisms such as a location-based search or snap collections accessible via respective geo-anchored story icons 631, 633. One example of such a friend-level access mechanism is a friend bubble or friend panel 909 (FIG. 9A that pops up at the bottom of the screen when the user taps on the bitmoji 640 of a displayed friend. The friend panel 909 and a friend carousel 918 of which it forms part, provide a number of functionalities to the user.

In the example embodiment of FIG. 9A, the friend panel 909 displays summary information about the user. As illustrated in FIG. 9A, the friend panel 909 forms part of a friend carousel 918 that enables the user selectively to switch focus between different friends. Note that, in addition to the main friend panel 909, the friend carousel 918 includes a next friend panel 909 whose left edge is exposed on the right-hand side of the touchscreen 606.

The user can swipe between friends on the map 618 via the friend carousel 918. In this example embodiment, switching between friends is achieved by swiping the current focus friend panel 909 left or right. Swiping left or right on the friend panel 909 brings into view the next or previous friend panel 909, as the case may be. In this example embodiment, swiping to a particular friend automatically centers the map 618 on the bitmoji 640 of that friend. Note that all of the friends for whom the user has viewing permission should be available as part of the friend carousel 918, not just those friends who are visible in the map viewport 621. Friends are in this embodiment ordered in the carousel by update recency.

The friend panel 909 also includes a chat soft button 919 that can be selected to launch a chat interface 950 (see FIG. 9B) in temporary replacement of the interactive map 618, but without leaving the map GUI 612. In other embodiments, tapping on the friend bitmojis 640 causes a fly-out menu to be displayed, with initiation of a chat session being one of the selectable options.

In this example embodiment, selection of the chat soft button 919 causes the chat interface 950 to pop up in a modal over the map 618, which modal can be swiped down to dismiss. Incoming chat notifications can be opened in this modal view.

The friend carousel 918 additionally provides location-agnostic access to social media content provided by respective friend users via the map GUI 612. In this example embodiment, such location-agnostic access is available via a location-agnostic collection icon in the form of a respective Friend Story icon 932 displayed in the friend panel 909. The Friend Story icon 932 is selectable to trigger replay of a corresponding story (in this example being the My Story of the selected friend) comprising a series of snaps uploaded by the corresponding friend user, without any location constraint on the replayed material. In other words, no location information has any effect on the availability and identity of these snaps. The friend carousel 918, via the Friend Story icon 932 thus provides a link from the user location to social media content that is not located anywhere, in that the snaps or stories thus available will be the same irrespective of the friend user's current location, the current focus of the map viewport 621, or the current location of the viewing user. Worded differently, this and other location-agnostic access features of the map GUI 612 provide for access to friend content via the map GUI 612 in a manner similar to that which would be provided by a GUI that is not map-based. Thus, in one example embodiment, selecting a particular friend bitmoji 640 causes display of a menu or user interface element (in the example embodiment of FIG. 9A, the respective Friend Story icon 932 of the selected user) through which available snaps and/or stories of the target user can be viewed, without regard to any geo-tagging information of the respective snaps/stories.

As will be described below, certain aspects of the search mechanisms provided by the map GUI 612 similarly provide access to location-agnostic social media content of friend users via the map GUI 612.

Search Functionalities

Figure 10A:
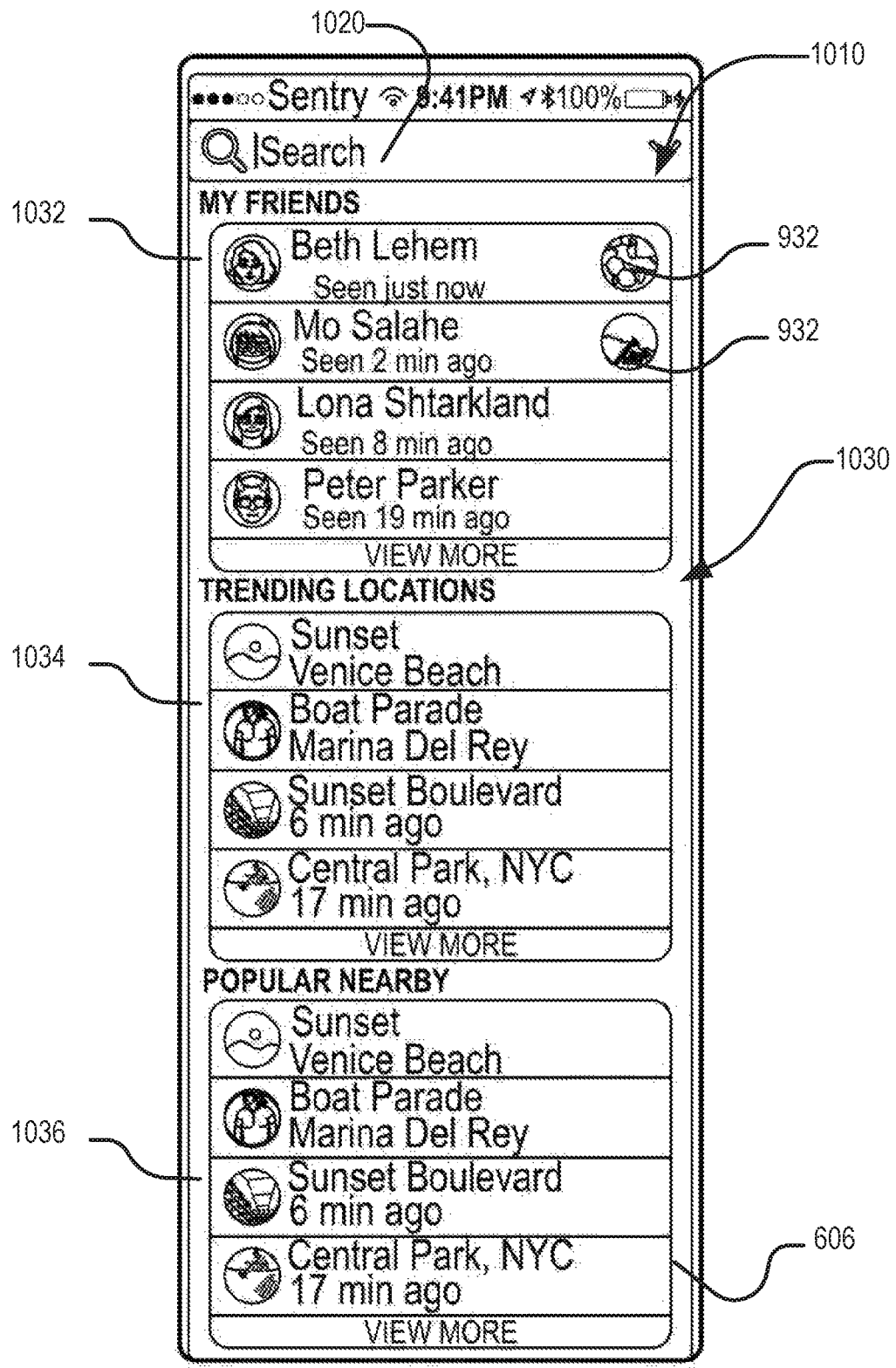
FIG. 10A-10D is a series of screenshots of search interfaces provided as part of a map-based graphical user interface, according to respective example embodiments.
Figure 10B:
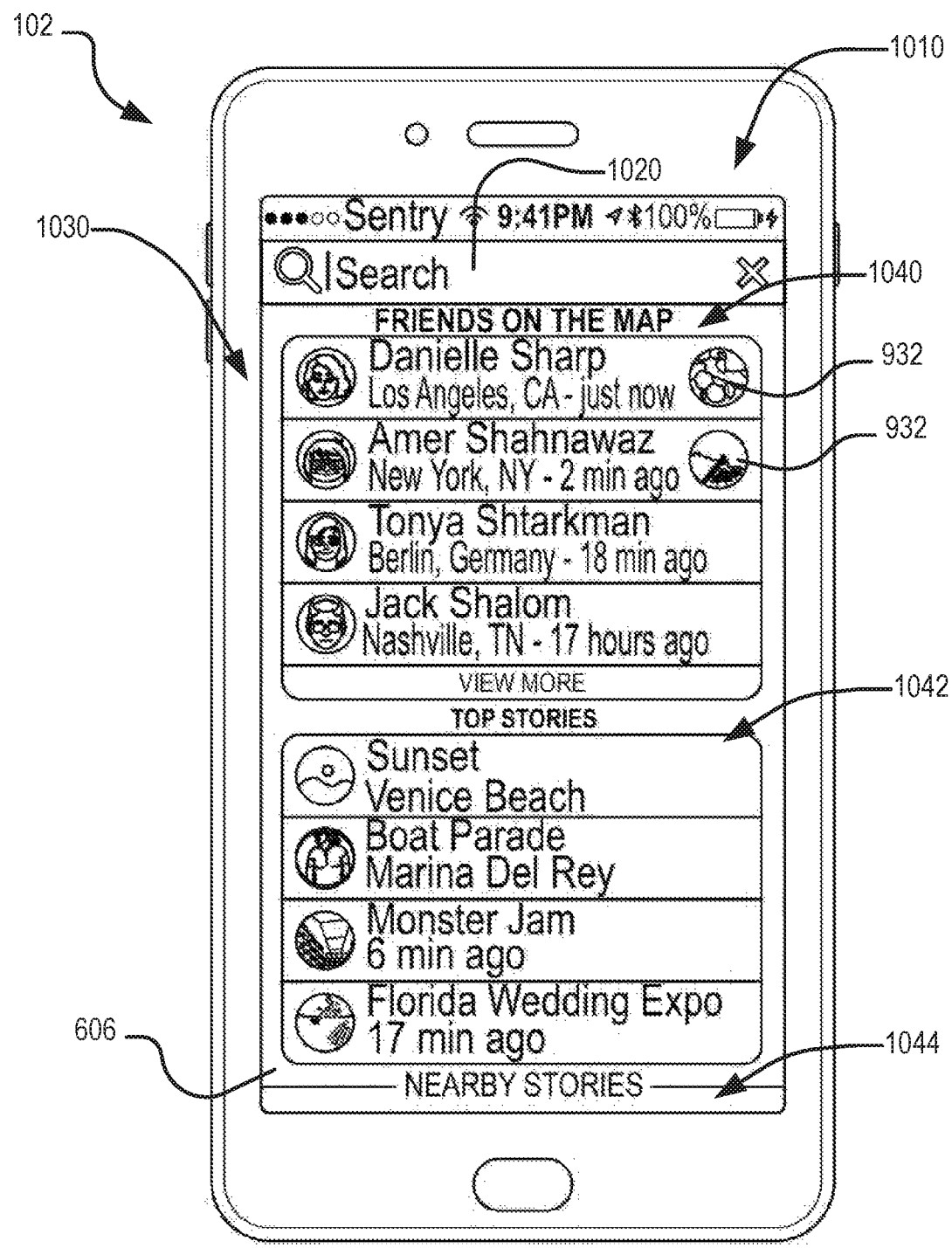
Figures 10C, 10D:
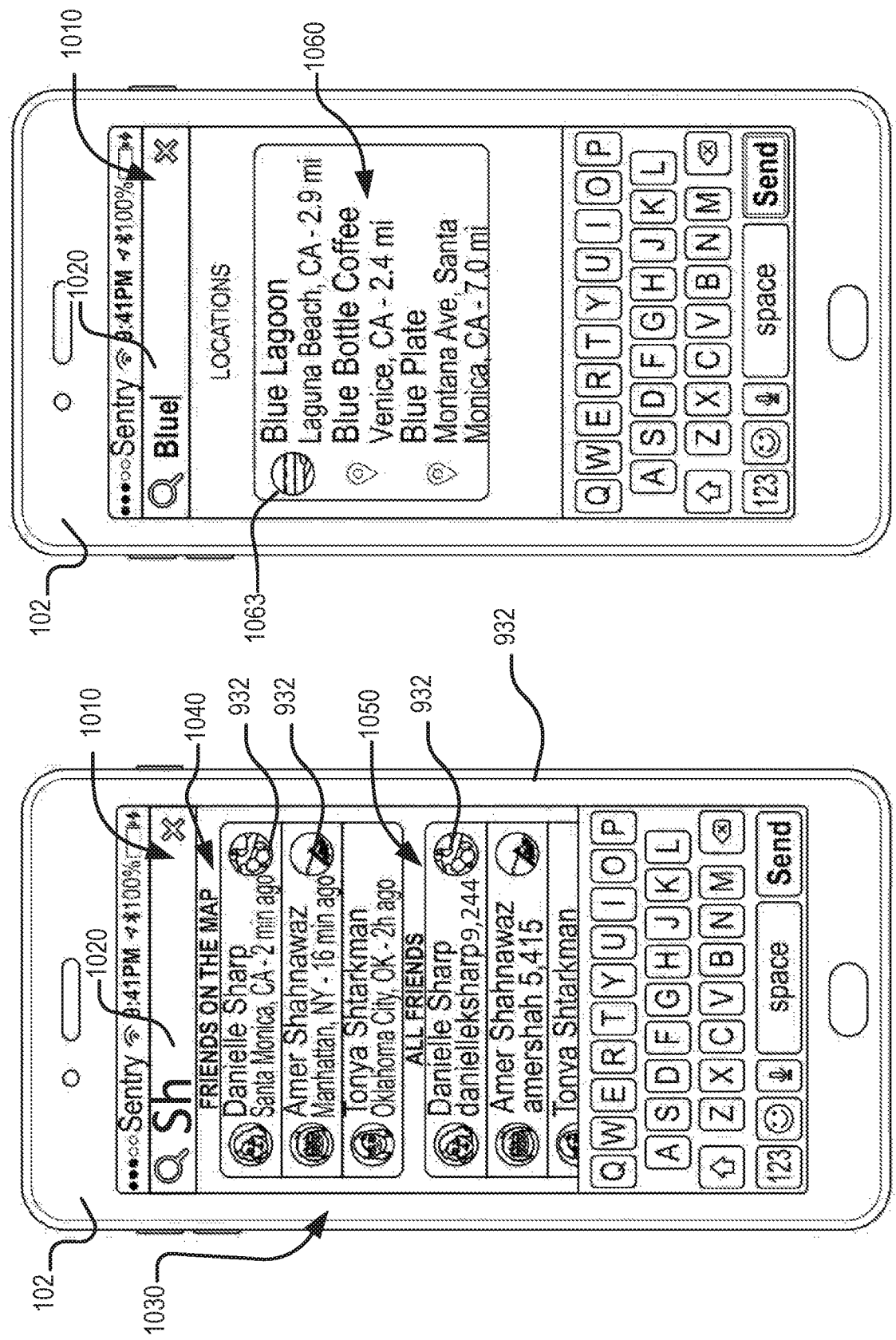

In addition to viewing clustered stories by selection of the story icons 631, 633, the user can access snaps by use of one or more search functionalities provided by the map GUI 612. In this example embodiment, the map GUI 612 provides a number of different search mechanisms through which the user can access targeted social media content, the search mechanisms including:

a search bar 665 (FIG. 6A) that enables the entry of a text string search query to cause display of search results comprising a list of entries satisfying the search query (FIG. 10C);

location-based searches to search for social media content based at least in part on their respective geo-tag information. In some embodiments, these location-based search mechanisms include:

a location-targeted search triggered by clicking or tapping at a target location on the map 618 (illustrated schematically in FIGS. 11A and 11B); and a friend-based location search to locate social media content based at least in part on the location of a selected friend user; and one or more friend-level access mechanisms that provide access to social media content of the selected friend users. In a particular embodiment, these include:

access to location-agnostic friend content via the user icons, friend carousel 918 and/or individual friend panels 909; and location-agnostic collection icons (e.g., Friend Story icons 932, as described below with reference to FIGS. 10A-10C) displayed in association with respective friend users in a list of search results.

Search Bar Mechanism

Two example embodiments of operation of a search mechanism provided via the search bar 665 are illustrated schematically with reference to FIG. 10A and FIGS. 10B-10D respectively. Discussing first the example embodiment of FIG. 10A, it will be seen that selection of the search bar 665 (FIG. 6A) causes display of a drop-down search interface 1010 that includes a search box 1020 for entering a text-based search query, and a number of lists of suggestions 1030 in respective user interface cells displayed below the search box 1020. In the example embodiments of FIGS. 10B-10D, individual suggestion cells correspond to individual snaps, stories, places, and/or friends. As can be seen with reference to a corresponding screenshot of the search interface 1010 in FIG. 10C, the particular cells displayed as part of the suggestions 1030 are dynamically filtered in response to text entry in the search box 1020, to include only stories, friends, or places that satisfy the entered search query.

When the user clicks on a selected cell in the list of suggestions 1030, the map GUI 612 in this example automatically navigates with a fly-over to the corresponding point on the map 618. If the selected cell is for a spike collection or cluster (also referred elsewhere herein as a spike story), the snaps in the corresponding story starts playing sequentially. If the selected cell is a friend cell, the map viewport 621 navigates to the corresponding friend bitmoji 640, and the associated a friend panel 909 pops up, as the case may be. In the example embodiment of FIG. 10A, at least some aspects of the display search results or suggestions 1030 are location-agnostic, returning search results from any location, without any constraint based on the user current location or the display area of the map 618. In particular, the "My Friends" section of the suggestions 1030 in the embodiment of FIG. 10A includes any friends for whom the user has viewing permission.

Thus, features provided by the search interface 1010 of FIG. 10A include:

Searching for a location anywhere in the world, and navigating to it by selecting the corresponding suggestion cell: and Viewing, before typing, suggestions 1030 of interesting social media content, and, while or after typing, suggestions that dynamically satisfies the search query. In the example embodiment of FIG. 10A, these include:

Friends of the user, in section 1032, identified as a "My Friends";

Trending place stories, event stories, and/or spike stories or clusters, irrespective of location, identified as "Trending Locations" in section 1034;

Nearby place stories, event stories, and/or spike stories or clusters, in section 1036, identified as "Popular Nearby."

Note that the "My Friends" and "Trending Locations" in the example embodiment of FIG. 10A shows friends/content from all over the world, not just friends/content that shows up in your viewport. All friends are shown in section 1032 in order of how recently seen. In contrast, the "Popular Nearby" entries have a location restraint, being in this example embodiment limited to stories falling within the area of the current map viewport 621. In other embodiments, the location restraint is based on the user's current location, as indicated by the client device 102.

The "Trending Locations" and "Popular Nearby" stories are ranked globally according to a metric based on the underlying social media activity, in this example embodiment being ranked according to the number of unique users contributing to a story. In some embodiments, the trending locations may be ranked according to anomality metrics or interestingness scores. In yet further embodiments, surfacing of stories in the search interface 1010 can be based on raw snap volume, snap density over time, rate of increase in snap volume, or the like.

When users click on an entry in the search box dropdown, the map GUI navigates with a fly-over to the corresponding point on the map 618, after which the story/spike cluster starts playing, or friend panel 909 pops up, as the case may be.

Searching functionality available via other example embodiments of the map GUI 612 will now be described with reference to FIGS. 10B-10D. FIGS. 10C and 10D show behavior of the search interface during and after typing by the user in a search box 1020 forming part of the search interface 1010. It will appreciated that items listed during and after typing are limited to items (e.g., friends, places, events, or stories) that satisfy the search string entered thus far. Each one of a number of different sections of suggestions 1030, in which respective entries are ranked by priority, will be described separately below. Different embodiments may employ different combinations of these suggestions sections.

FRIENDS ON THE MAP—This section, indicated by reference numeral 1040 in FIG. 10B, shows friends that are that are on the map 618. In this example embodiment, the displayed friends are limited to friends who are visible in the map viewport 621 (i.e., in the geographical area of the map 618 displayed immediately before launching the search interface 1010). In other embodiments, the displayed friends include any friends who are currently available somewhere on the map 618. In this example, the top four friends are listed, followed by a View More button if necessary. The user can tap on a friend cell to locate them on the map 618.

Each friend cell includes, if available, a location-agnostic collection icon in the form of a Friend Story icon 932. Any of the Friend Story icons 932 can be tapped to view the corresponding friend story modally. Viewing of a story comprises sequential replay of the series of snaps included in the story. Each Friend Story icon 932 in this example embodiment comprises a user interface element in the form of a circular thumbnail to the right of the respective friend name. In this example, the stories thus playable include any of the friend's stories, without regard to any location information that may be associated with the story or with any snaps forming part of the story, thus being in accordance with the disclosed feature of map-based access to location-agnostic social media content of a target friend user. In other embodiments, however, the stories surfaced for replay are limited to those geo-tagged on the current map view.

In addition to the Friend Story icon 932, each friend entry in this example embodiment comprises an associated bitmoji, name, last seen timestamp, and associated location indicator. The listed friends are ordered by update recency.

ALL FRIENDS—This section, identified by reference numeral 1050 in FIG. 10C is similar to the My Friends section 1032 of FIG. 10A, in that it surfaces friends that satisfy the search string, irrespective of whether or not that friend is present on the map. In addition to a My Story icon 832 were available, a user name and a score indicator is shown as subtext for each friend. In this example embodiment, the indicated score is a user score that is used throughout the application to represent a user's engagement level. In some embodiments, as previously described, tapping on a friend cell navigates the map to focus on the display location of that friend. In this example embodiment, however, tapping on a friend cell launches the chat interface 950 modally (see FIG. 9B). Dismissing the chat brings the user back to the search interface 1010.

TOP STORIES—This section, identified by reference numeral 1042 in the example embodiment of FIG. 10B, showcases the top stories from around the world (selected by curators daily or ranked by quality score or viewer volume).

NEARBY STORIES—This section, identified by reference numeral 1044 in FIG. 10B, shows interesting event clusters nearby or within the viewport. These will be ranked by descending quality score. In some embodiments, the nearby stories can be ranked according to the anomaly metric, or according to a ranking score based at least in part on the anomaly metric. Thus, it will be seen that some embodiments of the disclosure provide for social media application search interface that automatically surfaces ephemeral galleries based at least in part on geographical proximity between the user device and geolocations associated with the respective galleries. Ranking of the surfaced ephemeral galleries may be based at least in part on respective anomaly metrics.

LOCATIONS—This section, identified by reference numeral 1060 in FIG. 10D, shows all points of interest (POIs) or places (as defined by the CMS 1224) that matches the search query. In some embodiments, surfacing and ranking of locations satisfying the search string includes locations with stories available for replay, i.e. having an associated place story. Thus, for example, in the screenshot of FIG. 10D, Blue Lagoon is ranked above Blue Bottle Coffee because it has an associated collaborative story, even though the latter is closer to the location of the user device 102.

If the place has a story, a story icon 1063 in the form of a thumbnail is in this example embodiment shown before the title (see FIG. 10D). Tapping the story icon 1063 (or anywhere in the cell) centers the place on the map and auto-plays the story. If the place does not have a thumbnail, tapping the cell in this example embodiment reverts to the map viewport 621, focusing on the relevant location, without playing any story. Fallback prioritization is by proximity to current viewport (after POIs and/or places with playable stories have been prioritized to the top).

Location-Based Search Via Target Location on Map

As an alternative to entering a text-based search query, the user can initiate a location-based search by selecting a target location on the map 618 separate from any of the story icons 631, 633, friend bitmojis 640, or any other selectable user interface element overlaid on the map 618. In this manner, the map 618 itself provides an interactive search mechanism. An example embodiment of such a location-based search is illustrated schematically with reference to FIGS. 11A and 11B.

In response to the user's clicking or tapping on a particular location on the map viewport 621, a search is conducted for social media items within a predefined radius from the click- or tap location. In this example embodiment, such a location-based search does not return a list of graphical user interface elements that are selectable to play respective items, but instead automatically triggers automated sequential replay of items returned as a result of the search.

In the example embodiment of FIG. 11A, selection of a target location 1110 is by haptic contact at the selected on-screen position, consisting of tapping the touchscreen 606 with a single finger 1120 of the user. Thus, tapping on a non-thumbnail place on the map 618 will radiate out a search around the target location 1110, as illustrated schematically in FIG. 11B by a substantially circular geographical search area 1130 centered on the target location 1110. Such a location-based search can have a predefined search radius from the tap location. If any snaps are found in the geographical search area 1130, they are automatically played back in sequence, as described before. If there are no snaps in that area, the search bounces back to show no results found.

In some embodiments, such a location-based search is dynamically restrained by a predefined search limit, so that the size of the geographical search area 1130 can be variable in different instances. In some embodiments, the search limit for a location-based search is a predefined maximum size defined by the number of snaps located in the search. In an example embodiment, the geographical search area 1130 will thus radiate out from the target location 1110 to a point where a predefined maximum number of snaps are found, after which all snaps from that area will start playing in sequence. Worded differently, a predefined search metric or limit is provided in some embodiments to determine when the search should be stopped. As mentioned, the search limit may be an upper limit to the number of snaps located, with the search radiating out no further from the target location once the number of snaps located reaches the upper limit. Thus, it will be seen that different location-based searches can return snaps from geographical search areas 1130 that differ in size, depending on the density of snaps in the vicinity of the target location 1110.

In some example embodiments, such a location-triggered social media content search (i.e., a search for social media content uploaded by other users triggered by a user click/tap at the target location 1110 that does not coincide with a story icon 631/633 or friend bitmoji 640) can be configured automatically to exclude social media items included in one or more of the clustered collections represented by respective icons 631, 633 on the map. Thus, in this embodiment, the social media application will not include in search results or replay any snaps that are included in any of the place stories or any of the spike stories on the map.

As mentioned, initiating a location-based search by clicking or tapping on a non-thumbnail area in this example embodiment triggers automatic replay of snaps located within a geographical search area 1130 centered on the target location 1110. In other embodiments, such a search input by target location selection may cause display of a graphical user interface element listing the snaps found within the search area, for example including a thumbnail and username for each found snap. The user can thereafter select from the list of found snaps those which are to be replayed.

In some embodiments, the snaps located in a location-based search are played back in chronological sequence, as indicated by respective timestamp data indicating when the corresponding snap was uploaded. In some example embodiments, a sequencing operation may be performed on the subset of snaps identified in a location-based search, so that the replay sequence does not strictly follow chronological sequence. In one example embodiment, an improved sequence for media playback in response to a user tap on the map viewport is achieved by a sequence of operations comprising (a) finding all snaps in a fixed radius of the tap point, (b) doing geo-temporal clustering of those snaps, (c) sorting those clusters by distance from tap, and (d) sorting within the clusters by time.

In some embodiments, the location-based search is by default performed for material uploaded within a predefined default time period. For example, the location-based search may identify all snaps that (a) are located within the geographical search area 1130, (b) are not included in any story represented by a corresponding story icon 631/633; and (c) have timestamps within a default preceding ephemeral timespan. Thus, in an example embodiment in which a snap is by default available for 24 hours via the map GUI 612, the location-based search may by default locate snaps having timestamps indicating upload dates within the past 24 hours.

In some embodiments, however, the preceding period with respect to which the search is performed is selectively variable by the user. For example, the search period timespan is automatically variable in response to an interval for which a search input gesture or signal is provided by the user.

In embodiments in which the map GUI 612 is displayed on a touchscreen 606 (as is the case in the example embodiment of FIGS. 11A and 11B), a geo-temporal search is triggered by haptic contact at a particular location within the map 618, with the search being geographically centered on a target location 1110 defined by the on-screen position of the haptic contact. In some embodiments, an input interval indicated by the time period for which the haptic contact is maintained with the touchscreen 606 automatically determines the preceding timespan with respect to which the search is carried out. In such a case, for example, a tap on the screen triggers a geo-temporal search for material within the default time period, while a press and hold automatically triggers a geo-temporal search for material within an extended time period which is longer than the default time period. In one example embodiment, a tap input triggers a geo-temporal search with a 12-hour timespan, while a tap and hold triggers a geo-temporal search with a 24-hour timespan. In other embodiments, the extended timespan is variable in graduated fashion, so that multiple different search timespans are selectable based on the press-and-hold interval. Note that the operations described with reference to the haptic contact on the touchscreen 606 can be performed analogously by a click-and-hold input in instances where user input is provided by a cursor control mechanism, such as a mouse.

Instead, or in addition, the search radius (i.e., the size of the geographical search area 1130) may be variable based on the length of the input interval, with longer input intervals (e.g., a longer hold period) corresponding to a larger search radius.

Location-Based Searching Via Friend Location or for Friend Content

Some embodiments of the map GUI 612 provide functionalities for searching for social media content with a location restraint based at least in part on a location attribute of the selected friend user. The location restraint may, for example, operate to limit the search to social media content geo-tagged within a predefined geographic range centered on a geographic location of the selected friend user.

For example, the user can in some example embodiments trigger a location-based search with a location constraint based on the location of a selected friend user. In one example embodiment, such a location-based search with respect to a particular friend location can be performed in a manner analogous to that described below with respect to a general location-based search as described with reference to FIGS. 11A and 11B. The various considerations and features discussed for general location-based searching can thus in some example embodiments apply, mutatis mutandis, to location-based searching based on friend location.

In one example embodiment, a friend-targeted location-based search can be triggered by user interaction with the friend icon or bitmoji 640 of a target friend user. In such an example embodiment, a click or tap input on the bitmoji 640 surfaces a menu or friend panel 909, while a press-and-hold input or a click-and-hold input automatically triggers a location-based search such as that previously described, the search area being centered on the location of the selected user. Instead, or in addition, a menu or friend panel 909 launched responsive to selection of the bitmoji 640 in some embodiments include a selectable user interface element to trigger a search for social media content targeted with a location constraint defined with respect to the location of the selected user.

In some embodiments, the friend-based social media content search additionally has an owner constraint such that the search results are limited to social media items of the selected friend user. In other embodiments or instances, the friend-based social media content search may search for content including but not limited to that uploaded or provided by the selected friend user.

Other example embodiments in which social media content searches via the map GUI 612 has a location constraint based on a selected friend user's location include instances where (while map focus is on a selected user) search results are limited to items currently displayed in the map viewport 621. The result section 1030 in the embodiment of FIG. 10B provides one such example. In other instances, the map GUI 612 provides for the option of searching for content exclusively contributed by a selected target user. Responsive to triggering such a friend-specific search, the user can change the focus and/or zoom level of the map viewport 621, with social media items surfaced in the map viewport 621 being limited to social media content posted by the target friend user.

As described with reference to some example embodiments herein, a social media application executing on the user device in some embodiments generates a map GUI having a map viewport on which displayed geographic locations of at least some friend users may differ from the actual geographic locations of those users. In some embodiments, the friend-centered location-based social media content search may be centered on the actual geographic location of the selected friend user, being distinct from a displayed location of the selected friend user on the map GUI. In other embodiments, the search may be performed with reference to the displayed location of the selected friend user.

Overview of May GUI Functionality

In use, the map GUI 612 thus surfaces different types of location-based stories, which the user can view from the map 618. In the example embodiment of FIGS. 6A and 6B, the user can access via the map GUI 612 snaps posted to Our Story from anywhere in the world. This can be achieved by navigating to different geographical areas displayed within the map viewport 621. In particular, the displayed geographical area can be changed by zooming in or zooming out, and by moving the focus area of the map viewport 621. In the example embodiment of FIGS. 6A and 6B, in which the map GUI 612 is provided on a touchscreen 606, zooming in and zooming out can be achieved by haptic gestures in the form of a pinch-out or a pinch-in haptic input. Movement of the map 618 within the map viewport 621, so as to change the displayed geographical area, is achieved by a haptic dragging gesture at any point on the map 618.

In this example embodiment, the map 618 is not selectively rotatable by the user, having a fixed default orientation relative to the touchscreen 606. In other embodiments, the map 618 may have a fixed orientation relative to the Earth. In some embodiments, the map 618 is selectively rotatable, e.g., with all map content rotating around a fixed anchor.

As discussed at length above, in any particular map viewport 621, the displayed information can include:

- the color-coded heatmap 625, visually displaying the geographical distribution of snap uploading activity within a preceding window (for example the default snap lifetime, in this example 24 hours), allowing the user readily to identify places with more or less activity. This enables the user more effectively to target location-based searches via the map GUI 612. In some embodiments, the color-coded heatmap 625 is shown only at a highest level of magnification. In this example embodiment, however, the color-coded heatmap 625 is rendered at all zoom levels.
- Thumbnail icons 631, 633 for surfaced content forming part of ephemeral galleries or stories. As described previously, these include in this example embodiment place icons 631 for geo-anchored stories associated with particular labeled locations, and spike icons 633 for location-based stories surfaced based on anomalous levels of geo-spatial activity.
- Friend bitmojis 640 of friend users most frequently contacted by the user who is logged in to the social media client application 104 executing on the client device 102 and by which the map GUI 612 is generated.

In some embodiments, no spike icons 633 are shown at some levels of magnification. In a particular example embodiment, no spike icons 633 are shown at the original zoom level at which the map GUI 612 loads by default. In such an example, only the heatmap 625, friend bitmojis 640, and a number of place icons 631 are displayed on the map 618 at the original zoom level. As the user zooms in, spike icons 633 are surfaced, representing respective clusters of activity.

It will be appreciated that different icons 631, 633 are surfaced at different zoom levels. In this example embodiment, the map GUI 612 displays no more than a predefined maximum number of place icons 631 and no more than a predefined maximum number of spike icons 633 in any particular view. For example, at any zoom level, the top three place stories (ranked by snap volume) are surfaced by displaying respective place icons 631 in the map viewport 621. Likewise, at any zoom level, the top three spike stories (ranked by anomaly or unusualness metric value) are surfaced by displaying respective spike icons 633 in the map viewport 621.

In addition to viewing stories surfaced in the map 618 by respective story icons 631, 633, the user can use one or more of the search functionalities described above to access any snap uploaded to Our Story and whose gallery participation timer or availability lifetime has not yet expired.

It will be appreciated that the map GUI 612 is dynamic, in that the information displayed therein changes dynamically with time. New snaps may continually be uploaded to Our Story, while the underlying social media items upon which surfacing of the story icons 631, 633 and generation of the heatmap 625 is based can further continually change due to the expiration of the availability of snaps. In this example embodiment, however, the information displayed in the map viewport 621 is not dynamically updated during display of any particular geographical area. Instead, changing of the focus of the map viewport 621 is associated with receiving updated information with respect to the story icons 631, 633 and heatmap 625 from the application server 112.

It is a benefit of the map GUI 612 as described with the example embodiments that it provides for user-friendly and intuitive interaction with geographically distributed social media content. The provision of different types of social media galleries (e.g., represented respectively by spike icons 633 and place icons 631) provides a system that automatically surfaces only content which is most relevant for user-selection in such a manner that the very large number of individual social media items that may be available via a social media platform is reduced in complexity, and that allows selection of targeted content in which the user might be interested.

Mechanisms Providing Map GUI Functionality

Friends Location Serving

Some aspects of this disclosure relate to server-side architecture and operations to facilitate efficient serving of location information to the applications consuming the information to display friend locations via a map-based GUI such as the map GUI 612 described above. Such applications include on-device social media applications such as the social media client application 104 executing on respective user devices, also occasionally referred to herein simply as clients. In some example embodiments, the client device 102 issues calls to retrieve and update location sharing profile, update the user's location, and retrieve friends locations. These calls are received and acted upon by an application server in communication with the client via the Internet 106, in this example embodiment being received and acted upon by the social media application server system 108.

In some embodiments, a FriendLocationsServlet on the server is responsible for returning friends locations. This servlet works as follows:

- Retrieve the list of friends;
- For each friend, get the location sharing profile (from a server-side entity datastore, maybe cached in memcache);
- For each friend, see if the current user is authorized to see their location. (In some embodiments, each friend of the current user is authorized to see their location at one of a plurality of stratified levels of display granularity, e.g. to see their precise location or to see their city location). Make a list of keys (e.g., memcache keyes) to retrieve the locations;

Get all the locations in a single call to the entity datastore (location can be cached in memcache, so that all the locations are retrieved in a single memcache call).

Return the list of locations to the client.

Such an architecture can in some aspects be problematic because it involves multiple round trips to entity store and memcache. Consider, for example, that such a Get Friends Locations call is latency-sensitive, and is to be served within hundreds of milliseconds, ideally within tens of milliseconds. This implies limitations to the number of round-trips that can be made to parts of a hosting web framework and cloud computing platform, such as Google App Engine (GAE) infrastructure (including memcache, datastore, etc.).

Figure 13A:
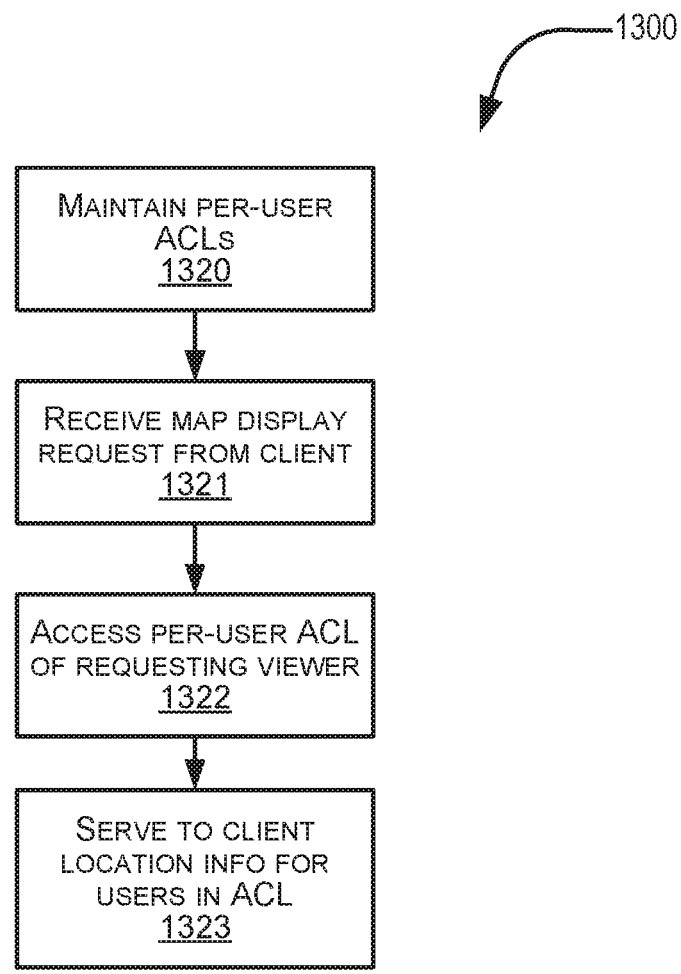
FIGS. 13A-13C are a series of flowcharts illustrating a method for maintaining and serving friend location information for use in a map-based GUI, according to example embodiments.
Figure 13B:
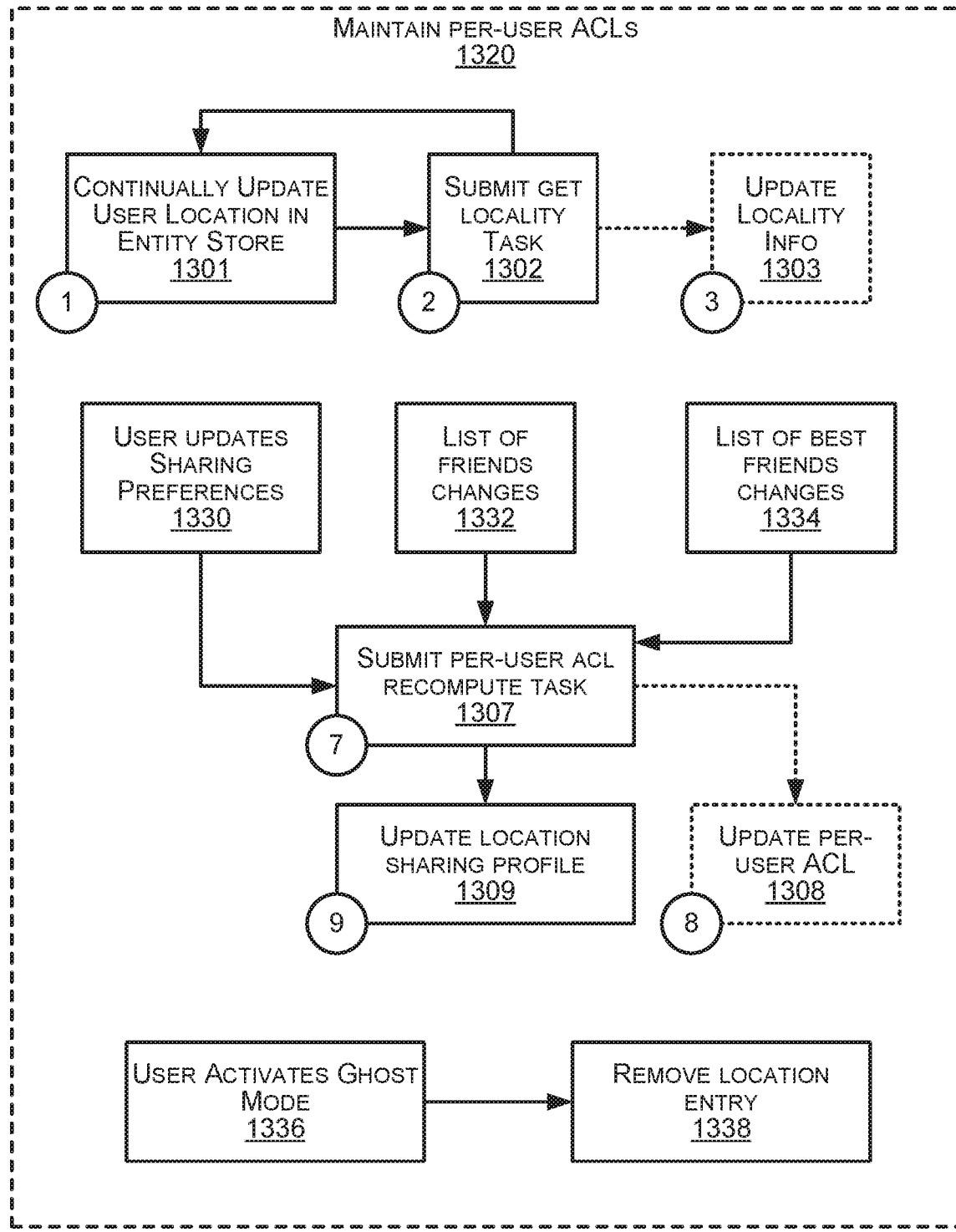
Figure 13C:
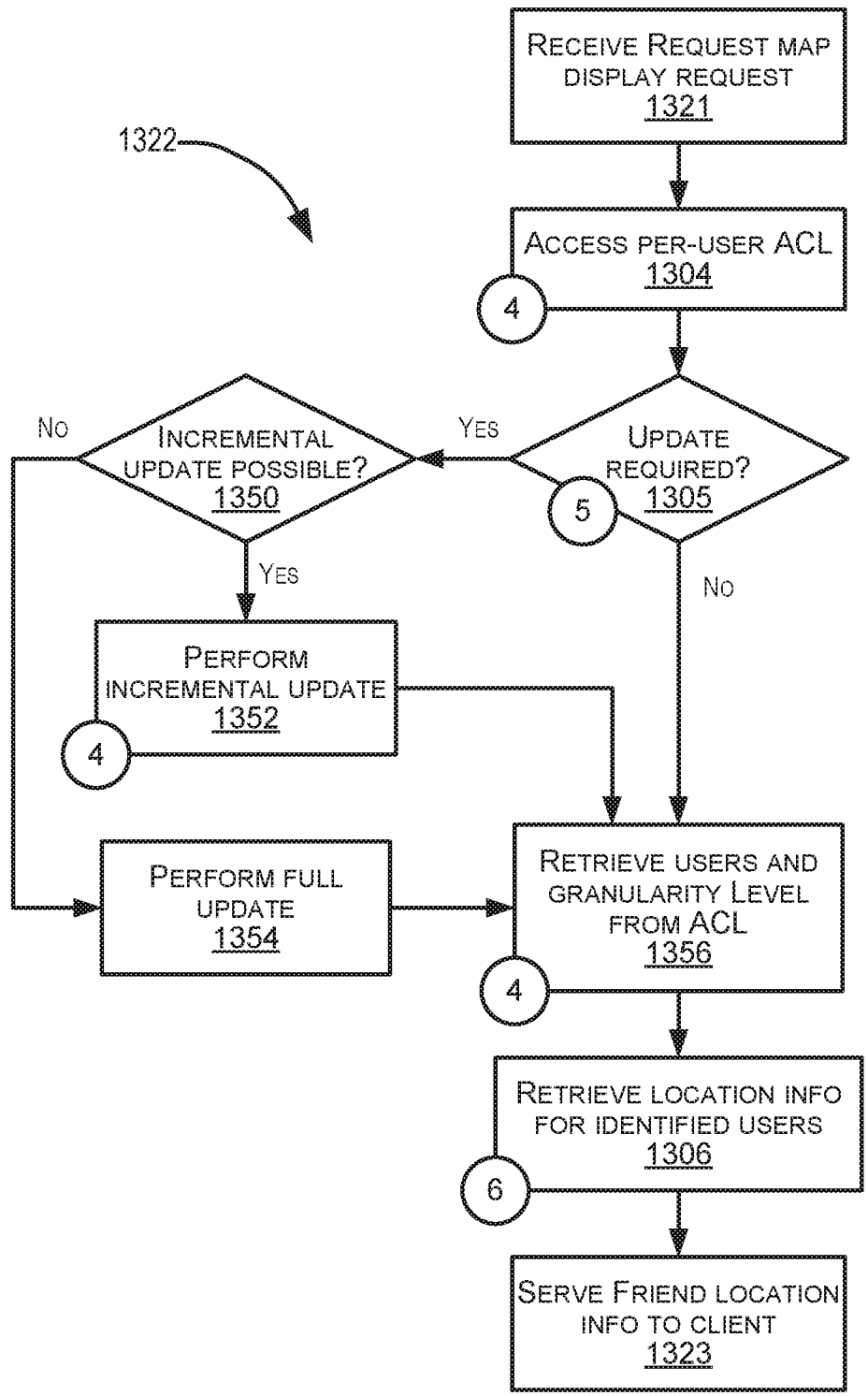

FIG. 12 illustrates a server-side architecture that provides an improved friend location serving mechanism, according to an example embodiment. FIGS. 13A-13C show a series of flowcharts that illustrate an example method for friends location serving using the architecture of FIG. 12, according to an example embodiment. The disclosed architectures, methods, and techniques facilitate the ability to handle potentially large lists of friends more efficiently.

The schematic diagram of FIG. 12 shows an overview of server-side architecture 1200 of the example embodiment as it relates to friends location serving. In some example embodiment, the illustrated server-side architecture 1200 is provided (with the exception of elements such as task queues 1205 and 1260 that are performed off-server by a cloud-based service) by a server system for the social media platform, for example being performed by the social media application server system 108 described with reference to FIGS. 1-5, also referred to in this description simply as the server system 108. The server system 108 includes an entity datastore 1203 comprising a database in which is stored user and location data in a number of different storage locations or different datastores. The architecture 1200 is configured to perform a number of tasks, some of which are numbered by respective labels in the diagram of FIG. 12 for the purpose of simplifying description.

The server architecture 1200 in this example embodiment includes four servlets responsible for location sharing profiles, updating location, and returning friends locations, namely:

GetShareLocationPreferences servlet 1253 returns the location sharing profile for a requesting or current user;

SetShareLocationPreferences servlet 1247 updates the location sharing profile for the user;

UserLocation servlet 1217 updates the user location; and

FriendLocations servlet 1229 returns the friends locations.

The architecture 1200 is arranged to minimize or at least reduce the latency of the call of FriendLocations servlet 1229, based on the insight that delays in returning friend location information to a client device 102 requesting user location information can significantly contribute to lag and consequent user frustration or even render the application practically unusably slow. In comparison, latency of calls by the UserLocation servlet 1217 is considered to be of lesser importance. This is because the client device 102 does not have to wait for the call to return, and, if the call fails, can do nothing except retrying it some time later. In order thus to minimize the latency of a call to retrieve friend locations, a list of users who can be seen by a given user (either precise or at city-level) is kept as an entity in the entity store. This entity is referred to as the per user access control list (ACL) 1235 in the diagram of FIG. 12. Note that the per user ACL 1235 is in this example embodiment maintained in the entity datastore 1203 as an entity in addition to respective per user location sharing profiles 1241, which list the users who can see the location of a given user.

In this example embodiment, the per user ACL 1235 entity is generated every time when (a) the user updates their location sharing profile: (b) the list of friends is changed; or (c) the list of best friends is changed. Updating per-user ACL 1235 can potentially be time-consuming, and is in this example embodiment done via a Google Cloud Platform (GCP) async task 1260 (tasks number 7 and 8).

Respective request flows for each servlet in the example embodiment of FIG. 12 is summarized as follows:

GetShareLocationPreferences Servlet 1253
1. Get the user name;
2. Construct entity key, retrieve the entity (10);
3. If the entity not found, construct the default profile (with location sharing disabled) and return it;
4. Return profile as JSON object SetShareLocationPreferences Servlet 1247
1. Get the user name;
2. Extract data from request parameters, create profile entity and set its fields;
3. Update entity in the entity store (9);
4. If the sharing mode is Ghost Mode, remove the location from entity store;
5. Submit per-user ACL 1235 update as async task (7)

UserLocation Servlet 1217
1. Get the user name;
2. Retrieve the sharing profile entity by user name;
3. If the location sharing is disabled (Ghost mode), return;
4. Encrypt location data and write location entity (1);
5. Schedule an async task to write locality information (human-readable description of location, such as "New York, N.Y., USA" (2).

FriendLocations Servlet 1229
1. Get the user name;
2. Retrieve the list of users the caller can see on the map (in this example, the per user ACL 1235) (4);
3. For each user, get their location (6), and return the list.

Update Per-User ACL Async Task 1260
1. User name is passed as a parameter.
2. Get the location sharing profile;
3. Get the list of friends;
4. If the location sharing profile specifies the default mode as sharing to best friends, get the list of best friends;
5. If sharing to custom audience, or if overrides are specified, get this list from location sharing profile;
6. Compile the list of user ID to location sharing mode pairs;
7. For each pair, retrieve per-user ACL 1235 and update it.

It will be noted that maintenance and availability of the per user ACL 1235 provides for reduced latency on retrieval of user locations that are to be displayed on the map GUI 612, thus increasing responsiveness and map rendering speed as compared to the sequence of operations what would be performed to determine the friend locations to be displayed without access to the pre-compiled per user ACL 1235. Additionally, note again that in this example embodiment, the per user ACL 1235 stores a list not only of those users whose locations can be viewed by the calling user, but does so at different granularities or levels of preciseness, maintaining a list of users who can be viewed at city level and a list of users whose locations can be viewed precisely.

In other embodiments, additional granularity levels may be maintained, or a single list of available users at a common level of preciseness may be maintained.

In some embodiments, the per user ACL 1235 includes not only a list of users whose locations are viewable by the corresponding user, but additionally includes respective user location entries indicative of the locations of the listed users. In such embodiments, latency is further reduced when retrieving all friends locations, as these locations are retrievable from the per user ACL 1235 itself. The call to read user locations (tasks 6) would not be necessary in such example embodiments.

Note that if the list of friends or best friends of a particular user is changed, the corresponding per-user ACL 1235 is updated when FriendLocations servlet 1229 is called. In this example embodiment, the incremental changes can be found using datastore entities FriendLinkMetadata 1223 and FriendLinkLog (not shown)). Locations entities are deleted from a location table 1211 in the entity datastore 1203 if they are older than a predefined expiry age, as indicated by the timestamp info. In this example embodiment, location entries expire after 24 hours. This is handled by a cleanup cron job 1290, which runs every hour and removes all the expired locations (11).

Updating ACLs

Two processes are involved in updating the per-user ACLs 1235, namely pull updates and push updates. Pull updates happen when FriendLocations servlet 1229 is called, and push updates occur associated users update their sharing preferences.

Pull Updates

When the FriendLocations servlet 1229 is called, per-user ACL and some related entities are called to find out if the ACL 1235 is up-to-date (see also operation 1305 in FIG. 13C). If so, the location sharing mode mapping in the relevant per user ACL 1235 is used to retrieve the list of users the calling user has rights to see. If the ACL 1235 is not up-to-date, it is updated in either a full update (see also operation 1354 in FIG. 13C) or an incremental update (see also operation 1352 in FIG. 13C).

Full Update:

If insufficient data is available to perform an incremental update (as explained below), a full update is performed. This involves retrieving the relevant list of bidirectional friends and, for each friend, getting the location sharing preferences (e.g. from location sharing profile store 1241) and updating the ACL entry based on that. In this example embodiment, as a precaution, a full update is performed if the time since the previous full update exceeds a predefined threshold, in this instance if the last full update was done more than one hour ago.

Incremental Update:

If sufficient data is available to retrieve deltas from a friend log and/or the FriendLinkMetadata 1223, incremental changes since the last update can be found (e.g., including friends added or removed). ACL entries are then updated only for those friends thus identified.

Push Updates

Pull updates are unable to deal with changes in location sharing preferences. For such changes, push updates are employed. When a user updates their location sharing preferences, an asynchronous task 1260 is started to update all their friends' ACLs 1235.

The asynchronous task (tasks 8 perform via the async tack queue 1260) carries no state—it basically means "update ACL based on the latest data". When executing, a separate transaction is fired for each friend, calculating the applicable effective sharing mode and updating the corresponding ACL entry based on that. It is also verified that the ACL user is still a friend at the time transaction is executed.

If a transaction fails, it is retried by a RetryingCaller servlet. If it still fails after several retries, the whole task is restarted. The push queue 1260 will keep trying to execute task until a timeout is reached (in this example, 1 hour). Because there is in this example embodiment a full ACL update every 1 hour, the task then becomes unnecessary.

An exception to the updating of location sharing data mechanisms as described above is when a user changes their location sharing preferences (or otherwise switches to) an invisible mode, in which the location of the particular user is to be invisible to any other user. As described previously herein, such an invisible mode is in this example embodiment referred to as ghost. As explained previously, a user of the map GUI has the option to enter Ghost Mode, in which the user's location is not made available to any other players. Responsive to a user switching to Ghost Mode, not only is an ACL update task (in the example embodiment of FIG. 12, task 7) started immediately, but the relevant user location is also immediately deleted from the entity datastore 1203, in particular being in this example embodiment deleted from the precise location datastore 1211. If (due to a bug on the client device 102, or some call that got out of order) the client device 102 tries to update the location while the user is in ghost mode, this update is ignored.

A benefit of this mechanism for implementing Ghost Mode is that, when the user goes to Ghost Mode, the effect is substantially immediate and independent of ACL propagation. After switching to Ghost Mode, that user's location is no longer available from the location datastore 1211, so that a call for the user's location due to, for example, an outdated per-user ACL of another user, would fail to return any location data item whatsoever for the ghosted user.

In some embodiments, a size limit is imposed on the on ACL 1235, which prevents problems with ACL updates when the list of friends becomes too large. This example embodiment, the number of entries in any per-user ACL 1235 is limited to a fixed upper boundary, here 200 entries. Note that this is effectively the limit on the number of people who are bi-directional friends with the user AND are sharing their location with them.

Note that, with the described example update mechanism, concurrent push and pull updates cannot result in a race condition, because push updates carry no state and each transaction is guaranteed to update the corresponding ACL entry based on the up-to-date data. If there is a concurrent pull update, either the push update or pull update will fail due to concurrent modification exception and will be restarted. In this example embodiment, the push queue 1260 will keep trying every 30 seconds up to an hour. There is in this example embodiment a regular hourly pull update. Thus, a worst case scenario is to have an incorrect ACL entry for an hour.

The structure of the per-user ACL 1235 in this example embodiment is given below. Recall that this entity contains user IDs of users whose locations can be seen by the calling user at different levels of display granularity.

---

"PRECISE": ["user1", "user2", "user3", ...]
"CITY": ["user4", "user5", "user6", ...]

---

In a different embodiment, the per-user ACL 1235 may have a structure having separate preciseness level entries for each listed user (being those users whose locations are viewable by the calling user), e.g.:

```
{
    userId1: PRECISE,
    userId2: CITY,
    userId3: PRECISE,
    ...
}
```

As mentioned previously, each per-user ACL 1235 in a different embodiment includes a respective location entry indicative of the location of the respective listed user. An example ACL structure of such a data entity is as follows:

```
{
    userId1: PRECISE: locationUser1,
    userId2: CITY: locationUser2,
    userId3: PRECISE: locationUser3,
    ...
}
```

In instances where the list of friends, as indicated in the per user ACL 1235 is excessively long, potentially slow-down of the client application could be caused by returning the full list of friends and locations in one roundtrip. To avoid this, some embodiments provide in such instances for obtaining a partial list (e.g., best friends first or list of friends currently on the map) together with a continuation flag. The list of all users still to be retrieved is then to memcache with short expiration time (minutes), and random GUID. The client device 102 will have to re-issue get friends locations call with that GUID to retrieve the next batch of locations.

Turning now to FIG. 13A-13C, therein is illustrated respective flow chart showing various methods and procedures for serving friends location information to a client device 102 enabled the rendering of respective friend icons (e.g., bitmoji 640) representing associated geographic locations of friends of a user in a map 618 forming part of a map GUI 612 such as that described with reference to FIGS. 6A-11B. The various operations performed in this example embodiment is performed using the server architecture 1200 and associate techniques described above with reference to FIG. 12. The descriptions of the flowcharts are thus to be read based on the foregoing description with reference to FIG. 12. To this end, some of the number tasks illustrated schematically in FIG. 12 are mapped to the flowcharts of FIGS. 13B and 13C by respective numbered circles.

In the example embodiment of a social media platform system 1800 described later herein with reference to FIG. 18, the architecture of FIG. 12 and the methods of the FIGS. 13A-13C is provided and performed by a friends location serving mechanism 1837 forming part of the social media platform system 1800.

FIG. 13A provides a high-level view of serving friends location information to a client device 102 for the rendering of a map GUI 612. In operation 1320, the server system 108 maintains a respective per user ACL 1235 for each of multiple users of the social media platform. Each per user ACL 1235 listing a set of viewable users for a particular user. The viewable users list of other users (e.g., friend users) for whom the particular user has permission to view their respective geographic locations via the map GUI 612.

At operation 1321, a request is received from the client device 102 (e.g., generated by the social media client application 104) for location-based social media activity information to cause display of the map GUI 612, the requested information including location information for viewable friends of the user. In response to the request, the server system 108 performs an automated friends forgetting serving procedure that comprises: at operation 1322, accessing the per-user ACL 1235 of the requesting user, thereby determining the set of viewable users for the requesting user; and, at operation 1323, serving to the client device 102 respective location information for each of at least a subset of the viewable users. The location information includes a display location for each user, for example comprising a set of coordinates for displaying the corresponding bitmoji 640.

In some embodiments where a user's actuals location and display location can in some instances be different (e.g., where display is to occur at different granularity levels), the location information can include coordinates together with an indication of the associated location display granularity level. E.g., each set of coordinates can have an associated indication of display at precise or city level. In such embodiments, the calculation of the display coordinates is performed client-side. In other embodiments, determining of non-precise display coordinates can be performed server-side, in which case the location information transmitted to the client device 102 comprises in all instances the coordinates for the display location.

FIG. 13B shows a more detailed flowchart for the operation of maintaining the maintaining the per-user ACLs 1235 for the multiple users. At operation 1301, respective location entries for the users are continually updated in the location datastore 1211. In addition, an async task is scheduled, at operation 1302, to write locality information (e.g., human-readable descriptions of respective locations) to the location datastore 1211. This is performed, at operation 1303 by GCP task 1205.

Re-computing of per-user ACLs 1235 is triggered, at operation 1307, by the occurrence of any one of: receiving a change indication that indicates that a user has updated their location sharing options or preferences, at operation 1330; changes to a list of friends of a user; and changes to a list of best friends of a user. Responsive to occurrence of any one of these, the SetShareLocationPreferences servlet 1247 submits, at operation 1307, a per-user ACL recompute desk, which is performed, at operation 1308, by GSP task 1260. SetShareLocationPreferences servlet 1247 also updates the corresponding location sharing profile 1241, at operation 1309.

Additionally, a response to a user choosing to operate in an invisible mode by, in this example embodiment, activating Ghost Mode, at operation 1336, the SetShareLocation-Preferences servlet 1247 automatically and immediately triggers removal of the location entry for that user from the location datastore 1211.

FIG. 13C shows a more detailed view of operations forming part of the procedure for retrieving and serving friend location information according to an example embodiment. Responsive to receiving a map display request, at operation 1321, the FriendLocations servlet 1229 accesses the per-user ACL 1235 of the requesting user, at operation 1304. It determines, at operation 1305, whether or not an update to the per-user ACL 1235 is required. If not, the list of viewable users and their respective granularity level values are retrieved by the FriendLocations servlet 1229 from the per-user ACL 1235, at operation 1356.

If, however, update is required, it is determined, at operation 1350, whether or not an incremental update is possible. If so, an incremental update is performed, at operation 1352, using the relevant metadata or log data, as described previously. If not, a full update is performed, at operation searching 52, as described previously.

After retrieving the set of viewable users and associated granularity levels, at operation 1356, the FriendLocations servlet 1229 retrieves respective location indicators for the set of users from the location datastore 1211, at operation 1306, and returns these values to the client device 102, at operation 1323.

The above-described aspect of the disclosure includes the various example embodiments listed below as examples 1-20, which are to be read in view, at least, of the foregoing part of the description.

Map Stylization and Satellite Tile Serving

Some embodiments of the map GUI 612 provide for the rendering of stylized map imagery based on earth imagery provided by satellite or aerial photography. A method according to some aspects of the disclosure can in such embodiments include accessing photographic Earth imagery of a geographical area captured from an elevated position, generating stylized Earth imagery by applying a graphical style to the photographic imagery in an automated stylization procedure performed using one or more computer processors configured therefor, and causing generation on a user device of the map GUI 612 for the social media platform such that the interactive map viewport 621 of the map GUI 612 displays a view of the geographical area using the stylized Earth imagery.

Such Earth imagery is typically provided in the form of multiple earth imagery tiles, each of which comprises a photographic image (e.g., a satellite image or an aerial photograph) of a corresponding portion of the Earth's surface. For consistency of description, such Earth imagery tiles of further referred to herein simply as satellite tiles, but it will be borne in mind that some such tiles may at some zoom levels be provided by aerial photography. Stylized tiles generated based on the satellite tiles are referred to herein as stylized tiles or map tiles, being the tiles from which the underlying map 618 in the map GUI 612 is constituted.

Stylization of the satellite tiles comprises applying one or more visual effects to the photographic imagery, to create a version of the image modified according to a consistently applied graphic style. Example styles that may be applied to satellite tiles in this example embodiment include a brightly colorized style with increased flat surfaces of even color, named Marilyn. and a Bitmoji-style having a cartoonlike effect similar to that applied to bitmojis. In some embodiments, the stylization is performed using a trained neural network, for example stylizing basic satellite tiles using Snapcraft's neural network-based stylizer.

In this example embodiment, satellite imagery is received tile-wise, comprising a multiplicity of respective satellite tiles. The satellite tiles are stylized separately, and are then collated or stitched together to form a uniformly stylized map 618 of the relevant geographic area for display in the map viewport 621. In the example embodiments described with reference to FIG. 6A, for example 16 stylized map tiles are required to render the geographical area encompassed by the map viewport 621.

The generating of stylized map tiles in some embodiments comprise using a trained neural network to stylize respective satellite tiles. As will be described in greater detail below with reference to FIG. 15C, the generating of each stylized map tile in some embodiments comprises: retrieving a target satellite tile together with a set of neighbor tiles immediately bordering the target satellite tile; generating an expanded satellite tile based on the target satellite tile and its set of neighbor tiles, the expanded satellite tile having an expanded area relative to that of the target satellite tile; and stylizing the expanded target satellite tile, thereby generating an expanded stylized tile.

Generating the expanded satellite tile comprises stitching together the target satellite tile and its set of neighbor tiles to compose a macro tile, and cropping the expanded satellite from the macro tile. The expanded satellite tile may be cropped such as to be centered on the target satellite tile with a buffer zone extending around the periphery of the target satellite tile. In one example embodiment, the buffer zone is 100 pixels in width. The generating of the target stylized tile may in some embodiments comprise cropping the expanded stylized tile to correspond in geographical area and focus to the target satellite tile.

In some embodiments, the method comprises generating a respective set of stylized map tiles for each of a plurality of zoom levels. Each set of map tiles may be stylized based on a corresponding set of satellite tiles captured at corresponding zoom levels. Note that the style of map stylization in this example embodiment remains constant for different zoom levels.

In other embodiments, different neural networks may be employed for stylization of map tiles at different respective zoom levels, so that the different zoom levels are stylized differently. It will be appreciated that different styles may be aesthetically and functionally more appropriate for use at different zoom levels, considering the different visual textures and details that manifest at different zoom levels.

In some embodiments, map stylization may be varied based on one or more factors including: geographic location, season/holiday, events occurring in the geographic area, and selective user preference. Thus, in one example, different cities or urban areas may by default be stylized according to different respective styles. The different styles for respective areas may be chosen such that there is a correspondence between the respective styles and reputations, history, tradition or atmosphere of respective areas. For example, New York may be stylized according to a modernistic style, while Paris may be stylized according to an impressionistic style. Instead, or in addition, the stylization of a particular area may vary seasonally or with occurrence of particular holidays. Thus, for example, a single setting may be stylized differently on Halloween, on Christmas. and on St. Patrick's Day.

Instead, or in addition, map stylization may be performed based at least in part on selected user preferences. The map GUI 612 thus in some example embodiments includes a selection menu presenting a user with a plurality of style options, for example enabling the user to choose between the Bitmoji style and the Marilyn style. Responsive to user selection of a particular style, the map viewport 621 thereafter displays the interactive map 618 stylized according to the selected style. In some embodiments, the user is enabled to select different styles for different respective geographic areas.

Figure 15A:
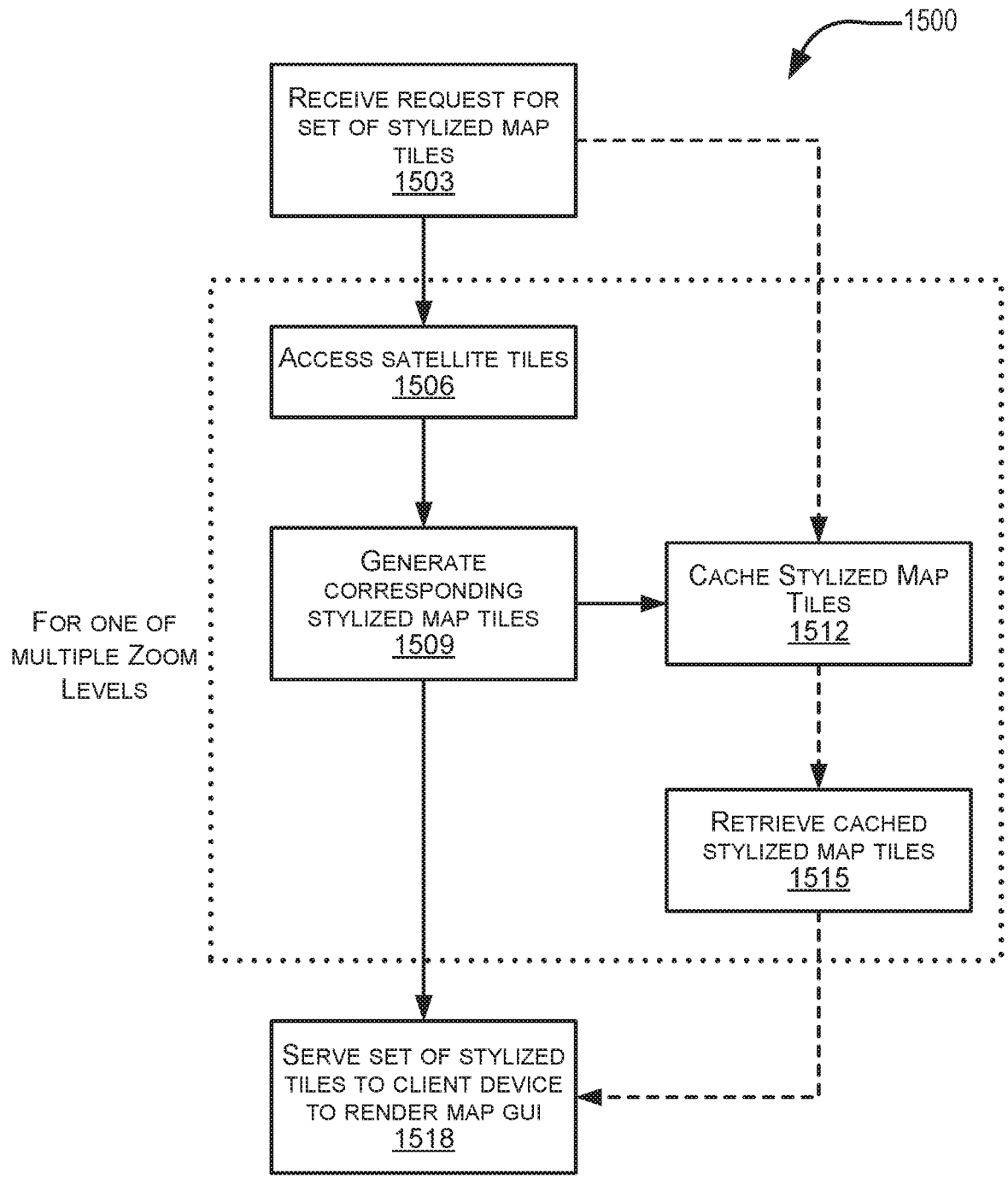
FIG. 15A-15B are flowcharts illustrating a method for generating and serving stylized map tiles, according to an example embodiment.
Figure 15B:
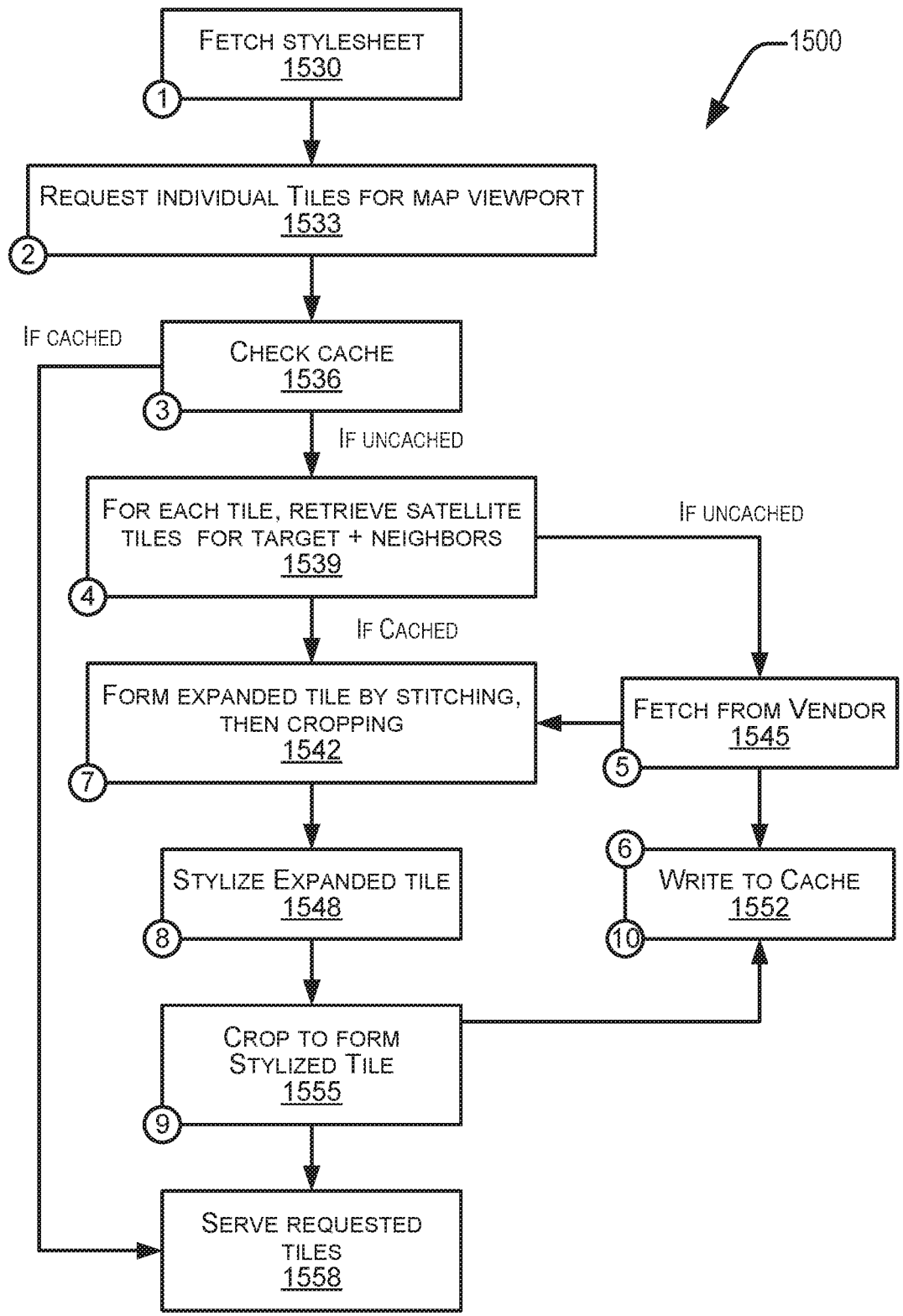
Figure 15C:
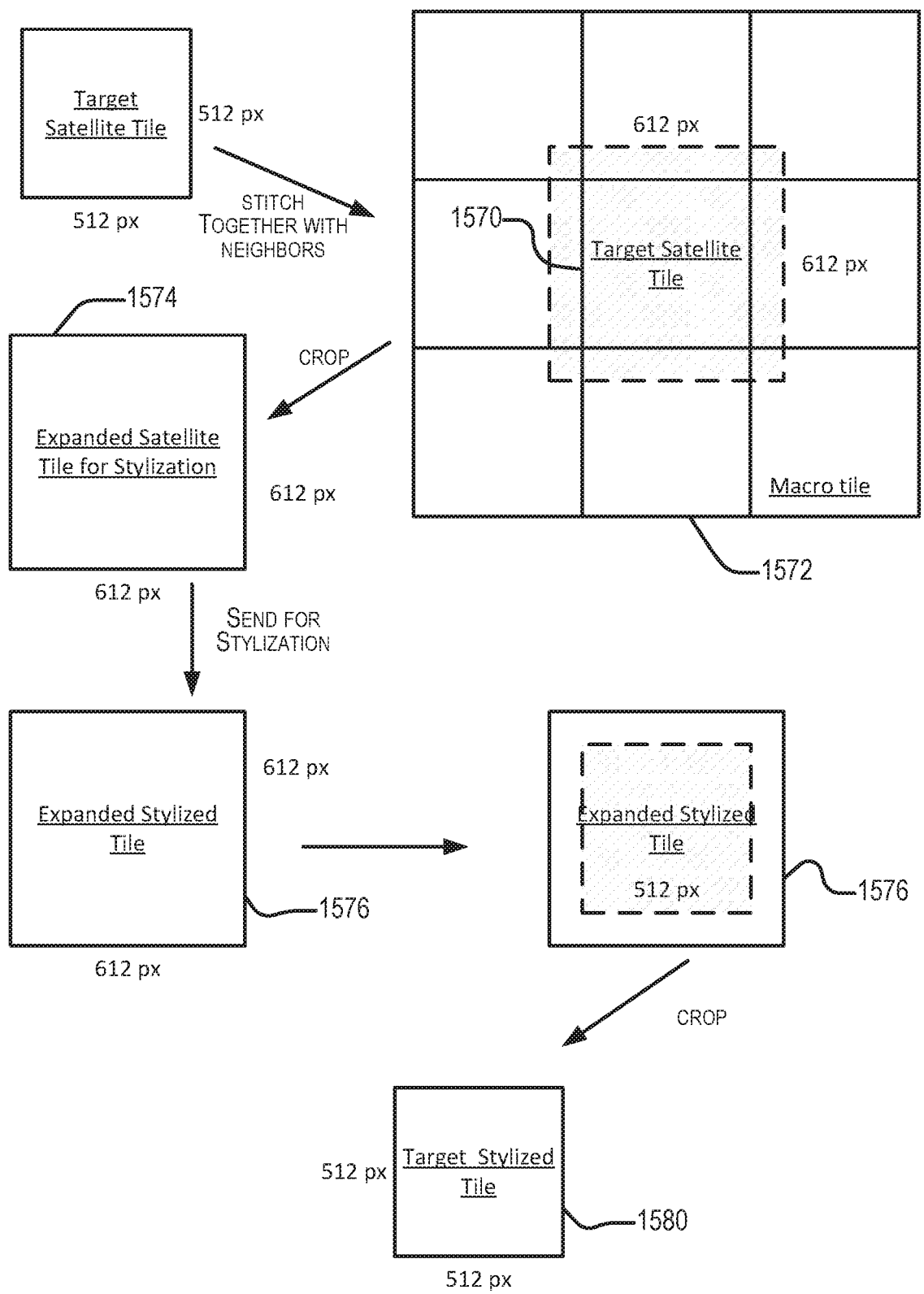
FIG. 15C is a schematic diagram illustrating a series of transformations performed according to the example method of FIG. 15B to generate a target stylized tile.

Various aspects will now be described relating to server-side functionality in order to create and serve stylized map tiles based on vendor-supplied satellite tiles and Snapcraft stylization with relatively low latency and minimal computational cost. FIG. 4 shows a schematic diagram of an example server-side architecture 1400 providing these functionalities; FIGS. 15A and 15B show flowcharts illustrating a series of operations for stylizing and serving the map tiles; and FIG. 15C schematically illustrates a sequence of transformations for generating a single target stylized tile based on a corresponding target satellite tile.

One part of the disclosed technique comprises creating a unique set of stylized map tiles. This includes taking basic satellite tiles from a map provider (represented in FIG. 14 as tile vendor system 1421, e.g. MapBox) and stylizing them using a neural network-based stylizer system 1428 (in this example being provided by SnapCraft). In this description, the term vendor tiles means satellite tiles provided by a vendor.

As discussed, the provision of stylized map tiles presents a number of challenges. Firstly, the scope of Earth imagery to be stylized is massive, consisting of over 20 billion tiles for the entire world. Network-based stylizers, however, typically have relatively high latency and low throughput. The stylizer system 1428 in this example embodiment, for example, has a latency of 300-400 ms for each 512×512 pixel tile, and a throughput of about 3 queries per second (QPS) per 16 core machine. The social media platform, however, is to be able to provide significantly lower latency and higher throughput, being expected to have a throughput of about 20 k QPS at peak.

As mentioned, satellite tiles of size 512×512 pixels are in this example embodiment retrieved from the online tile vendor system 1421. The map viewport 621 on a standard device in portrait mode requires 16 such tiles to render the map 618. In this example embodiment, a vendor SDK 1407 executing on the client device 102 uses a custom style which directs satellite tile fetches to a proxy server running on AppEngine Flexible Environment (Flex).

In this example embodiment, different sets of stylized tiles are generated and maintained for each of a plurality of different zoom levels. In the present example embodiment, satellite view for zoom levels 13 through 17 is supported. This results in a total tile count of over 20 billion. It is estimated that ~1% coverage of the Earth's surface would be required for regular usage, which still requires about 200 million tiles.

Secondly, smooth and consistent stylization of tiles is problematic, particularly when considering that the stylized tiles are stitched together to provide a single composite view in the map 618. Avoiding stylization artifacts or discontinuities when separately stylized tiles are stitched together for forming a composite image to be displayed in the map viewport 621 presents difficulties. These difficulties are to at least some extent ameliorated by the techniques for stylized map tile generation and serving described below.

Figure 14:
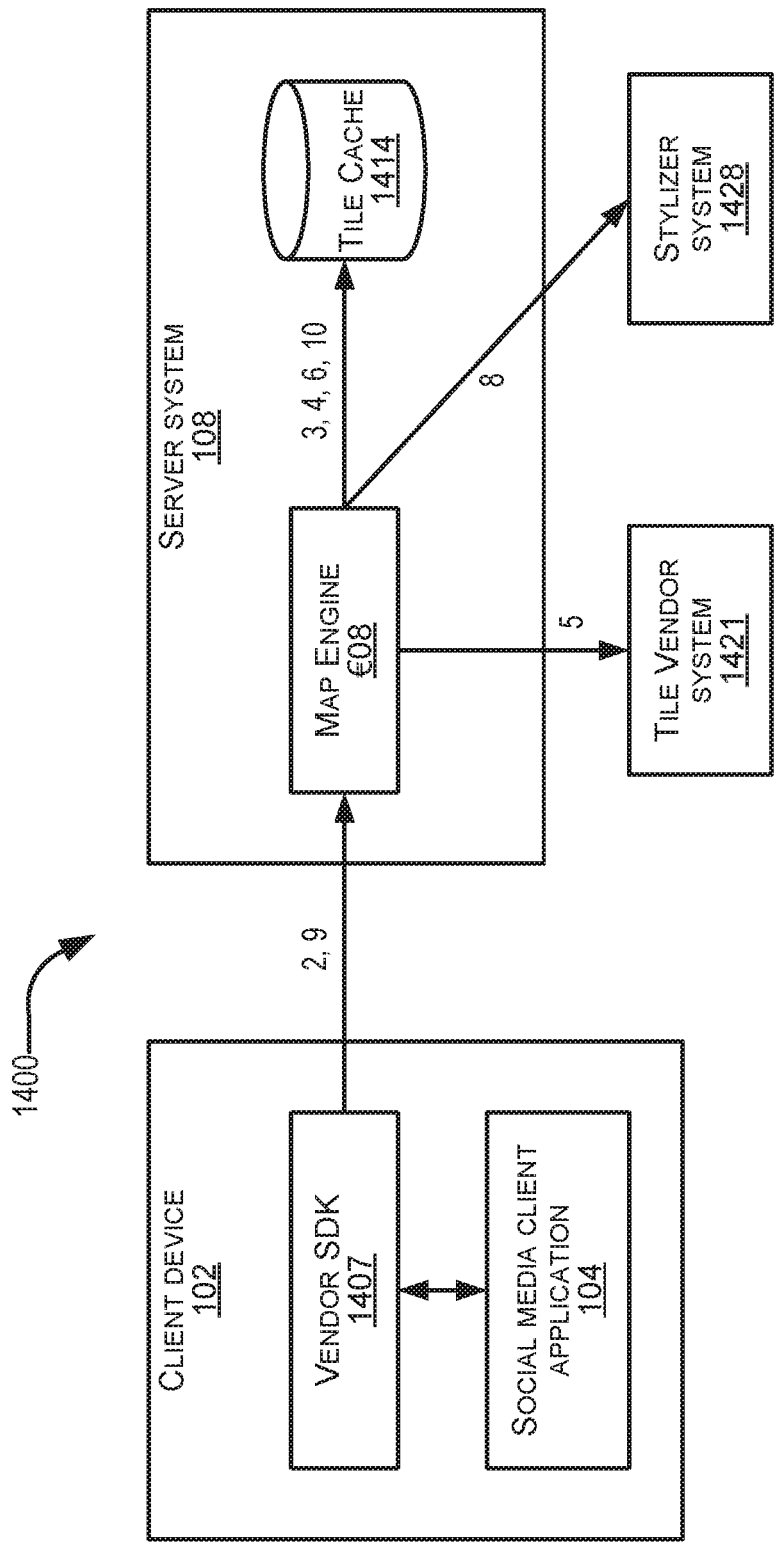
FIG. 14 is a schematic diagram of parts of a system for generating and serving to a client device stylized map tiles for use in generating a map in a map-based graphical user interface, according to an example embodiment.

As will be seen with reference to the descriptions of FIG. 14, a map engine 1808 provided by the server system 108 is in this example embodiment responsible for serving all map tiles to client devices 102.

FIG. 15A shows a high-level view of a method 1500 of generating and serving stylized map tiles for the generation of a stylized interactive map forming part of a map-based GUI. The method 1500 will be further described with respect to the specific example embodiment of the map GUI 612 described with reference to FIGS. 6A-11B.

At operation 1503, a request is received from decline device 102 for display of a target area in an instance of the map GUI 612. The target area is in this case the particular geographical area to be displayed within the map viewport 621. In new view request can thus in some embodiments be triggered when focus of the map viewport 621 switches to a new area. The view request specifies not only the target area, but also the zoom level of the requested view.

Responsive to the request, the map engine 1808, at operation 1518, serves to the client device 102 the set of stylized map tiles corresponding to the requested target area and zoom level. As will be described in greater detail with reference to the example embodiment of FIG. 15B, the requested map tiles can be generated responsive to the view request, or can be retrieved from a previously compiled tile cache 1414. In such a case, the requested map tiles are, at operation 1515, retrieved from the tile cache 1414 and served to the client device 102, at operation 1518.

In the example embodiment of FIG. 15A, the generation of map tiles is shown as being performed responsive to the view request, but the method can instead or in addition comprise compiling respective sets of stylized map tiles for the supported zoom levels without being prompted by a specific view request. For example, a respective set of tiles for each zoom level can be precompiled for popular areas.

In any event, preparing the stylized map tiles comprises, at operation 1506, retrieving from the tile vendor system 1421 the satellite tiles corresponding to the requested map tiles in coordinates and in the particular zoom level from the plurality of supported zoom levels. The requested map tiles are then generated based on the satellite tiles, by stylizing the satellite tiles. The stylized map tiles are then, at operation 1512, stored in the tile cache 1414, and are served to the client device 102, at operation 1518.

Further details of the example method 1500 will be described with reference to FIGS. 15B and 15C. In particular, FIG. 15C illustrates the series of transformations and operations that are performed on a single target satellite tile 1570 to generate a target stylized tile 1580 based thereon. Again, it is noted that the terms stylized tile and map tile are used synonymously in this part of the description.

The map engine 1808 handles three main types of requests:
  Stylized tile requests: These are requested by the vendor SDK 1407 on the client device 102.
  Map tile cache request: Used by warmup scripts to cache the stylized version of tiles.
  vendor cache requests (/mapbox/cache/{tile id}): Used by warmup scripts to cache vendor tiles.

The tile id in end points is based on slippy coordinates and defined as {zoom}/{x}/{y}

The stylization procedure of FIG. 15B in this example embodiment includes the following enumerated steps, indicated schematically in FIG. 14 with corresponding numbers associated with respective arrows, and in the flowchart of FIG. 15B with respective numbered circles.

STEP 1: At app startup, the vendor SDK 1407 fetches the style sheet that defines vendor settings, at operation 1530. This contains the endpoint for fetching stylized tiles.

STEP 2: When user is viewing the map 618, the tiles for the given map viewport 621 are requested individually, at operation 1533, via the vendor SDK 1407. The vendor SDK hits the specified endpoint when a tile is not in local cache on the client device 102.

STEP 3: The map engine 1808 (here running on Appengine Flex) checks, at operation 1536, the tile cache 1414. If the requested tile is cached, it is retrieved from the tile cache 1414 and returned to the client device 102, at operation 1558.

STEP 4: On cache miss at operation 1536, a target stylized tile 1580 (see FIG. 15C) is to be generated on request. The process for stylized tile generation in this example embodiment is illustrated schematically in FIG. 15C. First, the map engine 1808 retrieves, at operation 1539, the vendor tile (indicated as target satellite tile 1570 in FIG. 15C), together with its neighboring satellite tiles. In this description, a neighbor tile means a tile that touches either a side or a vertex of the target tile, so that a square tile has eight neighbors. In the example embodiment of FIG. 15C, a total nine satellite tiles are thus retrieved. The map engine 1808 first checks the local cache and the tile cache 1414, and retrieves those satellite tiles that are available in cache.

STEP 5: If any of the target satellite tile 1570 or its neighbors are not in cache, they are at operation 1545, requested from the tile vendor system 1421.

STEP 6: Any fetched satellite tiles are written to the tile cache 1414 asynchronously, at operation 1552.

STEP 7: Once all 9 tiles are available, an expanded satellite tile 1574 is composed, at operation 1542, as illustrated schematically in FIG. 15C. First, the nine tiles are stitched together in their proper relative positions to form a macro tile 1572, being a 9-tile composite image of the target satellite tile 1570 and its surrounding area. This composite macro tile 1572 (which, it will be recalled, is still earth imagery) is then cropped centered on the target satellite tile 1570, but with a buffer zone extending peripherally around the target satellite tile 1570, thus forming the expanded satellite tile 1574. In this example embodiment, the buffer zone is 100 px in width, so that the expanded satellite tile 1574 is a square 612×612 earth imagery image. The buffer is provided to achieve smoothness at tile edges when map tiles 1580 are eventually stitched together to form the stylized map 618 in the map viewport 621. Note that other dimensions for the buffer zone (and/or for the target satellite tile 1570) can be used in other embodiments.

STEP 8: The 612×612 expanded satellite tile 1574 is, at operation 1548 (FIG. 15B), sent to the stylizer system 1428 (in this embodiment running on Flex) for stylization.

STEP 9: The returned expanded stylized tile 1576 (FIG. 15C), which is a 612×612 stylized image, is centrally cropped, at operation 1555, to produce a 512×512 target stylized tile 1580. The target stylized tile 1580 is returned to the Klein device 102, at operation 1558.

Step 10: The stylized tile 1580 is cached asynchronously in the tile cache 1414, at operation 1552.

The above steps happen on live queries, and are performed with a latency lower than 200 ms to avoid user visible loading delays. In view of high volumes of queries and relatively high latency in the stylizer system 1428 and in retrieving vendor tiles, the map engine 1808 in some example embodiments provides for pre-emptive caching of popular destinations. An example method includes identifying popular destinations based on historical viewer behavior, and performing pre-fetching and pre-stylization operations for tiles corresponding to these popular destinations, for example when a new style is rolled out. In a particular example embodiment, about 150 M tiles are thus pre-stylized. In this example embodiment, no tiles are cached on the user device 102 itself for offline consumption.

The above-described aspect of the disclosure includes the various example embodiments listed below as examples 21-40, which are to be read in view, at least, of the foregoing part of the description.

Map Data Tile and Story Manifest Generation and Serving

Some aspects of the disclosure relate to server-side architecture and mechanisms for generating and serving social media activity information tile-wise for display in combination with map imagery, as described previously. As described with reference to the example embodiments of FIGS. 6A-11B, such social media activity information in this example embodiment include heatmap data and data relating to geographically anchored stories or galleries, represented a map 618 forming part of the map-based GUI by respective icons 631, 633 located at positions on the map. The description that follows will be based on the example embodiments of the map GUI 612 described previously, but it will be appreciated that additional and/or alternative social media activity information for display in a map-based GUI may in other embodiments be generated and served analogously.

As will be seen from the description that follows, some of the disclosed server-side architectures and mechanisms promotes low latency and more efficient rendering of social media activity information on the map GUI 612. The disclosed methods comprise periodically generating map data tiles for recently submitted snaps, to be served and displayed in the client application. Such map data tiles comprise a set of data points with specified geographical coordinates. In this example embodiment, the set of data points include points of interest (POIs) corresponding to respective gallery icons 631, 633 to be displayed on the map 618. Such map data tiles are occasionally in this description refer to simply map tiles, but are not to be confused with stylized or unstylized earth imagery tiles (e.g., satellite tiles) that form the backdrop in the map 618 for display of the social media activity information.

Each map data tile in this example embodiment also includes a story manifest for each POI included in the map data tile. As will be discussed at greater length below, a story manifest provides information about at least some of the snaps that form part of the story corresponding to a particular POI.

Figure 16A:
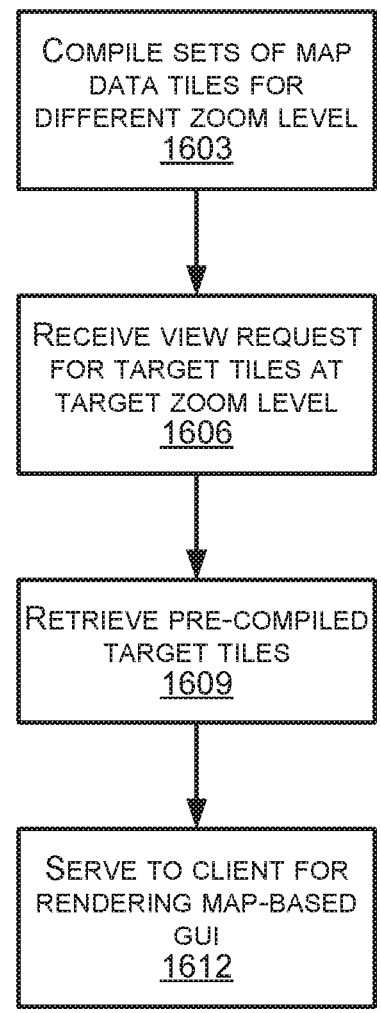
FIGS. 16A-16B is a pair of flowcharts illustrating a method for compiling and serving to the client device a plurality of sets of map data tiles at different zoom levels, according to an example embodiment.

FIG. 16A shows a high-level view of a method 1600 for compiling and serving social media activity information to a client device 102 for rendering a map-based graphical user interface. At operation 1603, a plurality of sets of map data tiles are compiled, each set of map data tiles comprising multiple tiles covering a target geographical area and being for a respective one of a plurality of different zoom levels. The map data tiles are generated based on activity data for a social media platform. The activity data comprises information about social media items (e.g., snaps) uploaded to the social media platform for general accessibility, in this example embodiment being submitted to Our Story.

At operation 1606, a request is received from a client device 102 for display in the map GUI 612 of a particular geographical area at a particular zoom level. The map engine 1808 retrieves, at operation 1609, the requested precompiled map data tiles, and serves them to the client 102, at operation 1612, for rendering the geographically registered social media activity information on the map 618 of the map GUI 612.

A purpose of tile and story manifest generation and serving is thus to display snaps submitted to Our Story (i.e., social media items that are made publicly available) by users via the map GUI 612. Displaying on the map in this example embodiment takes two forms:

- the heatmap, which shows relative social media activity in different areas of the map 618. In this example embodiment, the heatmap 625 displays relative snap volume or density, so that each heatmap data point represents posting activity at the corresponding location. In other embodiments, the heatmap may display different activity metrics (e.g., a level of unusualness or anomaly), in which case each heatmap data point is representative of a value of the relevant metric at a corresponding geographical position; and
- points of interest (POIs), being, for example, the previously described thumbnail icons that represent places considered of potential interest to users. For each POI, a story manifest is generated and stored. Each story manifest includes a list of snaps to be played if a user taps that POI. As used herein, the term manifest can thus be understood a playlist for a respective story or POI.

As representatives schematically in FIG. 16A, heatmap data, POIs, and manifests are periodically precompiled, being generated and stored, and are then served to client devices upon request. In this manner, potential latency caused by live processing of a multitude of datapoints for a requested geographical area when requested is avoided. The description that follows provides an example embodiment for architecture and mechanisms for the generation, storage and serving of tiles and manifests.

As mentioned, map data tiles consist of heatmap data and POIs. POIs also contain a preview manifest (described below). Below is the proto definition for an example map data tile (abbreviated for readability).

```
message PointOfInterest {
    enum Type {
        ACTIVITY_SPIKE = 0;
        FILLER = 1;
        ATTRACTIONS = 2;
        STORY = 3;
    }
    Type type = 1;
    string id = 2;
    Point point = 3; // (lat,lng) point
    double render_width_at_zoom_zero = 6; // in tile points. each tile
        is 512 points across.
    double render_width_slope = 7; // tile point change per zoom level.
    string label = 4;
    double score = 5;
    repeated Thumbnail thumbnails = 10;
    StoryManifest preview_manifest = 11;
}
message Thumbnail {
    string id = 1;
    string key = 2;
    string iv = 3;
    string url = 4; // optional
    string thumbnail_data = 5; // optional
    string snap_id = 6; // submission id for the thumb
}
message StoryManifest {
    string id = 1;
    string version = 2;
    string display_name = 3;
    repeated StoryElement elements = 100;
}
message StoryElement {
    string id = 1;
    ContentType content_type = 3;
    double duration = 10;
    int64 timestamp = 11; // epoch millis
    string sss_id = 12; // Needed temporarily for 7 day stories
    message SnapInfo {
        string snap_media_id = 1;
        SnapMediaType snap_media_type = 2;
        string creator_id = 3;
        string media_key = 4;
        string media_iv = 5;
        string media_url = 6;
        bool is_zipped = 7;
    }
    message WebMediaInfo {
        string content_url = 1;
        int32 duration_ms = 2;
    }
    message HtmlInfo {
        string html = 1;
    }
    oneof content_info {
        SnapInfo snap_info = 6;
        WebMediaInfo web_media_info = 7;
        HtmlInfo html_info = 8;
    }
}
```

-continued

```
message Tile {
    TileId id = 1; // {zoom, slippy-coordinates}
    TileSetId tile_set_id = 3; // {epoch-timestamp, flavor}
    repeated HeatmapPoint points = 10; // [{lat, lng, intensity,
        radius}, ...]
    repeated PointOfInterest pois = 11;
}
message PointOfInterest {
    enum Type {
        ACTIVITY_SPIKE = 0;
        FILLER = 1;
        ATTRACTIONS = 2;
        STORY = 3;
    }
    Type type = 1;
    string id = 2;
    Point point = 3; // (lat,lng) point
    double render_width_at_zoom_zero = 6; // in tile points. each tile
        is 512 points across.
    double render_width_slope = 7; // tile point change per zoom level.
    string label = 4;
    double score = 5;
    repeated Thumbnail thumbnails = 10;
    StoryManifest preview_manifest = 11;
}
message Thumbnail {
    string id = 1;
    string key = 2;
    string iv = 3;
    string url = 4; // optional
    string thumbnail_data = 5; // optional
    string snap_id = 6; // submission id for the thumb
}
message StoryManifest {
    string id = 1;
    string version = 2;
    string display_name = 3;
    repeated StoryElement elements = 100;
}
message StoryElement {
    string id = 1;
    ContentType content_type = 3;
    double duration = 10;
    int64 timestamp = 11; // epoch millis
    string sss_id = 12; // Needed temporarily for 7 day stories
    message SnapInfo {
        string snap_media_id = 1;
        SnapMediaType snap_media_type = 2;
        string creator_id = 3;
        string media_key = 4;
        string media_iv = 5;
        string media_url = 6;
        bool is_zipped = 7;
    }
    message WebMediaInfo {
        string content_url = 1;
        int32 duration_ms = 2;
    }
    message HtmlInfo {
        string html = 1;
    }
    oneof content_info {
        SnapInfo snap_info = 6;
        WebMediaInfo web_media_mfo = 7;
        HtmlInfo html_info = 8;
    }
}
```

Tiles are generated every five minutes using a dataflow pipeline. The pipeline has four major inputs:

All Our Story snaps from the previous three hours. This comes from a PubSub which is filled during story posting (which is the same PubSub used for curation activities). Geo-location, time, and thumbnail media-ids/keys/IVs from ingested snaps are used.

A Places CMS forming part of a content management system (CMS) 1824 provided by the server system 108 for curation of content by administrators. Places (i.e., explicitly defined and labeled locations based on a defined geographical boundaries) are added by administrators using the custom Places CMS and a Places database. When the pipeline asks for places, a geo search is performed on the snaps falling within the associated boundaries, to find a representative thumbnail to display for the place. A manifest of snaps to play when the place is tapped is also generated in the same fashion. Such Places POIs are in the example embodiment of FIG. 6C, for example, displayed on the map GUI with an associated place label.

Spike POIs, in this example embodiment from a separate cluster engine or Leads service. Spikes are auto-detected locations of anomalous activity, in some embodiments based on an automated anomaly calculation to identify areas with geo-temporally anomalous social media posting activity. Again, a representative thumbnail is found for the spike, as well as a manifest to play if it is tapped. In the example embodiment of FIG. 6C, such Spike POIs are surfaced on the map GUI with corresponding geo-anchored thumbnail icons without associated labels.

Story POIs. Stories are high-touch curated collections of snaps. Such stories, can, for example be an administration-curated collection of snaps associated with a particular geo-temporally event, such as a concert, a festival, an unusual accident, a natural disaster, or the like. In one embodiment of a story POIs is thus event stories or galleries as described earlier. Again, a representative thumbnail and manifest is retrieved, and the thumbnail icon may be displayed on the map GUI with an associated label.

The tile generation pipeline performs map-reduce functions on these inputs to create tiles for the map at different zoom levels. The map-reduce functions reduce the number of social media activity data points for each respective tile. In this manner the number of data points with respect to which, for example, the heatmap displayed in the map GUI is to be generated is reduced to a smaller representative data set.

Likewise, the number of POIs can in some embodiments be reduced by the map reduce functions, so that the number of POIs for a particular geographical area is different at different zoom levels, based on the same underlying social media activity data.

In this example embodiment, the map reduce functions are configured such as to produce a different set of tiles and manifests at different zoom levels, but with the maximum data point volume or density of tiles at different zoom levels falling within a common range. Worded differently, the map tiles and manifests may be generated such as to a have a substantially consistent maximum datapoint volume or density across different zoom levels, assuming sufficient underlying social media activity.

In the present example embodiment, each data point at the most zoomed in level represents a single snap. At high zoom levels, data points represent one or more snaps (aggregated to reduce the overall number of data points that need to be rendered). Data point aggregation is done server-side. Rendering of data points into a heatmap representative of geographical distribution of social media activity is in this example embodiment done client-side.

Server-side aggregation of underlying actual data points into more or less consistent data point volumes at different zoom levels serve to reduce and substantially regularize computational load on the client device 102 for rendering the map GUI 612. Thus, for example, a map viewport at a certain zoom level may encompass 10,000 underlying datapoints (e.g., snaps), represented by about 2400 data points in the map data tiles served to the client device 102 for any particular view (e.g., comprising about 150 data points for each of 16 map data tiles making up the geographical area represented in the map viewport), while the view for one or more levels zoomed out may encompass 100,000 underlying data points, but again represented by about 2400 data points in the served of map tiles.

For example, there may typically be 50 million data points globally for generation of the heatmap. In a particular zoom level, the map viewport may encompass, for example, 3000 underlying data points within the displayed geographical area. If the user, however, zooms out one or more zoom levels in the map viewport, the number of underlying data points can increase significantly. In this example embodiment, however, the number of data points upon which the social media activity information in the map viewport is displayed can remain substantially within the same range regardless of zoom level, owing to map-reduction to a substantially common maximum data point density range.

In the present example embodiment, the map reduce functions are configured to reduce each tile to a data density of about 150 data points per tile, regardless of zoom level. In some embodiments, different styles and manifests may be generated based not only for different zoom levels, but also for different device types. Thus, a particular example embodiment provides for generating tiles and manifests at about 150 data points each for one set of user device models, but generating tiles and manifests at a lower data density (e.g., 70 data points each) for user device models that are identified as having relatively worse performance capabilities. In this disclosure, defining heatmap data points per tile across different zoom levels as having a substantially similar upper limit means that the upper limit of the data point volume per tile varies by no more than 50% across all zoom levels.

The POIs in the map data tile each contain a preview_manifest, which consists of the first few snaps from the POI's manifest. This is done for reduced play-back latency. When a tile is minted, it is stored in a BigTable row as a serialized protobuf blob. Full manifests are stored in a separate BigTable row in the same fashion, under the POI identifier. Once the whole tile set is generated, the pipeline writes a generation ID to a special row in BigTable to signify that the new tile set exists and is serve-able.

Figure 16B:
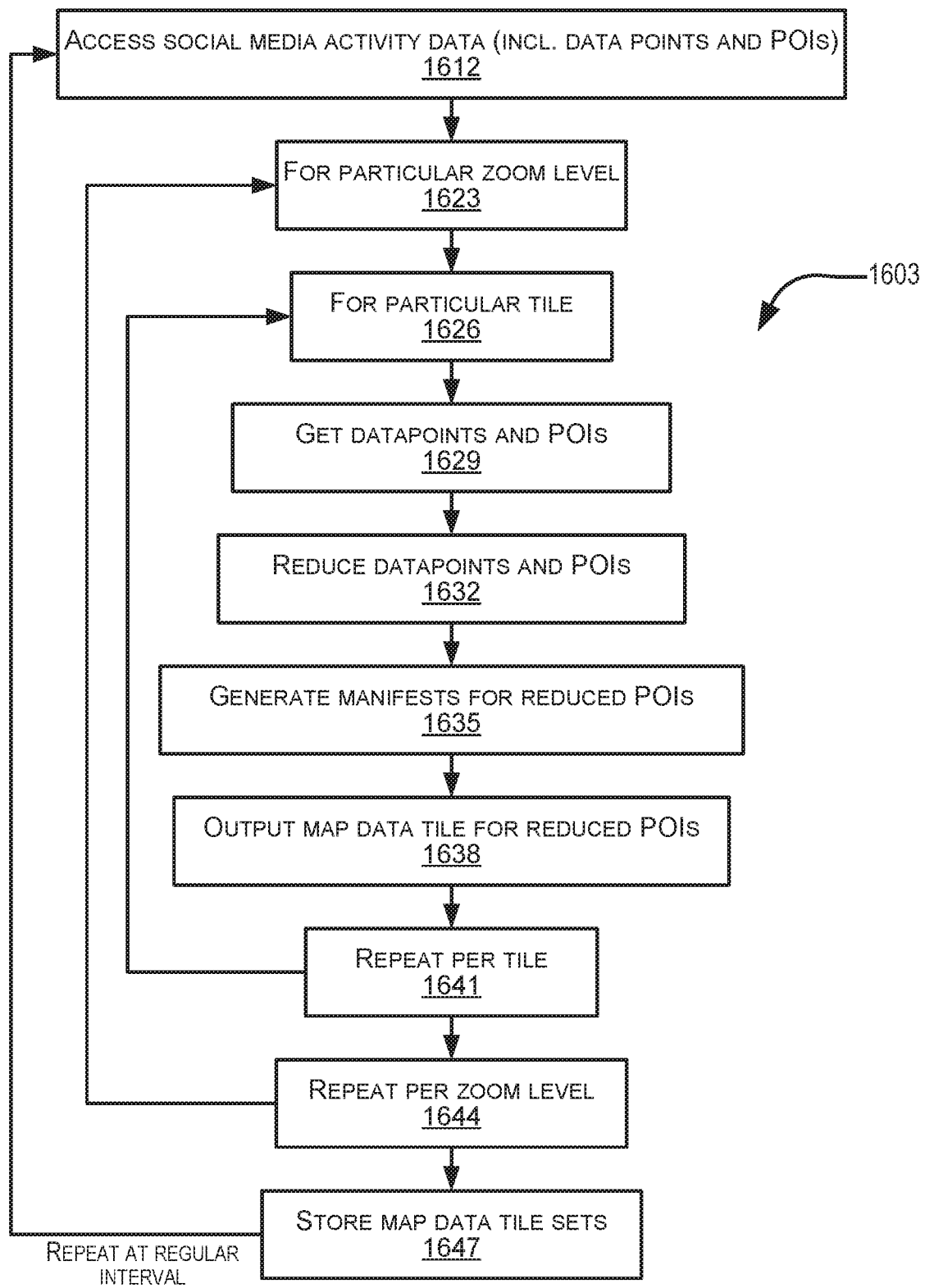

FIG. 16B provides an overview of the above-described example method for, at operation 1603 in the method of 1600 of FIG. 16A, compiling a plurality of sets of map data tiles for different zoom levels.

At operation 1612, recent social media activity data is received, in this example embodiment including information on snaps uploaded to Our Story, as well as the POI data discussed earlier. The map data tiles are then generated tile-wise.

This comprises, at operation 1629, isolating underlying activity data for a particular time (operation 1626), being those data points and POIs having respective coordinates falling within the area of the target tile.

The map reduce function is then performed, at operation 1632, with respect to activity data points and POIs for the particular tile (operation 1626) at the particular zoom level (operation 1623). It will be appreciated that, in some embodiments, some forms of underlying activity data can be exempted from reduction. Some embodiments may thus, for example, provide for production of only the heat map data points.

At operation 1635, a manifest is generated or retrieved for each of the remaining POIs after reduction. The manifests are thus incorporated in the map data tile. At operation 1638, the newly minted map data tile is outputted.

These operations are repeated with respect to a particular larger geographical area for each tile (at operation 6041) and for each zoom level (at operation 6044). At operation 1647, zoom-specific sets of data tiles are stored on the server system 108 for serving responsive to request. These operations are repeated at regular intervals, in this example embodiment, being repeated every 5 minutes.

The above-described aspect of the disclosure includes the various example embodiments listed below as examples 41-56, which are to be read in view, at least, of the foregoing part of the description.

Automated Friend Ranking Based on Location Slurring

A further aspect of the disclosure relates to automated determination of relative strengths of friendships between users of a social media platform, including ranking of a plurality of friends of a target user by level of friendship. This aspect of the disclosure provides for automated determination of an attribute of friendship (e.g., the strength or closeness of the friendship) between users based on physical proximity of users who are bi-directional friends in the social media platform.

In some embodiments, the friend or ranking is based on physical proximity of friends (as indicated by geographical location of their respective user devices) during predefined time intervals, also referred to herein as time windows. The predefined time intervals in some embodiments be non-working hours, so that the friendship ranking is based on time spent together outside of working hours. This is based on the insight that the greater the amount of nonworking time that are spent together by two users, the greater is the likelihood that they are good or best friends and that they should be ranked higher than other friends with whom they spend less nonworking time.

Thus, one aspect of the disclosure provides a method comprising: accessing location information for a plurality of users of a social media platform, the
  location information being indicative of respective geographical locations of the respective users over time;
for each of the plurality of users, calculating a respective proximity metric with respect to a target user, the proximity metric being indicative of geographical proximity of the respective users to a target user within a focus time: and
based at least in part on the respective proximity metrics, determining respective ranking values for the plurality of users, the ranking values indicating respective estimated levels of friendship between the plurality of users and the target user.

In some embodiments, the ranking values are the respective ordinal positions of different users in a sequence of friends ranked directly based on their respective quantified values for the proximity metric. In another embodiment, the ranking values can be stratified, sorting friends in different groups or cohorts based on their respective proximity metrics. In this example embodiment, the ranking values provide a stratified binary scheme, in which each user is classified based on their respective proximity metric as a "best friend" or simply as a "friend."

In some embodiments, the plurality of users is provided by a group of users of the social media platform who are formally indicated as friends of the target user in a social network managed by the social media platform, the group of friends of the target user being a subset of multiple users of the social media platform. Instead, or in addition, the plurality of users is in some embodiments limited to users who provided location viewing permission to the target user on the social media platform.

In some embodiments, the focus time is comprised of a plurality of nonworking-hour time windows collated across multiple days. The nonworking-hour time windows may include weekends and/or public holidays.

In another example embodiment, the proximity metric expresses an amount of time that the user and the target user was closer than a threshold distance to each other within the focus time. For example, the proximity metric may indicate the amount of time that the user and the target user were closer than 50 meters from each other during non-working time. Such a proximity metric may be normalized, for example expressing an average below-threshold proximity duration per day. In such cases, the ranking values of the plurality of users may be determined such that larger proximity metric values correspond to higher ranking values.

Figure 17:
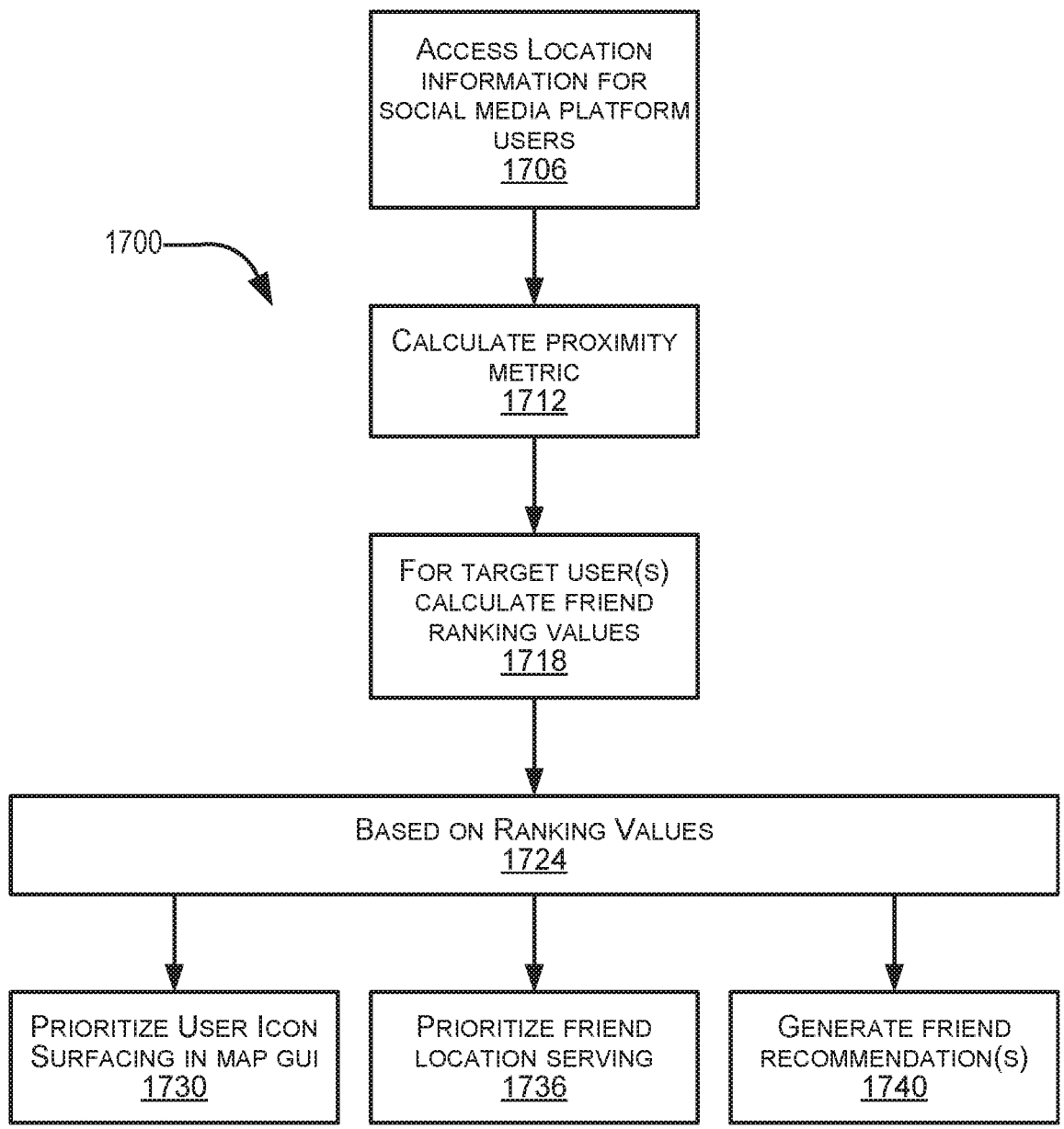
FIG. 17 is a flowchart illustrating a method for automated friend ranking based on a physical proximity metric, according to an example embodiment.

The server system 108 can use the calculated ranking values and/or proximity metric in a number of different ways during implementation of provision of a map-based graphical user interface such as the map GUI 612 described with reference to FIGS. 6A-11B. In this regard, FIG. 17 shows a schematic illustration of an example embodiment of a method 1700 according to this aspect of the disclosure.

At operation 1706, a friend ranking engine 1845 (see FIG. 18) forming part of the server system 108 accesses historical location information for multiple users of the social media platform. The historical location information indicates respective locations of the user device 102 associated with the users for a particular considered time period.

At operation 1712, the friend ranking engine 1845 calculates, for a target user or for a group of target users, respective proximity metric values for each friend user (or, in some embodiments, for each friend with viewing permission with respect to the target user).

At operation 1718, ranking values are determined for the respective friends or viewing users of each target user. In this example embodiment, this comprises identifying a subset of best friends based on the calculated nonworking hour proximity metric. This can comprise, for example, selecting a predefined number of users with the highest proximity metric values. In another embodiment, identification of best friends is by identifying as a best friend each user whose bidirectional proximity metric value exceeds a predefined threshold value.

At operation 1724, the determined ranking values (e.g., identification of the subset of best friends) are used by the server system 108 for one or more functions on the social media platform. In some embodiments, user icons of best friends can, at operation 1730, be prioritized for surfacing on the map GUI 612. Users with large numbers of friends and in areas of high density can sometimes call a map view in which display of all of their friends by respective bitmoji 640 reduces usability of the map GUI 612. In such cases, friends identified as best friends can be prioritized for display to the exclusion of at least some other friends.

Instead, or in addition, the location information of best friends can, at operation 1736, be prioritized during the serving of location information, as described with reference to FIGS. 12-13C. Thus, the respective coordinates for best friends is served to the client device 102 first, with location information for other friends being served later.

Instead, or in addition, server system 108 can, at operation 1740, generate in the map GUI 612 a best friend recommendation, displaying a user interface element that is selectable by the user to confirm or tag the relevant friends as best friends. In some embodiments, in which proximity ranking is done on only for friends but for all users, friend suggestions may be generated in similar manner to facilitate growth of the user's social network on the social media platform.

The above-described aspect of the disclosure includes the various example embodiments listed below as examples 57-82, which are to be read in view, at least, of the foregoing part of the description.

Example System

Figure 18:
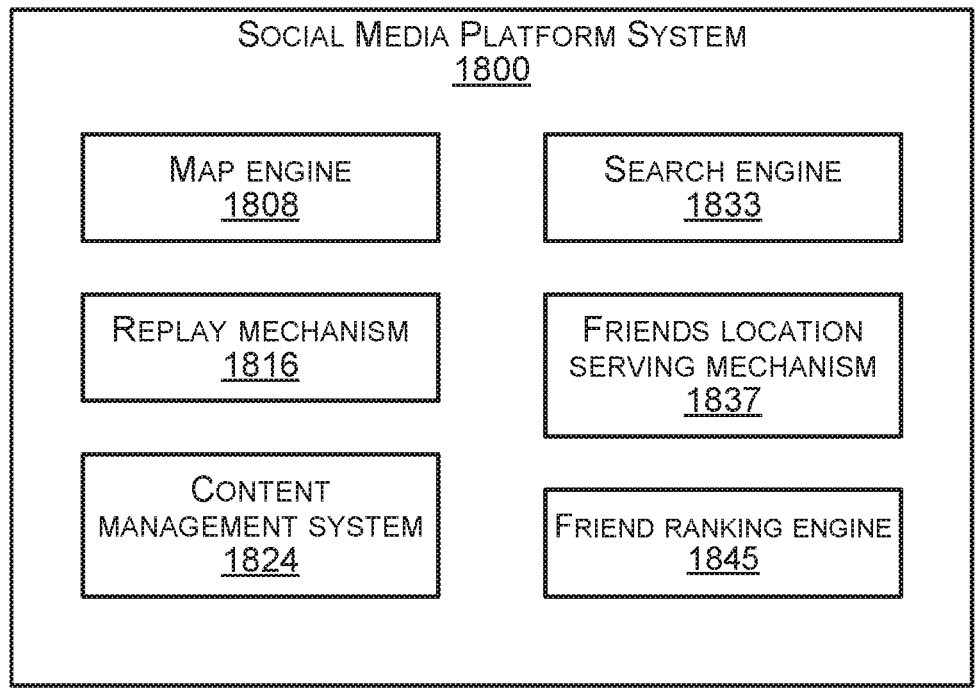
FIG. 18 is a schematic view of a social media platform system for providing a map-based graphical user interface for a social media application, according to one example embodiment.

FIG. 18 shows an example embodiment of a social media platform system 1800 configured to provide a map-based graphical user interface for a social media application, such as the map GUI 612 described with reference to FIGS. 6A-11B. The system 1800 and its associated components can in some embodiments be provided server-side, for example by the social media application server system 108 (FIG. 1). In such instances, the respective components of the system 1800 can be provided by execution of the social media server application 114 on the application server 112. In other embodiments, one or more components of the system 1800 are provided client-side, for example by execution of the social media client application 104 on a respective client device 102 (FIG. 1). In yet further embodiments, the system 1800 is provided collaboratively server-side and client-side, the application server 112 and a client device 102 in communication therewith being configured to provide the respective system components by execution of the social media client application 104 on the client device 102 and by execution of the social media server application 114 on the application server 112.

The system 1800 includes a map engine 1808 to generate the map GUI 612, including the location-based social media information displayed in the map GUI 612. Thus, the map engine 1808 is configured to generate or to facilitate generation of the map 618 (FIG. 6A) in the map viewport 621 of the client device 102. To this end, the map engine 1808 can be configured to surface and cause display of particular story icons 631, 633, to identify and cause display of respective friend bitmojis 640, to generate heatmap information and display or cause display of a heatmap 625 overlaid on the map 618, and to perform operations that provide other related functionalities of the map GUI 612 described with reference to FIGS. 6A-11B.

The system 1800 further includes a replay mechanism 1816 configured to cause automated sequential replay of the content of a set of social media items or snaps on the client device 102. The replay mechanism 1816 can thus cause sequential display of all of the snaps in a selected place story or spike story, as described previously herein. In some embodiments, the replay mechanism 1816 may provide for transmission of the set of snaps to the client device 102 in response to selection of a corresponding story icon 631/633. In some such embodiments, information automatically transmitted by the application server 112 to the client device 102 upon initial rendering of a map view in the map GUI 612 can include a first few (e.g., 2 or 3) snaps for each of the story icons 631, 633 surfaced in the map viewport 621. Upon selection of a particular story icon 631/633, the first few snaps in the story are immediately available for replay, with the subsequent snaps in the story being pulled from the application server 112 during presentation of the first few snaps.

The system 1800 also includes a content management system (CMS) 1824, as mentioned earlier. In this example embodiment, the CMS 1824 provides an administration interface enabling operators to manage content, for example by defining various attributes of different place and/or event stories. The CMS 1824 in this example embodiment also includes the collection management system 204 (FIG. 2) as previously described. The CMS 1824 is configured for the automated or semiautomated compilation of the respective social media galleries or stories as previously described. This may include curation or moderation of respective stories by use of a server-side curation interface 208 provided by the CMS 1824.

The system 1800 further includes a search engine 1833 configured to provide search functionalities with respect to social media content via the map GUI 612. In particular, the search engine 1833 in this example embodiment provides for user-directed searching both via the search interface 1010 (FIGS. 10A-10D) and via location-based searching by direct selection of a target location on the map 618 (FIGS. 11A-11B).

The system 1800 further includes a user location serving mechanism 1837 configured to determine respective user locations, in this example embodiment indicated by the respective device locations, to determine for each user the particular friend users who are viewable via the map GUI 612, and to provide the respective user location information for display of associated user icons at corresponding display locations. The user location serving mechanism 1837 in some embodiments comprise, as part of the server system 108, a user location datastore and an per-user access control list (ACL) that lists the particular friend users viewable by each user. In some embodiments, the per-user ACL specifies respective viewing level granularity for each viewable user. The user location serving mechanism 1837 in such example embodiments is additionally configured to determine and manage respective user display granularity. This includes calculating non-precise display locations for some users, and causing display of a corresponding user icons at the non-precise display locations. The system 1800 also in some embodiments include a friend ranking engine 1845 configured to perform friend ranking based on a proximity metric indicating physical proximity of users during nonworking hours.

Recapitulation of Selected Example Embodiments

From the preceding description it will be seen that a number of example embodiments and combinations of example embodiments are disclosed. The disclosed embodiments include, but are not limited to, the enumerated list of example embodiments that follow.

Example 1

A system comprising:
one or more computer processors; and
one or more memories communicatively coupled to the one or more computer processors and having stored thereon instructions that, when executed by the one or more computer processors, configure the one or more computer processors to perform operations comprising:
maintaining. for each of multiple users of a social media platform, a respective per-user access control list (ACL) that lists a set of viewable users for the associated user, the set of viewable users being a plurality of other users of the social media platform for whom the associated user has permission to view their respective geographic locations;
receiving, from a user device associated with a requesting user, a request for location-based social media activity information to cause display of a map-based graphical user interface (GUI) for the social media platform on the user device; and in response to the request, performing an automated friends location serving procedure using one or more computer processor devices configured therefor, the friends location serving procedure comprising:

accessing the per-user ACL of the requesting user;

based on the per-user ACL of the requesting user, determining the set of viewable users for the requesting user; and transmitting to the user device respective location information for at least a subset of the set of viewable users, thereby to enable display of friend icons for the subset of viewable users at respective display locations on a map forming part of the map-based GUI.

Example 2

The system of example 1, wherein each per-user ACL indicates for the associated set of viewable users respective location display granularity levels, indicating each of the set of viewable users as being viewable by the requesting user at a respectively corresponding one of two or more distinct levels of display granularity.

Example 3

The system of example 2, wherein the two or more distinct levels of display granularity comprise:

a precise viewing level at which the display location of the respective user corresponds substantially to an actual location of a user device associated with the respective user; and a regional viewing level at which the display location of the respective user differs from the actual location, while being located within a defined geographical region within which the actual location is situated.

Example 4

The system of any one of examples 1-3, wherein each per-user ACL includes respective location information for at least the subset of viewable users.

Example 5

The system of example 1-3, wherein the instructions further configure the computer processors to, responsive to determining the set of viewable users for the requesting user from the per-user ACL, retrieve respective location information for at least the subset of viewable users from a location datastore distinct from the per-user ACL.

Example 6

The system of example 5, further comprising, in response to a particular user switching to an invisible mode in which the location of the particular user is to be invisible to any other user, deleting from the location datastore the location indicator associated with the particular user.

Example 7

The system of example 6, wherein the one or more computer processors are further configured by the instructions to, subsequent to deletion of the location indicator of the particular user from the location datastore, update respective per-user ACLs of the set of viewable users indicated by the per-user ACL of the particular user, the updating of the respective per-user ACLs being to reflect operation of the particular user in the invisible mode.

Example 8

The system of any one of examples 1-7, wherein the instructions further configure one or more computer processors to perform operations comprising:

receiving a change indication that indicates one or more changes to location sharing options by a particular one of the multiple users; and responsive to the change indication, updating the respective per-user ACLs of each one of a plurality of friend users of the particular user.

Example 9

The system of any one of examples 1-8, wherein the one or more computer processors are configured to access the per-user ACL of the requesting user in a procedure comprising:

determining if the per-user ACL of the requesting user is up-to-date:

in response to determining that the per user ACL is not up-to-date, triggering an update of the per-user ACL of the requesting user; and determining the set of viewable users for the requesting user based on the updated per-user ACL of the requesting user.

Example 10

A method comprising:

at a server system, maintaining, for each of multiple users of a social media platform, a respective per-user access control list (ACL) that lists a set of viewable users for the associated user, the set of viewable users being a plurality of other users of the social media platform for whom the associated user has permission to view their respective geographic locations;

receiving, from a user device associated with a requesting user, a request for location-based social media activity information to cause display of a map-based graphical user interface (GUI) for the social media platform on the user device; and in response to the request, performing an automated friends location serving procedure using one or more computer processor devices configured therefor, the friends location serving procedure comprising:

accessing the per-user ACL of the requesting user;

based on the per-user ACL of the requesting user, determining the set of viewable users for the requesting user; and transmitting to the user device respective location information for at least a subset of the set of viewable users, thereby to enable display of friend icons for the subset of viewable users at respective display locations on a map forming part of the map-based GUI.

Example 11

The method of example 10, wherein each per-user ACL indicates for the associated set of viewable users respective location display granularity levels, indicating each of the set of viewable users as being viewable by the requesting user at a respectively corresponding one of two or more distinct levels of display granularity.

Example 12

The method of example 11, wherein the two or more distinct levels of display granularity comprise:
a precise viewing level at which the display location of the respective user corresponds substantially to an actual location of a user device associated with the respective user; and
a regional viewing level, at which the display location of the respective user differs from the actual location, while being located within a defined geographical region within which the actual location is situated.

Example 13

The method of any one of examples 10-12, wherein each per-user ACL includes respective location information for at least the subset of viewable users.

Example 14

The method of any one of examples 10-12, further comprising, responsive to determining the set of viewable users for the requesting user from the per-user ACL, retrieving respective location information for at least the subset of viewable users from a location datastore distinct from the per-user ACL.

Example 15

The method of example 14, wherein the location datastore stores, for each of the multiple users, a respective location indicator and an associated timestamp, the method further comprising:
on an ongoing basis, deleting from the location datastore each location indicator whose associated timestamp indicates an age greater than a predefined expiry age.

Example 16

The method of example 14 or example 15, further comprising, in response to a particular user switching to an invisible mode in which the location of the particular user is to be invisible to by any other user, deleting from the location datastore the location indicator associated with the particular user.

Example 17

The method of example 16, further comprising, subsequent to deletion of the location indicator of the particular user from the location datastore, updating respective per-user ACLs of the set of viewable users indicated by the per-user ACL of the particular user, the updating of the respective per-user ACLs being to reflect operation of the particular user in the invisible mode.

Example 18

The method of any one of examples 10-17, further comprising:
receiving a change indication that indicates one or more changes to location sharing options by a particular one of the multiple users; and
responsive to the change indication, updating the respective per-user ACLs of each one of a plurality of friend users of the particular user.

Example 19

The method of any one of examples 10-18, wherein accessing the per-user ACL of the requesting user comprises: determining if the per-user ACL of the requesting user is up-to-date;
in response to determining that the per user ACL is not up-to-date, triggering an update of the per-user ACL of the requesting user; and
determining the set of viewable users for the requesting user based on the updated per-user ACL of the requesting user.

Example 20

A computer-readable storage medium having stored thereon instructions for causing a machine, when executing the instructions, to perform operations comprising the method of any one of examples 10-19.

Example 21

A system comprising:
a map engine comprising one or more computer processor devices configured to perform automated operations comprising:
retrieving multiple earth imagery tiles corresponding to a geographical area to be viewable via a map-based graphical user interface (GUI) for a social media platform, each earth imagery tile comprising a photographic image of a corresponding portion of the Earth's surface;
based on the multiple earth imagery tiles, generating multiple stylized map tiles; and
at a server system, in response to receiving from a user device a request for display of a target area in an instance of the map-based GUI on the user device, retrieving a set of stylized map tiles corresponding to the target area, and transmitting the set of stylized map tiles to the user device for display in the map-based GUI.

Example 22

The system of example 21, wherein the map engine is further configured to perform operations comprising:
maintaining at the server system a cache of stylized map tiles;
in response to receiving the request for display of the target area, identifying within the set of stylized map tiles corresponding to the target area one or more cached stylized map tiles, being stylized map tiles that are available in the cache; and
retrieving the one or more cached stylized map tiles from the cache for transmission to the user device.

Example 23

The system of example 21, wherein the map engine is further configured to perform operations comprising:
maintaining at the server system a cache of stylized map tiles;
in response to receiving the request for display of the target area, identifying within the set of stylized map tiles corresponding to the target area one or more uncached stylized map tiles, being stylized map tiles that are not available in the cache;
newly generating respective stylized map tiles for the one or more identified uncached stylized map tiles; and
serving the one or more newly generated stylized map tiles to the user device in response to the request.

Example 24

The system of any one of examples 21-23, wherein the map engine is configure to generate each stylized map tile by:
retrieving a target earth imagery tile together with a set of neighbor earth imagery tiles immediately bordering the target earth imagery tile;
generating an expanded earth imagery tile based on the target earth imagery tile and its set of neighbor tiles, the expanded earth imagery tile having an expanded area relative to that of the target earth imagery tile;
stylizing the expanded earth imagery tile, thereby generating an expanded stylized tile: and
cropping the expanded stylized tile to produce the respective stylized map tile.

Example 25

The system of example 24, wherein the map engine is configured to generate the expanded earth imagery tile in a procedure comprising:
stitching together the target earth imagery tile and its set of neighbor tiles to compose a macro tile; and
cropping the expanded earth imagery tile from the macro tile.

Example 26

The system of example 25, wherein the map engine is configured to crop the expanded earth imagery tile from the macro tile such that the target earth imagery tile is centered in the expanded earth imagery tile, and such that a buffer zone extends continuously around a periphery of the target earth imagery tile.

Example 27

The system of any one of examples 21-26, further comprising generating a respective set of stylized map tiles for each of a plurality of zoom levels.

Example 28

The system of example 27, wherein the map generation engine is configured to cause generation of the respective sets of stylized map tiles using different neural networks for stylization of map tiles at the different respective zoom levels, so that the different zoom levels are stylized differently.

Example 29

A method comprising:
retrieving multiple earth imagery tiles corresponding to a geographical area to be viewable via a map-based graphical user interface (GUI) for a social media platform, each earth imagery tile comprising a photographic image of a corresponding portion of the Earth's surface;
based on the multiple earth imagery tiles, generating multiple stylized map tiles; and
at a server system, in response to receiving from a user device a request for display of a target area in an instance of the map-based GUI on the user device, retrieving a set of stylized map tiles corresponding to the target area, and transmitting the set of stylized map tiles to the user device for display in the map-based GUI.

Example 30

The method of example 29, further comprising: maintaining at the server system a cache of stylized map tiles;
in response to receiving the request for display of the target area, identifying within the set of stylized map tiles corresponding to the target area one or more cached stylized map tiles, being stylized map tiles that are available in the cache; and
retrieving the one or more cached stylized map tiles from the cache for transmission to the user device.

Example 31

The method of example 29, further comprising: maintaining at the server system a cache of stylized map tiles;
in response to receiving the request for display of the target area, identifying within the set of stylized map tiles corresponding to the target area one or more uncached stylized map tiles, being stylized map tiles that are not available in the cache;
newly generating respective stylized map tiles for the one or more identified uncached stylized map tiles; and
serving the one or more newly generated stylized map tiles to the user device in response to the request.

Example 32

The method of any one of examples 29-31, wherein the generating of the stylized map tiles comprises using a trained neural network to stylize respective earth imagery tiles.

Example 33

The method of any one of examples 29-32, wherein the generating of each stylized map tile comprises:
retrieving a target earth imagery tile together with a set of neighbor earth imagery tiles immediately bordering the target earth imagery tile;
generating an expanded earth imagery tile based on the target earth imagery tile and its set of neighbor tiles, the expanded earth imagery tile having an expanded area relative to that of the target earth imagery tile;
stylizing the expanded earth imagery tile, thereby generating an expanded stylized tile; and
cropping the expanded stylized tile to produce the respective stylized map tile.

Example 34

The method of example 33, wherein the target earth imagery tile is square, the set of neighbor tiles consisting of eight tiles touching respective sides and vertices of the target earth imagery tile.

Example 35

The method of example 33 or example 34, wherein the generating of the expanded earth imagery tile comprises:
stitching together the target earth imagery tile and its set of neighbor tiles to compose a macro tile; and
cropping the expanded earth imagery tile from the macro tile.

Example 36

The method of example 35, wherein the cropping of the expanded earth imagery tile from the macro tile is such that the target earth imagery tile is centered in the expanded earth imagery tile, and such that a buffer zone extends continuously around a periphery of the target earth imagery tile.

Example 37

The method of example 36, wherein the buffer zone has a width of between 50 and 150 pixels.

Example 38

The method of any one of examples 29-37, further comprising generating a respective set of stylized map tiles for each of a plurality of zoom levels.

Example 39

The method of example 38, wherein the generating of the respective sets of stylized map tiles comprises using different neural networks for stylization of map tiles at the different respective zoom levels, so that the different zoom levels are stylized differently.

Example 40

A non-transitory computer-readable storage medium having stored thereon instructions for causing a machine, when executing the instructions, to perform operations comprising the method of any one of examples 31-39.

Example 41

A method comprising:
accessing activity data for a social media platform, the activity data comprising geo-tagged social media items uploaded by users for display via a map-based graphical user interface (GUI) for the social media platform;
in an automated operation performed by a map engine comprising one or more computer processor devices configured to perform the automated operation, compiling a plurality of sets of map data tiles, each set of map data tiles being for a respective one of a plurality of different zoom levels, each map data tile being for a corresponding geographical area and comprising geo-anchored data points having respective locations falling within the corresponding geographical area;
receiving from a user device a request for display, via an instance of the map-based GUI on the user device, of a requested geographical area at a requested zoom level;
responsive to the request, retrieving a precompiled plurality of map data tiles corresponding to the requested geographical area and the requested zoom level; and
transmitting the precompiled plurality of map data tiles to the user device to enable display, as part of the map-based GUI, of social media activity information for the requested geographical area based on the corresponding geo-anchored data points.

Example 42

The method of example 41, wherein the compiling of the map data tiles comprises performing a map reduce function with respect to the underlying activity data, such that a respective map data tile comprises fewer data points than that indicated in the underlying activity data for the corresponding geographical area.

Example 43

The method of example 42, further comprising performing the map reduce function differently at different zoom levels.

Example 44

The method of example 43, wherein the geo-anchored data points comprises heatmap data enabling the generation in the map-based GUI of a heatmap illustrating geographic distribution of a social media activity metric.

Example 45

The method of example 44, wherein the heatmap data comprises a set of heatmap data points, the heatmap in the map-based GUI to be generated by the user device based on the set of heatmap data points.

Example 46

The method of example 45, wherein the compiling of each map data tile comprises a data point aggregation procedure in which the respective set of heatmap data points is generated to be representative of a set of underlying social media activity data points for the corresponding geographical area, the set of heatmap data points being smaller in number than the set of underlying social media activity data points.

Example 47

The method of example 45 or example 46, wherein the compiling of the plurality of sets of map data tiles is performed such that the number of heatmap data points per tile falls within a range having a substantially similar upper limit across the plurality of different zoom levels.

Example 48

The method of any one of examples 43-47, wherein the geo-anchored data points for at least some of the map data tiles includes a plurality of points of interest (POIs), wherein:
each POI is to be represented in the map-based GUI by a respective icon; and
each POI has an associated set of social media items that are accessible via the map-based GUI responsive to user interaction with the corresponding icon.

Example 49

The method of example 48, wherein each map data tile includes, for each POI, thumbnail information to enable display of a corresponding thumbnail image as part of the respective icon.

Example 50

The method of example 48 or example 49, wherein the map reduce function operates on the POIs, such that a different number of POIs are represented at different zoom levels for a given geographical area.

Example 51

The method of any one of examples 48-50, wherein each map data tile includes, for each of the included POIs, a respective manifest indicating a plurality of social media items that are replayable responsive to selection of the corresponding icon.

Example 52

The method of example 51, wherein each manifest is a preview manifest indicating a subset of the set of social media items associated with the corresponding POI.

Example 53

The method of any one of examples 48-52, wherein one or more of the map data tiles include two or more different types of POI.

Example 54

The method of any one of examples 41-53, wherein the compiling of the map data tiles comprises compiling a plurality of alternative sets of map data tiles for a plurality of different types of user device.

Example 55

A system comprising:
one or more computer processor devices; and
one or more memories having stored thereon instructions that configure the one or more computer processor devices, when the instructions are executed, to perform operations comprising the method of any one of examples 41-54.

Example 56

A computer readable storage medium having stored thereon instructions for causing a machine, when executing the instructions, to perform operations comprising the method of any one of examples 41-54.

Example 57

A system comprising:
one or more computer processor devices; and
one or more memory devices storing instructions that configure the one or more computer processor devices, when executing the instructions, to perform operations comprising:
accessing location information for a plurality of users of a social media platform, the location information being indicative of respective geographical locations of the respective users over a period of time;
for each of the plurality of users, calculating a respective proximity metric with respect to a target user, the proximity metric being indicative of geographical proximity of the respective users to the target user within a focus time; and
based at least in part on the respective proximity metrics, determining respective ranking values for the plurality of users, the ranking values indicating respective estimated levels of friendship between the plurality of users and the target user.

Example 58

The system of example 57, wherein the ranking values comprise stratified ranking levels selected from a plurality of predefined friendship levels.

Example 59

The system of example 58, wherein the plurality of predefined friendship levels comprise friends and best friends.

Example 60

The system of any one of examples 57-59, wherein the plurality of users is limited to a group of users of the social media platform who are formally indicated as friends of the target user in a social network managed by the social media platform, the group of friends of the target user being a subset of multiple users of the social media platform.

Example 61

The system of example 60, wherein the plurality of users is limited to friends who provide location viewing permission to the target user on the social media platform, the location viewing permission enabling the target user to view the geographical location of the respective friend via a map-based graphical user interface (GUI) for the social media platform.

Example 62

The system of example 61, wherein the focus time is predominantly limited to non-working hours.

Example 63

The system of example 61, wherein the focus time is exclusively limited to non-working hours.

Example 64

The system of example 62 or example 63, wherein the focus time is comprised of a plurality of time windows collated across multiple days.

Example 65

The system of any one of examples 57-64, wherein the proximity metric is based at least in part on an average distance between the respective user and the target user within the focus time.

Example 66

The system of any one of examples 57-64, wherein the proximity metric for each user is based at least in part on an amount of time within the focus time that a distance between the respective user and the target user is smaller than a predefined threshold distance.

Example 67

The system of any one of examples 57-66, wherein the location information of the plurality of users is based on geographical locations of respective user devices associated with the plurality of users.

Example 68

The system of any one of examples 57-67, wherein the instructions further configure the one or more computer processor device to perform operations comprising:
receiving from a user device associated with the target user a request for display of location-based social media activity information via a map-based GUI for the social media platform, the map-based GUI including an interactive map to display a geographical area; and
responsive to the request, causing display at respective display locations on the map of respective friend icons for a subset of the plurality of users, wherein the display of the friend icons is based at least in part on the corresponding ranking values for the plurality of users.

Example 69

The system of example 68, wherein the system is configured to, in causing display of the friend icons, prioritize display of friend icons for a group of users identified by respective ranking values as best friends of the target user.

Example 70

A method comprising:
accessing location information for a plurality of users of a social media platform, the location information being indicative of respective geographical locations of the respective users over a period of time;
for each of the plurality of users, calculating a respective proximity metric with respect to a target user, the proximity metric being indicative of geographical proximity of the respective users to the target user within a focus time; and
based at least in part on the respective proximity metrics, determining respective ranking values for the plurality of users, the ranking values indicating respective estimated levels of friendship between the plurality of users and the target user.

Example 71

The method of example 70, wherein the ranking values comprise stratified ranking levels selected from a plurality of predefined friendship levels.

Example 72

The method of example 71, wherein the plurality of predefined friendship levels comprises friends and best friends.

Example 73

The method of any one of examples 70-72, wherein the plurality of users is provided by a group of users of the social media platform who are formally indicated as friends of the target user in a social network managed by the social media platform, the group of friends of the target user being a subset of multiple users of the social media platform.

Example 74

The method of example 73, wherein the plurality of users is limited to friends who provide location viewing permission to the target user on the social media platform, the location viewing permission enabling the target user to view the geographical location of the respective friend via a map-based graphical user interface (GUI) for the social media platform.

Example 75

The method of example 74, wherein the focus time is predominantly limited to non-working hours.

Example 76

The method of example 74, wherein the focus time is exclusively limited to non-working hours.

Example 77

The method of example 75 or example 76, wherein the focus time is comprised of a plurality of time windows collated across multiple days.

Example 78

The method of any one of examples 70-77, wherein the proximity metric is based at least in part on an average physical distance between the respective user and the target user within the focus time.

Example 79

The method of any one of examples 70-77, where in the proximity metric for each user is based at least in part on an amount of time within the focus time that a physical distance between the respective user and the target user is smaller than a predefined threshold distance.

Example 80

The method of any one of examples 70-79, wherein the location information of the plurality of users is based on geographical locations of respective user devices associated with the plurality of users.

Example 81

The method of any one of examples 70-80, further comprising:
receiving from a user device associated with the target user a request for display of location-based social media activity information via a map-based GUI for the social media platform, the map-based GUI including an interactive map to display a geographical area; and
responsive to the request, causing display at respective display locations on the map of respective friend icons for a subset of the plurality of users, wherein the display of the friend icons is based at least in part on the corresponding ranking values for the plurality of users.

Example 82

The method of example 81, wherein the displaying of the respective friend icons comprises prioritizing display of friend icons for a group of users identified by respective ranking values as best friends of the target user.

Machine and Software Architecture

These systems, system components, methods, applications, and so forth described in conjunction with FIGS. 1-18 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. The software and hardware architectures presented here are example architectures for implementing the disclosure, and are not exhaustive as to possible architectures that can be employed for implementing the disclosure.

Software Architecture

FIG. 19 is a block diagram illustrating an example software architecture 1906, which may be used in conjunction with various hardware architectures herein described. FIG. 19 is a non-limiting example of a software architecture, and it will be appreciated that many other architectures may be implemented to facilitate the functionality described herein. The software architecture 1906 may execute on hardware such as a machine 2000 of FIG. 20 that includes, among other things, processors 2004, memory 2014, and I/O components 2018. A representative hardware layer 1952 is illustrated and can represent, for example, the machine 2000 of FIG. 20. The representative hardware layer 1952 includes a processing unit 1954 having associated executable instructions 1904. The executable instructions 1904 represent the executable instructions of the software architecture 1906, including implementation of the methods, components, and so forth described herein. The hardware layer 1952 also includes memory and/or storage modules memory/storage 1956, which also have the executable instructions 1904. The hardware layer 1952 may also comprise other hardware 1958.

In the example architecture of FIG. 19, the software architecture 1906 may be conceptualized as a stack of layers where each layer provides particular functionality. For example, the software architecture 1906 may include layers such as an operating system 1902, libraries 1920, frameworks/middleware 1918, applications 1916, and a presentation layer 1914. Operationally, the applications 1916 and/or other components within the layers may invoke application programming interface (API) calls 1908 through the software stack and receive a response in the form of messages 1908. The layers illustrated are representative in nature, and not all software architectures have all layers. For example, some mobile or special-purpose operating systems may not provide a frameworks/middleware 1918, while others may provide such a layer. Other software architectures may include additional or different layers.

The operating system 1902 may manage hardware resources and provide common services. The operating system 1902 may include, for example, a kernel 1922, services 1924, and drivers 1926. The kernel 1922 may act as an abstraction layer between the hardware and the other software layers. For example, the kernel 1922 may be responsible for memory management, processor management (e.g., scheduling), component management, networking, security settings, and so on. The services 1924 may provide other common services for the other software layers. The drivers 1926 are responsible for controlling or interfacing with the underlying hardware. For instance, the drivers 1926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1920 provide a common infrastructure that is used by the applications 1916 and/or other components and/or layers. The libraries 1920 provide functionality that allows other software components to perform tasks in an easier fashion than by interfacing directly with the underlying operating system 1902 functionality (e.g., kernel 1922, services 1924, and/or drivers 1926). The libraries 1920 may include system libraries 1944 (e.g., C standard library) that may provide functions such as memory allocation functions, string manipulation functions, mathematical functions, and the like. In addition, the libraries 1920 may include API libraries 1946 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1920 may also include a wide variety of other libraries 1948 to provide many other APIs to the applications 1916 and other software components/modules.

The frameworks/middleware 1918 provides a higher-level common infrastructure that may be used by the applications 1916 and/or other software components/modules. For example, the frameworks/middleware 1918 may provide various graphic user interface (GUI) functions, high-level resource management, high-level location services, and so forth. The frameworks/middleware 1918 may provide a broad spectrum of other APIs that may be utilized by the applications 1916 and/or other software components/modules, some of which may be specific to a particular operating system 1902 or platform.

The applications 1916 include built-in applications 1938 and/or third-party applications 1940. Examples of representative built-in applications 1938 may include, but are not limited to, a contacts application, a browser application, a book reader application, a location application, a media application, a messaging application, and/or a game application. The third-party applications 1940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1940 may invoke the API calls 1908 provided by the mobile operating system (such as the operating system 1902) to facilitate functionality described herein.

The applications 1916 may use built-in operating system 1902 functions (e.g., kernel 1922, services 1924, and/or drivers 1926), libraries 1920, and frameworks/middleware 1918 to create user interfaces to interact with users of the system. Alternatively, or additionally, in some systems interactions with a user may occur through a presentation layer, such as the presentation layer 1914. In these systems, the application/component "logic" can be separated from the aspects of the application/component that interact with a user.

Hardware Architecture

FIG. 20 is a block diagram illustrating components of a machine 2000, according to some example embodiments, able to read instructions from a machine-readable medium (e.g., a machine-readable storage medium) and perform any one or more of the methodologies discussed herein. Specifically, FIG. 20 shows a diagrammatic representation of the machine 2000 in the example form of a computer system, within which instructions 2010 (e.g., software, a program, an application, an applet, an app, or other executable code) for causing the machine 2000 to perform any one or more of the methodologies discussed herein may be executed. As such, the instructions 2010 may be used to implement modules or components described herein. The instructions 2010 transform the general, non-programmed machine 2000 into a particular machine 2000 programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2010, sequentially or otherwise, that specify actions to be taken by the machine 2000. Further, while only a single machine 2000 is illustrated, the term "machine" shall also be taken to include a collection of machines that individually or jointly execute the instructions 2010 to perform any one or more of the methodologies discussed herein.

The machine 2000 may include processors 2004, memory/storage 2006, and I/O components 2018, which may be configured to communicate with each other such as via a bus 2002. The memory/storage 2006 may include a memory 2014, such as a main memory, or other memory storage, and a storage unit 2016, both accessible to the processors 2004 such as via the bus 2002. The storage unit 2016 and memory 2014 store the instructions 2010 embodying any one or more of the methodologies or functions described herein. The instructions 2010 may also reside, completely or partially, within the memory 2014, within the storage unit 2016, within at least one of the processors 2004 (e.g., within the processor's cache memory), or any suitable combination thereof, during execution thereof by the machine 2000. Accordingly, the memory 2014, the storage unit 2016, and the memory of the processors 2004 are examples of machine-readable media. In some embodiments, the processors 2004 comprise a number of distributed processors 2008-2012, each of which have access to associated memories storing instructions 2010.

The I/O components 2018 may include a wide variety of components to receive input, provide output, produce output, transmit information, exchange information, capture measurements, and so on. The specific I/O components 2018 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2018 may include many other components that are not shown in FIG. 20. The I/O components 2018 are grouped according to functionality merely for simplifying the following discussion, and the grouping is in no way limiting. In various example embodiments, the I/O components 2018 may include output components 2026 and input components 2028. The output components 2026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2028 may include alphanumeric input components (e.g., a keyboard, a touchscreen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and/or force of touches or touch gestures, or other tactile input components), audio input components (e.g., a microphone), and the like.

In further example embodiments, the I/O components 2018 may include biometric components 2030, motion components 2034, environment components 2036, or position components 2038 among a wide array of other components. For example, the biometric components 2030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2034 may include acceleration sensor components (e.g., accelerometer), gravitation sensor components, rotation sensor components (e.g., gyroscope), and so forth. The environment components 2036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2018 may include communication components 2040 operable to couple the machine 2000 to a network 2032 or devices 2020 via a coupling 2024 and a coupling 2022 respectively. For example, the communication components 2040 may include a network interface component or other suitable device to interface with the network 2032. In further examples, the communication components 2040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2020 may be another machine or any of a wide variety of peripheral devices (e.g., a peripheral device coupled via a Universal Serial Bus (USB)).

Moreover, the communication components 2040 may detect identifiers or include components operable to detect identifiers. For example, the communication components 2040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronic system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX). Long-Term Evolution (LTE) standard, others defined by various standard-setting organizations, other long-range protocols, or other data-transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory. "Snaps" as referenced in the description are ephemeral messages. Ephemeral messages are not limited to communications having specified individual recipients, but include social media items uploaded to a gallery or a collection for viewing by multiple users. Thus, the term ephemeral message includes a photo or video clip (which may be augmented or unaugmented) made available for a time-limited duration for viewing public or by a "MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless that the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed is:

1. A system comprising:
   one or more computer processors; and
   one or more memories communicatively coupled to the one or more computer processors and having stored thereon instructions that, when executed by the one or more computer processors, configure the one or more computer processors to perform operations comprising:
   maintaining multiple access control lists (ACLs) for a social media platform such that a separate respective per-user ACL is maintained for each one of multiple users of the social media platform, each per-user ACL listing a set of viewable users for the associated user, the set of viewable users being a plurality of other users of the social media platform for whom the associated user has permission to view their respective geographic locations, the multiple per-user ACLs being maintained as distinct database-entities that are configured to be separately accessible for reading and updating, independently from one another;
   in response to changing of location sharing preferences for a particular user, triggering an asynchronous update task configured to update respective per-user ACLs of a plurality of respective friend users by whom the particular user is viewable prior to update, the asynchronous update task comprising firing, for each of the plurality of friend users, a separate transaction to calculate and update the per-user ACL of the respective friend user;
   receiving, from a user device associated with a requesting user, a request for location-based social media activity information to cause display of a map-based graphical user interface (GUI) for the social media platform on the user device; and
   in response to the request, performing an automated friends location serving procedure using one or more computer processor devices configured therefor, the friends location serving procedure comprising:
   accessing the per-user ACL of the requesting user;
   based on the per-user ACL of the requesting user, determining the set of viewable users for the requesting user; and
   transmitting to the user device respective location information for at least a subset of the set of viewable users, thereby to enable display of friend icons for the subset of viewable users at respective display locations on a map forming part of the map-based GUI.

2. The system of claim 1, wherein each per-user ACL indicates for the associated set of viewable users respective location display granularity levels, indicating each of the set of viewable users as being viewable by the requesting user at a respectively corresponding one of two or more distinct levels of display granularity.

3. The system of claim 2, wherein the two or more distinct levels of display granularity comprise:
   a precise viewing level at which the display location of the respective user corresponds substantially to an actual location of a user device associated with the respective user; and
   a regional viewing level, at which the display location of the respective user differs from the actual location, while being located within a defined geographical region within which the actual location is situated.

4. The system of claim 1, wherein the instructions further configure the computer processors to, responsive to determining the set of viewable users for the requesting user from the per-user ACL, retrieving respective location information for at least the subset of viewable users from a location datastore distinct from the per-user ACL.

5. The system of claim 4, further comprising, in response to a particular user switching to an invisible mode in which the location of the particular user is to be invisible to any other user, deleting from the location datastore the location information associated with the particular user.

6. The system of claim 5, wherein the one or more computer processors are further configured by the instructions to, subsequent to deletion of the location information of the particular user from the location datastore, update respective per-user ACLs of the set of viewable users indicated by the per-user ACL of the particular user, the updating of the respective per-user ACLs being to reflect operation of the particular user in the invisible mode.

7. The system of claim 1, wherein the one or more computer processors are configured to access the per-user ACL of the requesting user in a procedure comprising:
   determining if the per-user ACL of the requesting user is up-to-date;
   in response to determining that the per user ACL is not up-to-date, triggering an update of the per-user ACL of the requesting user; and
   determining the set of viewable users for the requesting user based on the updated per-user ACL of the requesting user.

8. A method comprising:
   at a server system, maintaining multiple access control lists (ACLs) for a social media platform such that a separate respective per-user ACL is maintained for each one of multiple users of the social media platform, each per-user ACL listing a set of viewable users for the associated user, the set of viewable users being a plurality of other users of the social media platform for whom the associated user has permission to view their respective geographic locations, the multiple per-user ACLs being maintained as distinct database entities that are configured to be separately accessible for reading and updating, independently from one another;
   in response to changing of location sharing preferences for a particular user, triggering an asynchronous update task configured to update respective per-user ACLs of a plurality of respective friend users by whom the particular user is viewable prior to update, the asynchronous update task comprising firing, for each of the plurality of friend users, a separate transaction to calculate and update the per-user ACL of the respective friend user;
   receiving, from a user device associated with a requesting user, a request for location-based social media activity information to cause display of a map-based graphical user interface (GUI) for the social media platform on the user device; and
   in response to the request, performing an automated friends location serving procedure using one or more computer processor devices configured therefor, the friends location serving procedure comprising:
      accessing the per-user ACL of the requesting user;
      based on the per-user ACL of the requesting user, determining the set of viewable users for the requesting user; and
      transmitting to the user device respective location information for at least a subset of the set of viewable users, thereby to enable display of friend icons for the subset of viewable users at respective display locations on a map forming part of the map-based GUI.

9. The method of claim 8, wherein each per-user ACL indicates for the associated set of viewable users respective location display granularity levels, indicating each of the set of viewable users as being viewable by the requesting user at a respectively corresponding one of two or more distinct levels of display granularity.

10. The method of claim 9, wherein the two or more distinct levels of display granularity comprise:
   a precise viewing level at which the display location of the respective user corresponds substantially to an actual location of a user device associated with the respective user; and
   a regional viewing level, at which the display location of the respective user differs from the actual location, while being located within a defined geographical region within which the actual location is situated.

11. The method of claim 8, further comprising, responsive to determining the set of viewable users for the requesting user from the per-user ACL, retrieving respective location information for at least the subset of viewable users from a location datastore distinct from the per-user ACL.

12. The method of claim 11, wherein the location datastore stores, for each of the multiple users, a respective location indicator and an associated timestamp, the method further comprising:
   on an ongoing basis, deleting from the location datastore each location indicator whose associated timestamp indicates an age greater than a predefined expiry age.

13. The method of claim 12, further comprising, in response to a particular user switching to an invisible mode in which the location of the particular user is to be invisible to by any other user, deleting from the location datastore the location indicator associated with the particular user.

14. The method of claim 13, further comprising, subsequent to deletion of the location indicator of the particular user from the location datastore, updating respective per-user ACLs of the set of viewable users indicated by the per-user ACL of the particular user, the updating of the respective per-user ACLs being to reflect operation of the particular user in the invisible mode.

15. The method of claim 8, wherein accessing the per-user ACL of the requesting user comprises:
   determining if the per-user ACL of the requesting user is up-to-date;
   in response to determining that the per user ACL is not up-to-date, triggering an update of the per-user ACL of the requesting user; and
   determining the set of viewable users for the requesting user based on the updated per-user ACL of the requesting user.

16. A non-transitory computer-readable storage medium having stored thereon instructions for causing a machine, when executing the instructions, to perform operations comprising:
   maintaining multiple access control lists (ACLs) for a social media platform such that a separate respective per-user ACL is maintained for each one of multiple users of the social media platform, each per-user ACL listing a set of viewable users for the associated user, the set of viewable users being a plurality of other users of the social media platform for whom the associated user has permission to view their respective geographic locations, the multiple per-user ACLs being maintained as distinct database entities that are configured to be separately accessible for reading and updating, independently from one another;
   in response to changing of location sharing preferences for a particular user, triggering an asynchronous update task configured to update respective per-user ACLs of a plurality of respective friend users by whom the particular user is viewable prior to update, the asynchronous update task comprising firing, for each of the plurality of friend users, a separate transaction to calculate and update the per-user ACL of the respective friend user;

receiving, from a user device associated with a requesting user, a request for location-based social media activity information to cause display of a map-based graphical user interface (GUI) for the social media platform on the user device; and in response to the request, performing an automated friends location serving procedure using one or more computer processor devices configured therefor, the friends location serving procedure comprising:

accessing the per-user ACL of the requesting user;

based on the per-user ACL of the requesting user, determining the set of viewable users for the requesting user; and transmitting to the user device respective location information for at least a subset of the set of viewable users, thereby to enable display of friend icons for the subset of viewable users at respective display locations on a map forming part of the map-based GUI.

* * * * *